US012708178B2

(12) United States Patent
Corcoran-Tadd et al.

(10) Patent No.: US 12,708,178 B2
(45) Date of Patent: Aug. 18, 2026

(54) ARTICLES OF FOOTWEAR WITH UPPERS COMPRISING A WOUND COMPONENT AND METHODS OF MAKING THE SAME

(71) Applicant: adidas AG, Herzogenaurach (DE)

(72) Inventors: Fionn Jonathan Corcoran-Tadd, Portland, OR (US); Benjamin William Kleiman, Portland, OR (US); Ian James Hennebery, Portland, OR (US); Keith Paul Thompson, Ely (GB); Peter David Cauwood, Cambridge (GB); Peter Georg Laitenberger, Cambridge (GB); Sam Jackson Conklin, Portland, OR (US); Luke Alexander Lowrey, Nuremberg (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 18/428,812

(22) Filed: Jan. 31, 2024

(65) Prior Publication Data

US 2024/0164483 A1 May 23, 2024

Related U.S. Application Data

(63) Continuation of application No. 17/125,492, filed on Dec. 17, 2020, now Pat. No. 11,889,895, which is a
(Continued)

(51) Int. Cl.
*A43B 23/02* (2006.01)
*A43B 1/00* (2006.01)
(Continued)

(52) U.S. Cl.
CPC ........ *A43B 23/0265* (2013.01); *A43B 1/0063* (2013.01); *A43B 7/00* (2013.01);
(Continued)

(58) Field of Classification Search
USPC .................................... 36/98; 12/145, 146 C
See application file for complete search history.

(56) References Cited

U.S. PATENT DOCUMENTS 2,386,269 A 10/1945 Ryan
2,430,497 A 11/1947 Enright
(Continued)

FOREIGN PATENT DOCUMENTS

CN 102232671 A 11/2011
CN 102497792 A 6/2012
(Continued)

OTHER PUBLICATIONS

Extended European Search Report issued in European Application No. 19167255.9, dated Aug. 9, 2019, 8 pages.
(Continued)

*Primary Examiner* — Matthew R Marchewka
(74) *Attorney, Agent, or Firm* — Sterne, Kessler, Goldstein & Fox P.L.L.C.

(57) ABSTRACT

Articles of footwear and methods of making articles of footwear including one or more continuous threads wound around anchor points. The winding of the one or more continuous threads forms a thread pattern that imparts desired characteristics to components of the article of footwear. Thread lines of the thread pattern may be bonded together. In some embodiments, thread lines may be bonded with a bonding layer.

20 Claims, 36 Drawing Sheets

Related U.S. Application Data continuation of application No. 15/945,034, filed on Apr. 4, 2018, now Pat. No. 10,874,172.

(51) Int. Cl.

| | |
|---|---|
| ***A43B 7/00*** | (2006.01) |
| ***A43B 13/14*** | (2006.01) |
| ***A43B 23/04*** | (2006.01) |
| ***A43D 1/02*** | (2006.01) |
| ***A43D 3/02*** | (2006.01) |
| ***B29D 5/06*** | (2006.01) |
| ***B29D 35/06*** | (2010.01) |
| ***B29D 35/12*** | (2010.01) |
| ***B32B 5/02*** | (2006.01) |
| ***B32B 5/14*** | (2006.01) |
| ***B32B 5/26*** | (2006.01) |
| ***D04H 3/045*** | (2012.01) |
| ***D04H 3/12*** | (2006.01) |
| *A43B 5/02* | (2006.01) |
| *A43B 5/06* | (2022.01) |
| *A43B 5/10* | (2006.01) |
| *A43B 5/12* | (2006.01) |
| *A43B 5/14* | (2006.01) |

(52) U.S. Cl.

CPC .......... *A43B 13/14* (2013.01); *A43B 23/0205* (2013.01); *A43B 23/0235* (2013.01); *A43B 23/0255* (2013.01); *A43B 23/04* (2013.01); *A43D 1/02* (2013.01); *A43D 1/025* (2013.01); *A43D 3/02* (2013.01); *A43D 3/022* (2013.01); *B29D 5/06* (2013.01); *B29D 35/06* (2013.01); *B29D 35/122* (2013.01); *B32B 5/024* (2013.01); *B32B 5/026* (2013.01); *B32B 5/028* (2013.01); *B32B 5/142* (2013.01); *B32B 5/26* (2013.01); *D04H 3/045* (2013.01); *D04H 3/12* (2013.01); *A43B 5/025* (2013.01); *A43B 5/06* (2013.01); *A43B 5/10* (2013.01); *A43B 5/12* (2013.01); *A43B 5/14* (2013.01); *A43B 23/026* (2013.01); *A43D 2200/10* (2013.01); *B32B 2250/20* (2013.01); *D10B 2403/033* (2013.01); *D10B 2501/043* (2013.01)

(56) References Cited

U.S. PATENT DOCUMENTS

| | | | | |
|---|---|---|---|---|
| 3,296,490 | A | 1/1967 | Price | |
| 4,556,440 | A | 12/1985 | Krueger | |
| 4,677,831 | A | 7/1987 | Wunner | |
| 4,724,612 | A | 2/1988 | Pearson | |
| 5,445,693 | A | 8/1995 | Vane | |
| 5,706,590 | A | 1/1998 | Candela et al. | |
| 7,540,097 | B2 | 6/2009 | Greene et al. | |
| 7,703,220 | B2 | 4/2010 | Aveni | |
| 7,774,884 | B2 | 8/2010 | Greene et al. | |
| 8,056,173 | B2 | 11/2011 | Rongbo | |
| 8,065,818 | B2 | 11/2011 | Greene et al. | |
| 8,850,723 | B2 | 10/2014 | Greene et al. | |
| 8,906,275 | B2 | 12/2014 | Davis et al. | |
| 8,925,195 | B2 | 1/2015 | Schmidt et al. | |
| 9,227,363 | B2 | 1/2016 | Dua et al. | |
| 9,402,444 | B2 | 8/2016 | Dojan et al. | |
| 9,427,047 | B2 | 8/2016 | Dojan et al. | |
| 9,462,851 | B2 | 10/2016 | Baker et al. | |
| 9,675,134 | B2 | 6/2017 | Kosui et al. | |
| 9,681,708 | B2 | 6/2017 | Greene et al. | |
| 9,732,454 | B2 | 8/2017 | Davis et al. | |
| 10,194,714 | B2 | 2/2019 | Mcginnity et al. | |
| 10,874,172 | B2 | 12/2020 | Corcoran-Tadd et al. | |
| 11,602,196 | B2 | 3/2023 | Corcoran-Tadd et al. | |
| 12,161,191 | B2 | 12/2024 | Corcoran-Tadd et al. | |
| 2004/0118018 | A1 | 6/2004 | Dua | |
| 2006/0276095 | A1* | 12/2006 | Dua | A43B 7/125<br>264/319 |
| 2007/0271822 | A1 | 11/2007 | Meschter | |
| 2010/0018075 | A1 | 1/2010 | Meschter et al. | |
| 2010/0154256 | A1* | 6/2010 | Dua | A43B 7/20<br>12/146 B |
| 2010/0251491 | A1 | 10/2010 | Dojan et al. | |
| 2010/0251564 | A1 | 10/2010 | Meschter | |
| 2012/0023786 | A1 | 2/2012 | Dojan | |
| 2012/0055044 | A1 | 3/2012 | Dojan et al. | |
| 2012/0233882 | A1 | 9/2012 | Huffa et al. | |
| 2013/0019500 | A1 | 1/2013 | Greene | |
| 2013/0025159 | A1 | 1/2013 | Dojan et al. | |
| 2013/0219636 | A1 | 8/2013 | Dojan et al. | |
| 2013/0219750 | A1 | 8/2013 | Dojan et al. | |
| 2013/0340283 | A1 | 12/2013 | Bell et al. | |
| 2014/0068968 | A1 | 3/2014 | Podhajny et al. | |
| 2014/0130372 | A1 | 5/2014 | Aveni et al. | |
| 2014/0134378 | A1* | 5/2014 | Downs | B32B 5/022<br>156/196 |
| 2014/0173938 | A1 | 6/2014 | Beye et al. | |
| 2014/0237861 | A1 | 8/2014 | Podhajny | |
| 2014/0373389 | A1 | 12/2014 | Bruce | |
| 2015/0040428 | A1 | 2/2015 | Davis et al. | |
| 2015/0047225 | A1 | 2/2015 | Zavala et al. | |
| 2015/0052778 | A1* | 2/2015 | Kirk | A43B 23/0235<br>442/204 |
| 2015/0059209 | A1 | 3/2015 | Dekovic et al. | |
| 2015/0164175 | A1 | 6/2015 | Katsuya | |
| 2015/0208762 | A1* | 7/2015 | Reinhardt | A43B 23/0235<br>36/45 |
| 2015/0250256 | A1 | 9/2015 | Podhajny | |
| 2015/0272274 | A1 | 10/2015 | Berns et al. | |
| 2015/0359290 | A1 | 12/2015 | Podhajny et al. | |
| 2016/0058100 | A1 | 3/2016 | Dealey et al. | |
| 2016/0058121 | A1 | 3/2016 | Langvin et al. | |
| 2016/0088893 | A1 | 3/2016 | Meir | |
| 2016/0135543 | A1 | 5/2016 | Anceresi et al. | |
| 2016/0168774 | A1 | 6/2016 | Breithaupt et al. | |
| 2016/0192741 | A1 | 7/2016 | Mark | |
| 2016/0206044 | A1 | 7/2016 | Dimoff et al. | |
| 2017/0035149 | A1 | 2/2017 | Bruce et al. | |
| 2017/0202296 | A1 | 7/2017 | Fuerst, Jr. et al. | |
| 2017/0202309 | A1 | 7/2017 | Sterman et al. | |
| 2017/0245582 | A1 | 8/2017 | Green et al. | |
| 2017/0290376 | A1 | 10/2017 | Maheshwari et al. | |
| 2017/0347754 | A1 | 12/2017 | Fuerst, Jr. et al. | |
| 2018/0110298 | A1 | 4/2018 | Schneider et al. | |
| 2018/0148861 | A1 | 5/2018 | Tarrier et al. | |
| 2018/0271216 | A1 | 9/2018 | La O' et al. | |
| 2019/0274392 | A1 | 9/2019 | Amis et al. | |
| 2021/0100316 | A1 | 4/2021 | Corcoran-Tadd et al. | |
| 2024/0324699 | A1 | 10/2024 | Hirst et al. | |
| 2025/0098817 | A1 | 3/2025 | Corcoran-Tadd et al. | |
| 2025/0107583 | A1 | 4/2025 | Corcoran-Tadd et al. | |
| 2025/0213003 | A1 | 7/2025 | Dyckmans et al. | |
| 2025/0215621 | A1 | 7/2025 | Dyckmans et al. | |
| 2025/0215622 | A1 | 7/2025 | Dyckmans et al. | |
| 2025/0215626 | A1 | 7/2025 | Dietrich et al. | |
| 2025/0215627 | A1 | 7/2025 | Feix et al. | |
| 2025/0327226 | A1 | 10/2025 | Conklin et al. | |

FOREIGN PATENT DOCUMENTS

| | | | |
|---|---|---|---|
| CN | 204207163 | U | 3/2015 |
| CN | 105263351 | A | 1/2016 |
| CN | 107072353 | A | 8/2017 |
| JP | 11006005 | Y | 12/1936 |
| JP | S4939620 | B1 | 10/1974 |
| JP | H0941231 | A | 2/1997 |
| JP | 2015014058 | A | 1/2015 |
| JP | 2016524941 | A | 8/2016 |
| JP | 2017148422 | A | 8/2017 |
| WO | WO-9843506 | A1 | 10/1998 |
| WO | WO-2014074928 | A1 | 5/2014 |

(56) References Cited

FOREIGN PATENT DOCUMENTS

| | | | |
|---|---|---|---|
| WO | WO-2014074966 | A2 | 5/2014 |
| WO | WO-2017115806 | A1 | 7/2017 |
| WO | WO-2017214199 | A1 | 12/2017 |

OTHER PUBLICATIONS

MAWS one—Martin Sallieres, Martzer, Jul. 12, 2017, https://vimeo.com/225224055.
Martzer_, "2 hours to go!" Instagram.com, posted Jun. 27, 2017, https://www.instagram.com/p/BV1vc2KFXHq/.
Martzer_, "3d woven shoe" Instagram.com, posted Feb. 27, 2018, https://www.instagram.com/p/BftFi9siS4xl.
Martzer_, "Always experimenting! I wove some cotton thread on the last and stiffened it with latex. The outcome is interesting and promising for the future of my research. I shape the sole in hard foam!" Instagram.com, posted May 29, 2017, https://www.instagram.com/p/BUrTEigFmeX/.
Martzer_, "Experimenting with new material, and shapes! I am taking the opportunity here to thank you all for the upport and the likes!" Instagram.com, posted Sep. 25, 2017, https://www.instagram.com/p/BZd_qiSICKu/.
Martzer_, "I am back at it! This time it's to hopefully graduate from @design_academy_eindhoven I am continuing my dweaving and printing experiments from last semester and this is the first model! Stay posted if you want to follow the est of the process!" Instagram.com, posted Sep. 16, 2017, https://www.instagram.com/p/BZG217t1Rfu/.
Martzer_, "Small update on my research, this model is from two weeks ago. I'll be showing my final model on Tuesday or my last endterms before graduation! Stay posted . . . " Instagram.com, posted Jun. 22, 2017, https://www.instagram.com/p/BVpfr5pFVEf/.
Martzer_, "My outcome of the past two months! End terms are tomorrow, wish me luck! More photos of the project will come after tomorrow!" instagram.com, posted Jun. 26, 2017, https://www.instagram.com/p/BVzVqEiFw-a/.
Martzer_, "Off to graduation now! . . . " Instagram.com, posted Jun. 29, 2017, https://www.instagram.com/p/ BV7t3eSFolc/.
Martzer_, "Some close up shots of my graduation project "Shoelab" which you witnessed the process on my instram account throughout the past few month! Thank you all for the constant feedback and support! I hope you liked it!" instagram.com, posted Jan. 26, 2018, https://www.instagram.com/p/BeaOE5QlDlX/.
Martzer_, "The graduation period is coming to an end, one month left! Here is one of my latest experiments that I did a few weeks back! Also, any idea how to name this project? I'm struggling a bit haha" Instagram.com, posted Dec. 9, 2017, https://www.instagram.com/p/Bc43txTFS36.
Martzer_, "Two weeks before green light good to have a small overview of my progress so far" Instagram.com, posted Nov. 6, 2017, https://www.instagrams.com/p/BbJ1dpqleah/.
Martzer_, "Yesterday I graduated Cum Laude from @design_academy_eindhoven! One of my project being this 3D Woven shoe! More pictures to come!" Instagram.com, posted Jan. 24, 2018, https://www.instagram.com/p/ BeVw-21F26T/.

* cited by examiner

ARTICLES OF FOOTWEAR WITH UPPERS COMPRISING A WOUND COMPONENT AND METHODS OF MAKING THE SAME

CROSS-REFERENCE TO RELATED APPLICATIONS

This application is a continuation of and claims priority to U.S. application Ser. No. 17/125,492, filed Dec. 17, 2020, which is a continuation of U.S. application Ser. No. 15/945,034, filed Apr. 4, 2018. Both of these applications are incorporated herein by reference in their entireties.

FIELD

The described embodiments generally relate to articles of footwear and methods of making articles of footwear. In particular, described embodiments relate to articles of footwear with uppers including a component made by winding a continuous thread into a thread pattern.

BACKGROUND

Individuals are often concerned with the durability, weight, and/or comfort of an article of footwear. This is true for articles of footwear worn for non-performance activities, such as a leisurely stroll, and for performance activities, such as running. Durable footwear will properly function for an extended period of time. Lightweight footwear minimizes the weight an individual has to carry on his or her feet and may be comfortable for an individual. Customized footwear may increase comfort for an individual because it is tailored to the individual's foot anatomy.

For some individuals, for example athletes, stability and propulsion may be desired characteristics for an article of footwear. Footwear that facilitates propulsion (e.g., forward and/or upward motion) may help an athlete perform at an optimal athletic level. Stability for footwear, an in particular stability in portions supporting the ankles of an individual, may reduce the chance of injury to the individual's feet.

Proper footwear should be durable, comfortable, and provide other beneficial characteristics for an individual. Therefore, a continuing need exists for innovations in footwear and components used to manufacture the footwear.

BRIEF SUMMARY OF THE INVENTION

Some embodiments are directed to a method of making an upper for an article of footwear, the method including defining a plurality of peripheral anchor points; winding a continuous thread around the plurality of peripheral anchor points to form a thread pattern, the continuous thread including a plurality of thread lines with each thread line extending between two respective peripheral anchor points; and bonding the continuous thread at a point of intersection between the thread lines.

Some embodiment are directed to a method of making an upper for an article of footwear, the method including winding a continuous thread around a set of pins to form a thread pattern, the pins being coupled to and extending from a support structure and disposed at locations corresponding to a perimeter of the upper, and the continuous thread including a plurality of thread lines, where each thread line extends between two respective pins; and bonding the continuous thread to itself at one or more of the plurality of pins.

Some embodiments are directed to an article of footwear including a sole; and an upper coupled to the sole, the upper including a plurality of anchor points disposed along a perimeter of the upper, and a continuous thread fixed at the plurality of anchor points and including a plurality of thread lines with each thread line extending between two respective anchor points, where the anchor points have a thread line communication number of three or more, and where the continuous thread is bonded at the plurality of anchor points.

Some embodiments are directed to an article of footwear including a sole; and an upper coupled to the sole, the upper including a perimeter layer including an outer edge and an inner edge, a first plurality of thread line groups including three or more thread lines extending radially from respective areas on the outer edge, and a second plurality of thread line groups including three or more thread lines extending radially from respective areas on the inner edge, where the thread lines of the first plurality of thread line groups and the thread lines of the second plurality of thread line groups are bonded to each other at points of intersection between the thread lines.

Some embodiments are directed to a method of making an article of footwear, the method including winding a continuous thread around a set of pins to form a thread pattern for an upper of the article of footwear, the pins coupled to and extending from a support structure and disposed at locations corresponding to a perimeter of the upper, and the continuous thread comprising a plurality of thread lines, where each thread line extends between two respective pins; and bonding the continuous thread to itself at one or more of the plurality of pins.

BRIEF DESCRIPTION OF THE DRAWINGS/FIGURES

DETAILED DESCRIPTION OF THE INVENTION

Figure 1A:
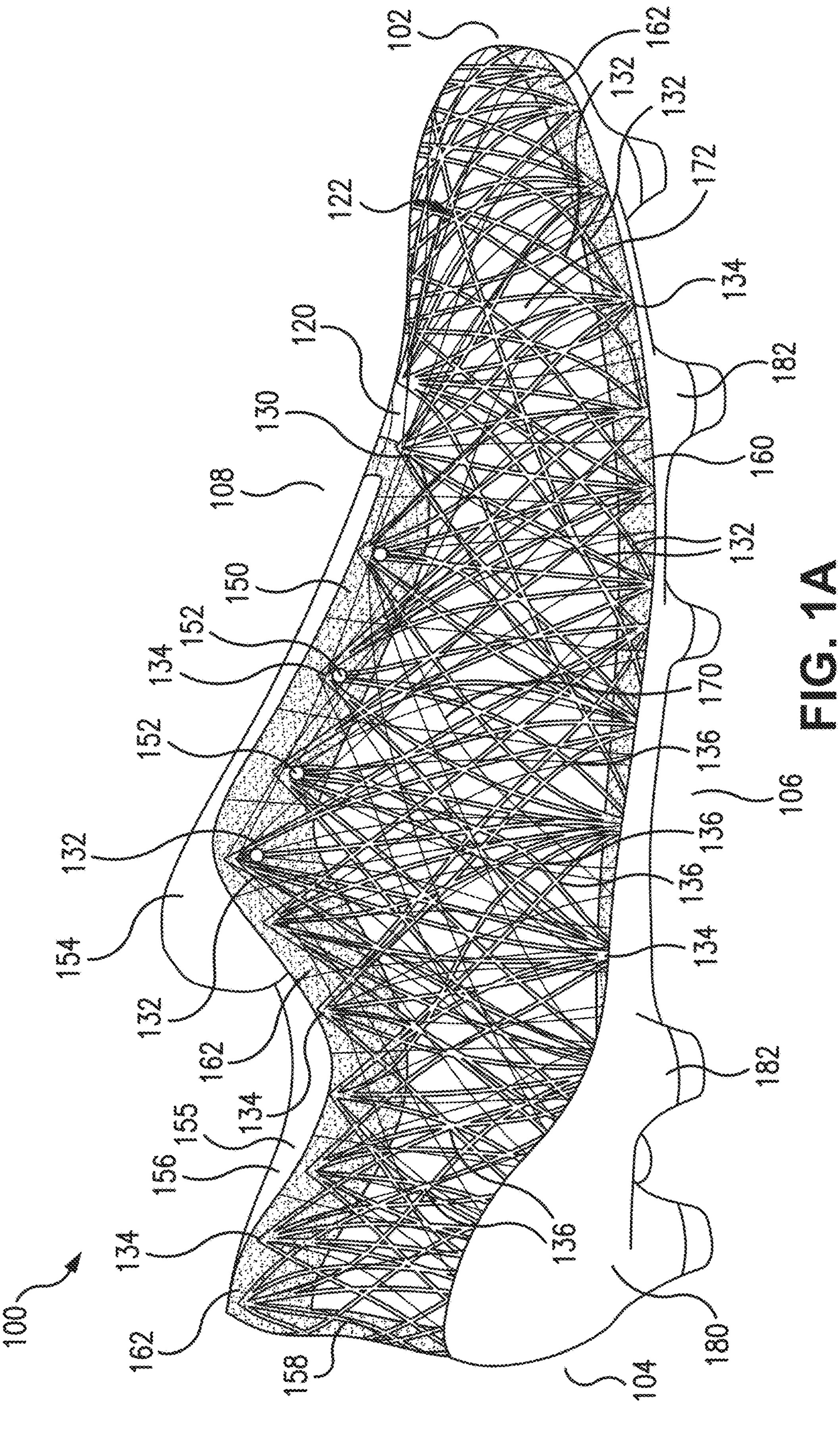
FIG. 1A shows an article of footwear according to some embodiments.

The present invention(s) will now be described in detail with reference to embodiments thereof as illustrated in the accompanying drawings. References to "some embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An article of footwear has many purposes. Among other things, an article of footwear may serve to provide cushioning for a wearer's foot, support a wearer's foot, and protect a wearer's foot. Each of these purposes, alone or in combination, provides for a comfortable article of footwear suitable for use in a variety of scenarios (e.g., exercise and every day activities). The features of an article of footwear (e.g., the materials and components used to make footwear, and the way these materials/components are assembled in a manufacturing process) may be altered to produce desired characteristics, for example, durability, support, weight, tackiness, texture, haptics, and/or breathability.

Durable footwear will properly function for an extended period of time and may instill a wearer's trust in a specific manufacturer's footwear, leading to repeat sales. Supportive footwear may protect an individual's feet from injury. For example, an article of footwear configured to provide ankle support may prevent injury to an individual's ankle by inhibiting undue twisting of the ankle. Lightweight footwear may be conformable for an individual, and for individuals competing in an athletic activity, such as running or biking, may provide a competitive edge due to the decreased weight the individual carries on his or her feet. Breathable footwear may increase comfort for an individual by wicking sweat and heat away from an individual's foot. Designing footwear having a high degree of one or more of these characteristics without detrimentally affecting other characteristics of the footwear may be desirable. Additionally, proper fitting footwear which adapts to the wearer's foot or is correctly shaped to the wearer's foot may provide a benefit in comfort and stability, particularly during changes of direction. The proper zoning of areas of support, flexibility, stiffness, and softness may also benefit the wearer by more accurately providing him or her desired characteristics of the footwear for different movements, or different parts of their foot.

Propulsion enabled by an article of footwear may optimize the performance of a wearer's foot by, for example, maximizing the energy transfer from the individual's foot to the surface his or her foot is in contact with (e.g., the ground), via the article of footwear. Maximizing the energy transfer between the individual's foot and a surface (i.e., reducing energy lost via and/or absorbed by an article of footwear) may help an athlete, for example, accelerate faster, maintain a higher maximum speed, change directions faster, and jump higher. Designing footwear having a high degree of propulsion without detrimentally affecting other characteristics of the footwear may be desirable. Providing tackiness in specific areas on an upper may tailor an upper to an individual's liking. For example, some soccer players may like a soccer boot that is smooth for case of dribbling while others may like high friction for control during hard strikes.

An article of footwear, or a portion thereof (e.g., an upper), may be configured to provide various degrees of durability, support, weight, breathability, etc. But the cost of manufacturing the article of footwear may also be a consideration. Footwear, or a portion thereof, that may be manufactured at a relatively low cost may be desirable for manufacturers and consumers. Footwear that can be manufactured using a relatively small amount of resources (e.g., energy and man power), materials, and time reduces manufacturing costs and may also reduce the environmental impact of manufacturing.

Further, a manufacturing process that facilitates the manufacture of customized footwear without increasing the complexity of the manufacturing process may be desirable. Customizing an article of footwear, or a portion thereof (e.g., an upper), for a particular individual or a group of individuals having similar foot anatomies (e.g., foot size and shape) may provide proper support and increased comfort for an individual. Also, it may allow an individual to order/buy articles of footwear customized to his or her needs. Moreover, it may allow the individual to order/buy new and/or replacement articles of footwear customized to his or her needs when desired.

The articles of footwear discussed herein include a component, for example an upper or a sole, made by winding one or more continuous threads into a desired thread pattern. In some embodiments, the continuous thread(s) may be wound around and between fixed anchor points. In some embodiments, the continuous thread(s) may be wound around and between moveable anchor points. Winding the continuous thread(s) around the anchor points includes wrapping a continuous thread around a first anchor point, extending that continuous thread to a second anchor point, wrapping that continuous thread around the second anchor point, and so on. The number and position of the anchor points may be utilized to control characteristics of the thread pattern, and therefore the article of footwear component. Also, the number of times a continuous thread is wound from anchor point to anchor point may be utilized to control characteristics of the thread pattern, and therefore the article of footwear component.

Continuous thread(s) of a thread pattern may be bonded within the thread pattern. The bonding of continuous thread(s) of a thread pattern may consolidate the thread pattern and fix thread lines in a wound pattern. In some embodiments, bonding continuous thread(s) of a thread pattern may be utilized to control characteristics of the thread pattern. In some embodiments, a continuous thread may be bonded to itself within a thread pattern. In some embodiments, a continuous thread may be bonded to itself at one or more anchor points of a thread pattern. In some embodiments, a continuous thread may be bonded to itself at points of overlap between different thread lines of the continuous thread (i.e., at thread line intersection points). In some embodiments, different continuous threads of a thread pattern may be bonded together. In some embodiments, different continuous threads may be bonded to each other at one or more anchor points of a thread pattern. In some embodiments, different continuous threads may be bonded to each other at points of overlap between the different continuous threads (i.e., at intersection points between the different continuous threads). The bonding of continuous thread(s) may fix the continuous thread(s) in tension as the thread(s) are wound around anchor points in tension. The bonding of thread(s) in tension allows a thread pattern to contract once removed from anchor points used to wind the thread pattern, which may be utilized to control characteristics of the thread pattern.

In some embodiments, a plurality of different continuous threads may be wound around anchor points to form a thread pattern. In some embodiments, different continuous threads may be wound in the same configuration (i.e., around the same anchor points and along the same paths). In some embodiments, different continuous threads may be wound in different configurations (i.e., around one or more different anchor points and/or along different paths between one or more anchor points). Different continuous threads may define different wound layers for a footwear component. And these different layers may provide different characteristics for a thread pattern, and therefore the footwear component.

Continuous thread(s) may be wound around anchor points in various configurations to provide varying degrees of characteristics for an article of footwear component. The number of anchor points, the position of the anchor points, and/or the way continuous threads are wound around the anchor points may be utilized to produce a footwear components having desired characteristics, such as strength, support, propulsion, breathability, comfort, tackiness, abrasion resistance, fit, texture, haptics, and durability. Characteristics of a footwear component can be varied by changing the arrangement of anchor points and/or the way continuous thread(s) are wound around the anchor points. Characteristics can also be varied by altering the material of continuous thread(s).

In some embodiments, when winding continuous threads for an upper, the anchor points may be peripheral anchor points arranged in positions corresponding to a perimeter of an upper, or a portion of an upper, for an article of footwear. Winding a continuous thread around and between the peripheral anchor points may define the perimeter shape of the upper, or portion of an upper. And the way continuous thread(s) are wound between respective peripheral anchor points (i.e., the winding path for the continuous thread(s)) can be leveraged to produce an upper having desired characteristics.

Winding continuous thread(s) as described herein may facilitate customization of an article of footwear component for an individual, or group of individuals. The location of anchor points, the number and configuration of continuous threads wound around the anchor points, and the material of the continuous thread(s) may be tailored for an individual, or group of individuals. Customization via tailoring of a wound thread pattern may facilitate flexible and efficient manufacturing by reducing the number of changes in a manufacturing process needed to customize a footwear component (e.g., an upper) for an individual, or group of individuals. For example, in some embodiments, the configuration of a single continuous thread within a thread pattern, may be the only parameter altered between uppers for different individuals, or groups of individuals. A change in the configuration of a continuous thread within a thread pattern may alter, for example, the strength, support, propulsion, breathability, comfort, tackiness, abrasion resistance, texture, haptics, and/or durability for different areas on an upper.

In some embodiments, the thread pattern for wound continuous thread(s) may be based on a biometric data profile for an individual, or group of individuals. In some embodiments, the number and/or location of anchor points be based on a biometric data profile for an individual, or group of individuals. In some embodiments, the number and configuration of continuous threads within a thread pattern may be based on a biometric data profile for an individual, or group of individuals. In some embodiments, the material of different continuous threads within a thread pattern may be based on a biometric data profile for an individual, or group of individuals. Tailoring a thread pattern by tailoring anchor point locations, wound thread configurations, and/or materials of continuous threads may provide a footwear component (e.g., upper) with desired support, stability, durability, weight, propulsion, abrasion resistance, tackiness, and/or breathability for an individual, or group of individuals.

Figure 1B:
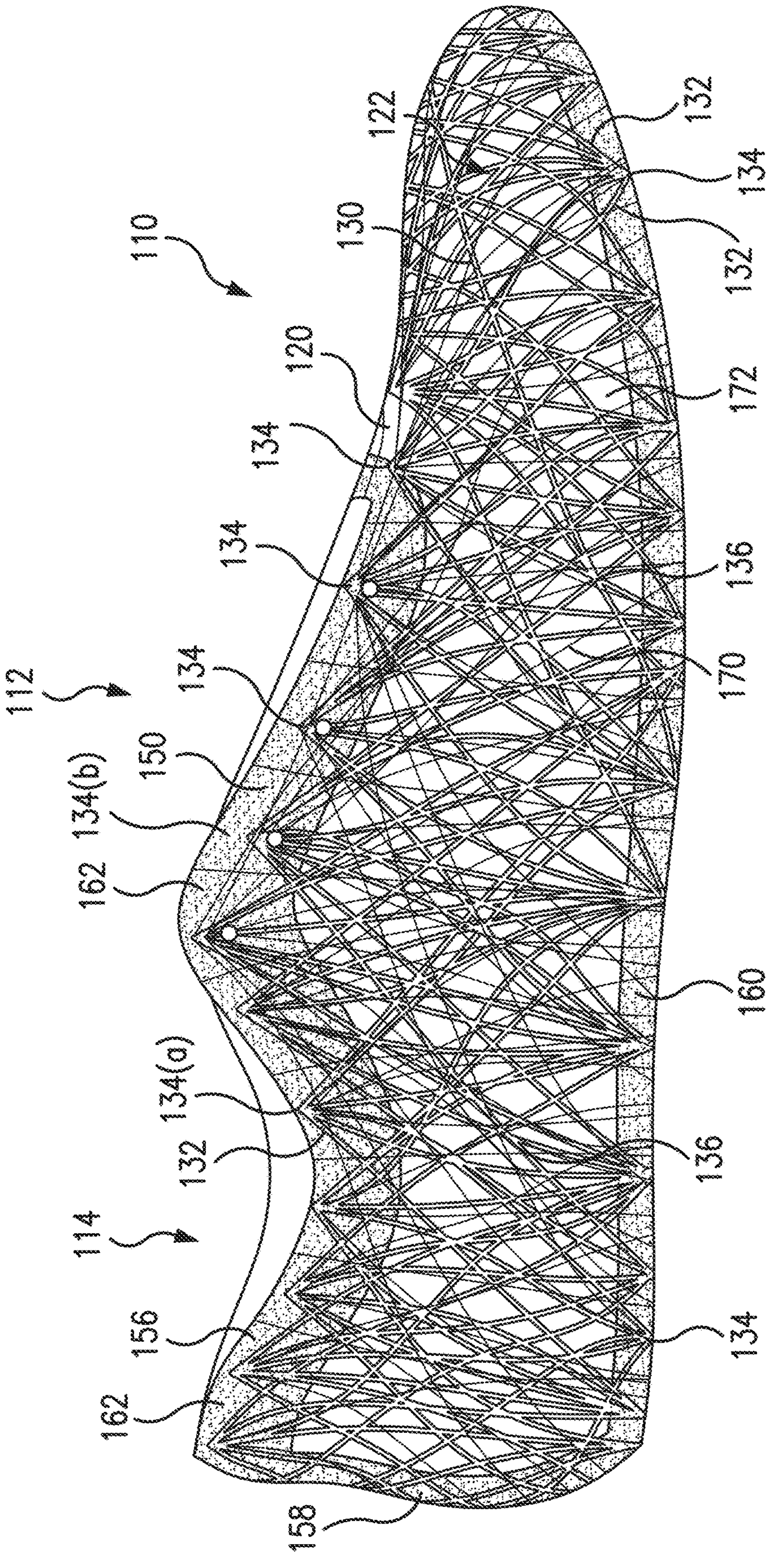
FIG. 1B shows the upper of FIG. 1A.

FIGS. 1A and 1B show an article of footwear 100 and upper 120 according to some embodiments. Article of footwear 100 may include upper 120 coupled to a sole 180. Article of footwear 100 and upper 120, include a forefoot end 102, a heel end 104, a medial side 106, and a lateral side 108 opposite medial side 106. As illustrated in FIG. 1B, upper 120 includes a forefoot portion 110, a midfoot portion 112, and a heel portion 114. Portions 110, 112, and 114 are not intended to demarcate precise areas of upper 120. Rather, portions 110, 112, and 114 are intended to represent general areas of upper 120 that provide a frame of reference. Although portions 110, 112, and 114 are illustrated in connection with upper 120 in FIG. 1B, references to portions 110, 112, and 114 also may apply specifically to article of footwear 100 or sole 180, or individual components of article of footwear 100 or sole 180.

Figure 20A:
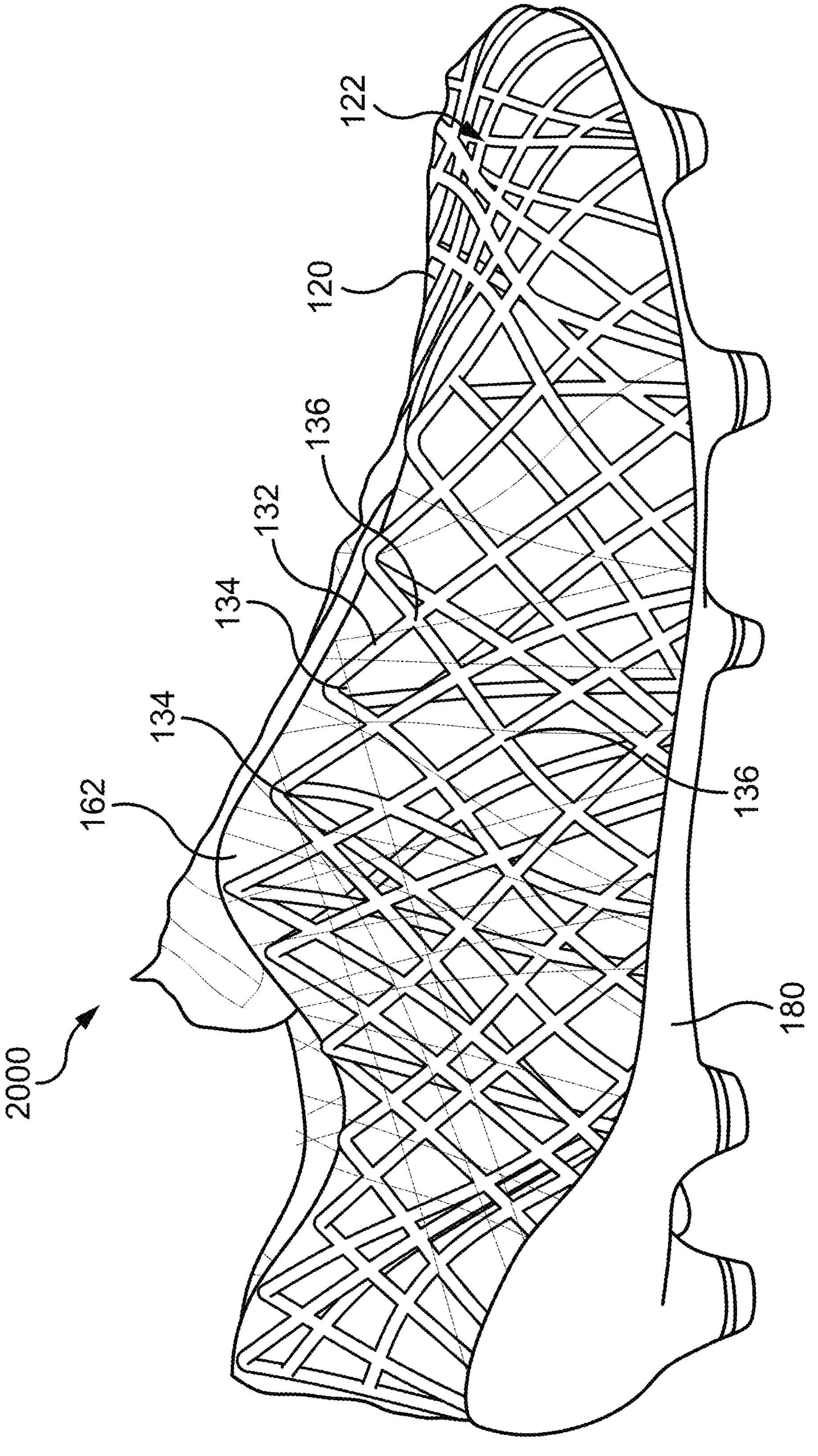
FIGS. 20A-20C show articles of footwear according to some embodiments.
Figure 20B:
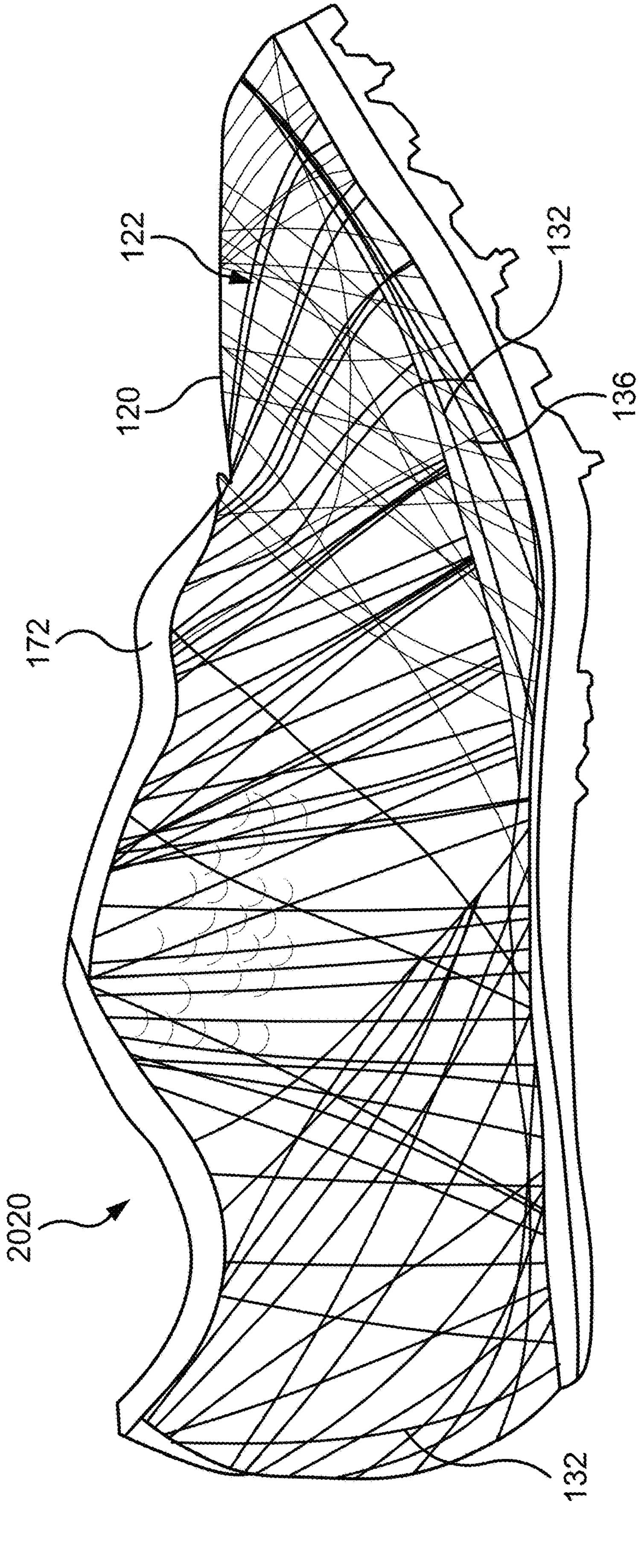
Figure 20C:
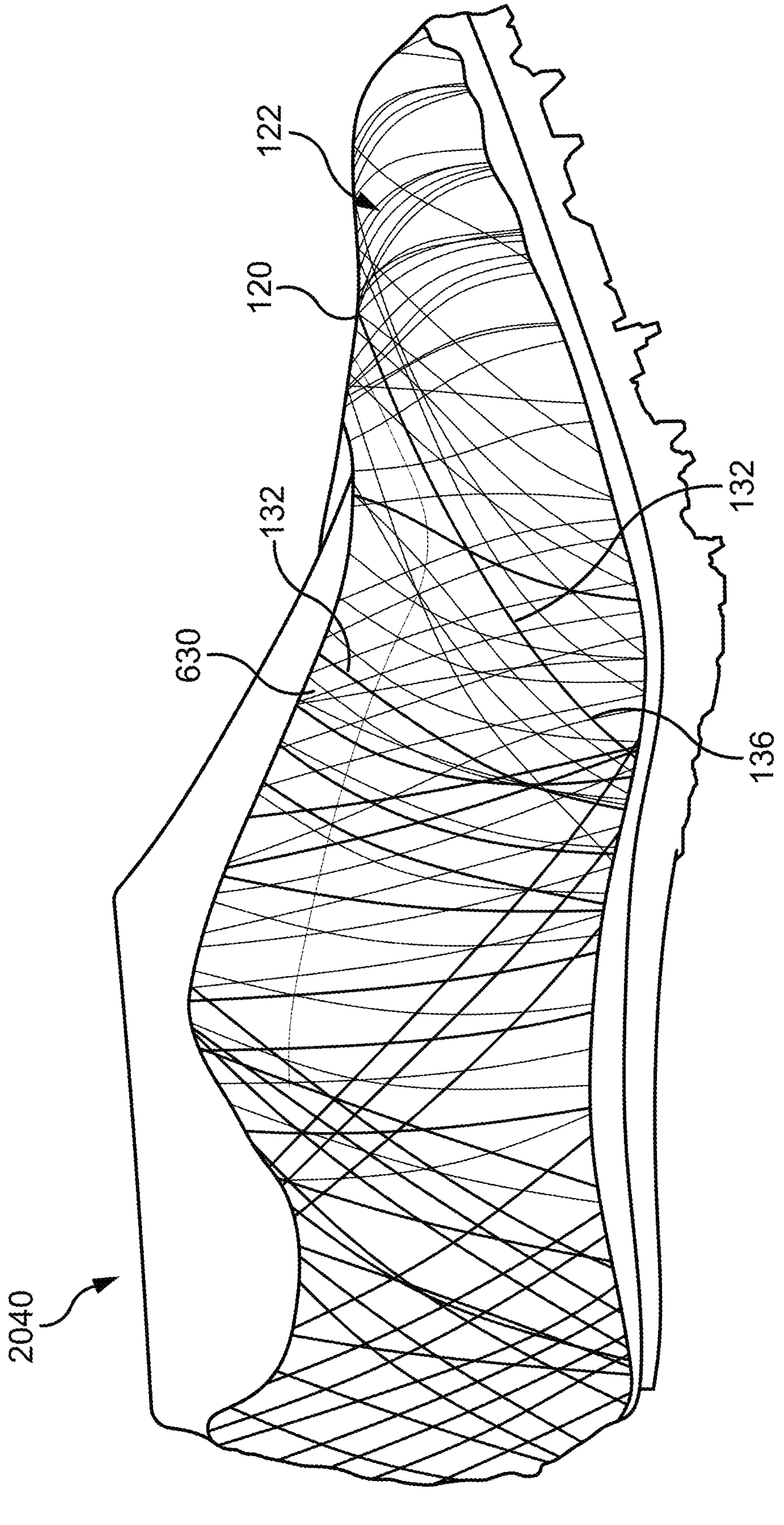

Upper 120 may be formed of one or more components that are stitched, bonded, or otherwise joined together to form a structure for receiving and securing a foot relative to sole 180. And upper 120 includes a least a portion defined by a thread pattern 122. Thread pattern 122 is made by winding one or more continuous threads into a thread pattern as discussed herein. Thread pattern 122 is not a knitted or woven pattern. Thread pattern 122 may be referred to as a thread network of adjacent and overlapping thread lines. In some embodiments, thread pattern 122 may include a network of individual thread lines that form a substantially continuous material with minimal void space between thread lines. As used herein, "void space" means an opening extending through a thread pattern between thread lines of the thread pattern. In some embodiments, the substantially continuous material may have a ratio (V:T) of void space (V) to thread material (T) of at least 1:1 measured across all or a portion of an outer surface of a thread pattern. In some embodiments, the ratio of void space to thread material may be at least 1:1, 1:2, 1:2.5, 1:3, 1:4, 1:5, 1:6, 1:7, 1:8, 1:9, 1:10, 1:20, 1:50, or 1:100. In some embodiments, a thread pattern may include a network of thread lines that form a continuous material with no void space between thread lines. A ratio of void space to thread material may be measured for a thread pattern before or after bonding of thread lines. In some embodiments, bonding of thread lines may serve to reduce the amount of void space of a thread pattern. For example, thermally bonding thread lines via a polymer material of the thread lines may reduce the amount of void space by filling in void space with thermally melted polymer material. FIGS. 20A-20C illustrate thread patterns 122 having minimal void space across the entire thread pattern according to some embodiments.

Thread pattern 122 may wrap around all or a portion of the sides, the top, and/or the heel of a wearer's foot. In some embodiments, thread pattern 122 may wrap around at least a portion of the bottom (i.e., the sole) of a wearer's foot when worn. For example, an upper with thread pattern 122 may wrap the sole of a wearer's foot when worn (see e.g., thread pattern 1002 in FIG. 10). As another example, thread pattern 122 may wrap around the sole of a wearer's foot by wrapping around a sole for an article of footwear. In other words, thread pattern 122 may form all or a portion of a thread pattern for upper 120 and a sole (e.g., thread pattern 1120 of sole 1100).

Upper 120 may extend along the lateral side of the foot, along the medial side of the foot, over the foot, around a heel of the foot, and/or under the foot. Upper 120 defines a void 155, which is a generally hollow area that has the general shape of a foot and is configured to receive the foot. An opening of void 155 may be defined in whole or in part by a collar 156 located in at least heel portion 114 of upper 120.

In addition, upper 120 includes a throat area 150 extending from collar 156 towards forefoot portion 110 of upper 120. Throat area 150 extends over a dorsal area of a wearer's foot that corresponds generally to the location of a wearer's cuneiform and metatarsal bones. In some embodiments, throat area 150 may define a portion of the opening of void 155 to assist a wearer in inserting and removing his or her foot from void 155. In some embodiments, throat area 150 may define an opening for a tongue 154 that extends between lateral and medial perimeter sides of throat area 150 and moveably opens and closes a portion of void 155 to enhance the adjustability of footwear 100. In some embodiments, throat area 150 may be a "tongue-less" throat area 150.

Upper 120 may also include one or more eyelets 152 formed in a perimeter portion of throat area 150 for securing and tensioning a shoe lace. In some embodiments, eyelets 152 may be integrally formed during formation of upper 120. In some embodiments, eyelets 152 may be separate components coupled to upper 120 via, for example, stitching or an adhesive. A shoe lace may extend through the eyelets 152 and permits a wearer to adjust dimensions of upper 120 to accommodate his or her foot. More particularly, the shoe lace may allow a wearer to tighten or loosen upper 120 around his or her foot. In addition to or alternative to eyelets 152, upper 120 may include other lace-receiving elements, such as loops or hooks.

In some embodiments, upper 120 may include a heel counter 158. Heel counter 158 provides cushioning, support, and/or protection for a wearer's heel and/or Achilles tendon. In some embodiments, heel counter 158 may be a separate piece attached to the reminder of upper 120 via, for example, stitching and/or an adhesive. In some embodiments, heel counter 158 may be an integral component of upper 120. In other words, heel counter 158 may be formed in the same manner as other components of upper 120 (e.g., via a winding process as discussed herein).

With reference to FIG. 1A, for example, upper 120 is coupled to sole 180 at a biteline 160 (i.e., a sole connection area). Together, biteline 160, collar 156, heel counter 158, and a perimeter portion of throat area 150 may define a perimeter portion 162 of upper 120. Perimeter portion 162 may include an outer edge defined by biteline 160 and an inner edge defined by collar 156 and a perimeter of throat area 150. Perimeter portion 162 may define a frame having a shape corresponding to at least a portion of a perimeter shape of upper 120. Portions of upper 120 within perimeter portion 162 include the quarter panels, vamp portion, and toe box portion of upper 120. Thread pattern 122 may define all or a portion of perimeter portion 162 and/or any portion of upper 120 within perimeter portion 162 of upper.

In some embodiments, upper 120 may include a fabric layer 172 disposed on the outer surface and/or the inner surface of thread pattern 122. As used herein, the term "outer surface" or "outer side" refers to the surface of a component that faces away from the foot when worn by a wearer. And "inner surface" or "inner side" refers to the surface of a component that faces toward the foot when worn by a wearer.

In some embodiments, fabric layer 172 may be a woven, non-woven, or knitted polymeric layer. In some embodiments, fabric layer 172 may be a woven, non-woven, or layer composed of thermoplastic polyurethane (TPU), polyester, polyamide, polyethylene (PE), PE foam, polyurethane (PU) foam, and co-polymers or polymer blends including one or more these polymers. In some embodiments, fabric layer 172 may be a bioengineered woven, knitted or layered synthetic spider silk, woven, knitted or layered plant based materials, or woven, knit or layered recycled and/or extruded plastics. In some embodiments, fabric layer 172 may be film or sheet of a polymeric material, such as thermoplastic polyurethane (TPU), polyester, polyamide, polyethylene (PE), PE foam, polyurethane (PU) foam, and co-polymers or polymer blends including one or more these polymers. In some embodiments, fabric layer 172 may include a plurality of layers stacked vertically and/or arranged side-by-side. In some embodiments, the plurality of layers may be laminated. In some embodiments, fabric layer 172 may be a woven, non-woven, or knitted layer for providing cushion and/or thermal insulation for article of footwear 100. In some embodiments, fabric layer 172 may be a sock bootie.

Upper 120 and sole 180 may be configured for a specific type of footwear, including, but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe. Moreover, sole 180 may be sized and shaped to provide a desired combination of cushioning, stability, and ride characteristics to article of footwear 100. The term “ride” may be used herein in describing some embodiments as an indication of the sense of smoothness or flow occurring during a gait cycle including heel strike, midfoot stance, toe off, and the transitions between these stages. In some embodiments, sole 180 may provide particular ride features including, but not limited to, appropriate control of pronation and supination, support of natural movement, support of unconstrained or less constrained movement, appropriate management of rates of change and transition, and combinations thereof.

In some embodiments, sole 180 may include traction elements, such as cleats 182. In some embodiments, sole 180 may include a midsole coupled to an outsole. For example, in reference to FIG. 7, sole 180 may be sole 780 including midsole 782 and outsole 784. Sole 180 and portions thereof (e.g., midsole 782 and outsole 784) may comprise material(s) for providing desired cushioning, ride, and stability. Suitable materials for sole 180 (midsole 782 and/or outsole 784) include, but are not limited to, a foam, a rubber, ethyl vinyl acetate (EVA), expanded thermoplastic polyurethane (eTPU), expandable polyether block amide (ePEBA), thermoplastic rubber (TPR) and a thermoplastic polyurethane (TPU). In some embodiments, the foam may comprise, for example, an EVA based foam or a PU based foam and the foam may be an open-cell foam or a closed-cell foam. In some embodiments, midsole 782 and/or outsole 784 may comprise elastomers, thermoplastic elastomers (TPE), foam-like plastics, and gel-like plastics.

In some embodiments, portions of sole 180 (e.g., midsole 782 and outsole 784) may comprise different materials to provide different characteristics to different portions of sole 180. In some embodiments, midsole 782 and outsole 784 may have different hardness characteristics. In some embodiments, the material density of midsole 782 and outsole 784 may be different. In some embodiments, the moduli of the materials used to make midsole 782 and outsole 784 may be different. As a non-limiting example, the material of outsole 784 may have a higher modulus than the material of midsole 782.

Sole 180 and portions thereof (e.g., midsole 782 and outsole 784) may be formed using suitable techniques, including, but not limited to, injection molding, blow molding, compression molding, and rotational molding. In some embodiments, midsole 782 and outsole 784 may be discrete components that are formed separately and attached. In some embodiments, midsole 782 may be attached to outsole 784 via, for example, but not limited to, adhesive bonding, stitching, welding, or a combination thereof. In some embodiments, midsole 782 may be attached to outsole 784 via an adhesive disposed between midsole 782 and outsole 784.

As shown in FIGS. 1A and 1B, upper 120 includes thread pattern 122. All or a portion of upper 120 may include thread pattern 122. In some embodiments, thread pattern 122 may be a single thread structure defining at least a portion of upper 120. In some embodiments, thread pattern 122 may include a plurality of thread structures coupled together to define at least a portion of upper 120.

Thread pattern 122 may include a plurality of anchor points 134 and a continuous thread 130 fixed at a plurality of anchor points 134. In some embodiments, anchor points 134 may be disposed along a perimeter of upper 120 (e.g., in perimeter portion 162). Such anchor points 134 may be referred to as “peripheral anchor points.” As used herein, “thread” means a material having a length that is substantially larger than its width. A “thread” may be a filament, a fiber, a yarn, a knitted element, a cable, a cord, a fiber tow, a tape, a ribbon, a monofilament, a braid, a string, and other forms of materials which can be spooled and laid down with the same technique.

As used herein, “anchor point” means a location to which a thread or group of thread lines is fixedly attached. A thread or thread line may be wrapped, wound, bonded, or otherwise attached at an anchor point. An anchor point may be a location on an upper (e.g., anchor points 134). For example, an anchor point may be a hole or opening left behind by a structure (e.g., pin, projection, or nub) used to wind continuous thread(s) of a thread pattern. In some embodiments, a thread pattern for an upper may not include any anchor point locations because all the anchor point locations present during winding of the thread pattern have been removed (e.g., cut off the thread pattern). An anchor point may also be a structure (e.g., pin, projection, or nub) used to wind continuous thread(s) of a thread pattern. And the anchor point structure may or may not form a portion of a thread pattern for an upper. For example, a thread pattern for an upper may be removed from anchor points defined by metal pins, but anchor points defined by pins composed of a meltable material may be present in a thread pattern for an upper (after being melted and re-solidified).

Continuous thread 130 may be wrapped around a plurality of anchor points 134 and includes a plurality of thread lines 132. Each thread line 132 extends between two respective anchor points 134. Continuous thread(s) 130 may be wrapped around a plurality of anchor points 134 in tension such that individual thread lines 132 are in tension when wrapped around anchor points 134. In some embodiments, different continuous threads 130 and/or thread lines 132 may be wrapped around anchor points 134 at different tensions to impart desired characteristics to thread pattern 122. By winding continuous(s) threads 130 in tension, thread pattern 122 may bonded while thread lines 132 are under tension such that thread lines 132 are in tension in a bonded thread pattern 122. Bonding thread lines 132 while thread lines 132 are under tension fixes the thread lines 132 in tension within thread pattern 122. Fixing thread lines 132 in tension will result in thread lines 132 wanting to contract when removed from anchor points used to wind thread pattern 122. In cases where a portion of a thread line 132 is not bonded in a fully fixed position, the thread line 132 may contract when removed anchor points. In such embodiments, the portion(s) of the thread line 132 that is/are fixed during a bonding process will be under tension while the other portion(s) will be free to contract, and thus will not be under tension in thread pattern 122. In embodiments where different thread lines 132 were wound at different tensions, different thread lines 132 of thread pattern 122 will be under different values of tension in thread pattern 122. The tension of thread lines 132 may be utilized to control characteristics of thread pattern 122, and therefore upper 120.

The number of thread lines 132 fixed at an anchor point 134 is defined by the "thread line communication number" of an anchor point 134. As used herein, "thread line communication number" means the number of thread lines extending from an anchor point to different anchor points. Two thread lines extending between the same two anchor points (i.e., overlaying thread lines) only counts as "1" for purposes of calculating a thread line communication number for the anchor points. For example, a thread line communication number of five means that an anchor point has five thread lines extending from it with each of the five thread lines leading to another, different anchor point. As another example, a thread line communication number of six means that an anchor point has six thread lines extending from it with each of the six thread lines leading to another, different anchor point.

Anchor points 134 may have a thread line communication number of "X" or more for continuous thread 130. In some embodiments, two or more respective anchor points 134 may have a thread line communication number of "X" or more. In some embodiments, all the anchor points 134 of thread pattern 122 may have a thread line communication number of "X" or more. "X" may be, for example, two, three, four, five, six, seven, eight, nine, ten, or within a range having any two of these values as end points. For example, as show in FIG. 1B, anchor point 134(*a*) has a thread line communication number of six and anchor point 134(*b*) has a thread line communication number of seven.

Thread lines 132 may be bonded at anchor points 134. Thread lines 132 may be bonded at anchor points 134 via an adhesive, a bonding layer, thermal (conductive or convective) heat (e.g., in a heat press or oven), IR (infrared) heating, laser heating, microwave heating, steam, a mechanical fastener (e.g., a clip), hook and loop fasters, needle-punching, hydro-entanglement, ultrasonic/vibratory entanglement, felting, knotting, or by pushing one thread line through the other thread line(s). In some embodiments, thread lines 132 may be directly bonded together at anchor points 134 (e.g., via the polymeric material of continuous thread 130). In some embodiments, thread lines 132 may be directly bonded together at perimeter portion 162 via the polymeric material(s) of continuous thread 130. For example, heat and pressure may be applied to perimeter portion 162 of upper 120 to directly bond thread lines 132 in perimeter portion, and at any peripheral anchor points 134 within perimeter portion 162. In embodiments including direct bonding of thread lines 132 at a perimeter portion and/or anchor points, thread lines 132 are bonded at the perimeter portion and/or anchor points without the use of an adhesive or bonding layer.

In some embodiments, thread lines 132 may be bonded together via a bonding layer. In some embodiments, thread lines 132 may be bonded together at anchor points 134 (e.g., peripheral anchor points) via a bonding layer. In such embodiments, the bonding layer is attached to one or more anchor points 134 and mechanically couples the anchor point(s) 134 to each other. The bonding layer may be, for example, a laminated layer, an adhesive layer, a stitched layer, a cured layer, or a screen-printed layer as described herein. In some embodiments, the lamination layer, adhesive layer, cured layer, or screen-printed layer may serve to encase anchor points 134 in a bonding layer. The bonding layer may bond thread lines 132 via any suitable mechanical bonding technique, for example the bonding techniques discussed in regards to FIGS. 15-19. In some embodiments, thread lines 132 may be bonded together without the use of a bonding layer. For example, in some embodiments, thread lines 132 may be directly bonded together via, for example, but not limited to, local bonding via an adhesive, direct local bonding via material(s) of thread lines 132, needle punching, hydro-entanglement, and ultrasonic/vibratory entanglement.

In some embodiments, the bonding layer may include a perimeter portion defining all or a portion of perimeter portion 162. Perimeter portion 162 illustrates a bonding layer in FIGS. 1A and 1B. Thread lines 132 may extend radially from respective areas of perimeter portion 162. In some embodiments, the respective areas may be areas from which a group of thread lines 132 extends radially (sec e.g., groups 618 and areas 632 in FIG. 6). In some embodiments, the respective areas may be defined by anchor points 134. Thread lines 132 in a group of thread lines may be bonded to perimeter portion 162. The group of thread lines 132 extending from a respective area may include a number "Z" of thread lines. In some embodiments, "Z" may be the same as "X."

In some embodiments, thread lines 132 may be bonded at points where thread lines 132 overlap in thread pattern (i.e., intersection points 136). Thread lines 132 may be bonded at intersection points 136 via an adhesive, a bonding layer, thermal (conductive or convective) heat (e.g., in a heat press or oven), IR (infrared) heating, laser heating, microwave heating, steam, a mechanical fastener (e.g., a clip), hook and loop fasters, needle-punching, hydro-entanglement, ultrasonic/vibratory entanglement, felting, knotting, or by pushing one thread line through the other thread line(s). In some embodiments, thread lines 132 may be directly bonded together at intersection points 136 (e.g., via the polymeric material of continuous thread 130). In embodiments including direct bonding of thread lines 132 at intersection points 136, thread lines 132 are bonded at intersection points 136 without the use of an adhesive or bonding layer. In some embodiments, a bonding layer may bond thread lines 132 together at a plurality of intersection points 136 within thread pattern 122. In embodiments including multiple continuous threads, thread lines of respective continuous threads may be bonded at intersection points between the thread lines, either directly or via a bonding layer.

Upper 120 may include a plurality of thread line groups including "Z" or more thread lines 132 extending radially from respective areas on the outer edge of perimeter portion (e.g., extending radially from biteline 160). Similarly, upper 120 may include a plurality of thread line groups including "Z" or more thread lines 132 extending radially from respective areas on the inner edge of perimeter portion (e.g., extending radially from collar 156 and a perimeter portion of throat area 150).

In some embodiments, continuous thread 130 includes overlaying thread lines 132. As used herein, "overlaying thread lines" means two or more thread lines that follow the same path between two respective anchor points. Overlaying thread lines need not be overlaid directly over each other. Two or more thread lines are considered overlaying as long as they extend between the same two anchor points. Thread pattern 122 may include one or more continuous threads 130 with thread lines 132 crossing over underlying thread line(s) 132 in various directions. The thread lines 132 of thread pattern 122 may not be woven or knitted together. The thread lines 132 of thread pattern 122 may not be embroidered threads stitched to a base layer. Thread lines 132 may be threaded over each other to form a thread network defining a patterned layer for an article of footwear component.

In some embodiments, continuous thread 130 may be a polymer thread. As used herein "polymer thread" means a thread composed at least in part of a polymeric material. In some embodiments, a polymer thread may be composed entirely of one or more polymeric materials. In some embodiments, a polymer thread may include a polymeric material coated around a core (which may or may not be composed of a polymeric material). In such embodiments, the core may be encapsulated by the coating material. In some embodiments, a polymer thread may include a non-polymer core coated, covered, or encapsulated with a polymeric material. In some embodiments, a polymer thread may include a polymer core coated, covered, or encapsulated with a non-polymeric material. In some embodiments, a polymer thread may be a braided thread with one or more braids composed of a polymeric material. In some embodiments, the polymeric material(s) of a polymer thread may be thermoplastic material(s). In some embodiments, continuous thread 130 may be a thread coated with an activatable adhesive, for example a heat activated adhesive.

Suitable polymeric materials for polymer threads discussed herein include, but are not limited to, thermoplastic polyurethane (TPU), a rubber, and silicone. In some embodiments, the TPU may be recycled TPU. In some embodiments, the polymeric material may be a photo-reactive (infrared or ultraviolet light reactive) polymeric material, such as a photo-reactive TPU. In some embodiments, the polymeric material may be soluble (e.g., water-soluble). In embodiments including polymer threads with a coated core, suitable materials for the core include, but are not limited to, polyester, nylon, ultra-high molecular weight polyethylene (e.g., DYNEEMA® (a type of ultra-high molecular weight polyethylene)), carbon fiber, KEVLAR® (a type of para-aramid), bioengineered woven, knit or layered materials (e.g., synthetic spider silk), woven, knit or layered plant based materials, knit or layered recycled and/or extruded plastics, cotton, wool, and natural or artificial silk. In some embodiments, polymer threads may be thermoplastic polyurethane coated polyester threads produced by Sambu Fine Chemical Co., Ltd. of Korea. In some embodiments, continuous thread 130 may be a non-polymer thread composed of non-polymer materials, such as carbon fiber, cotton, wool, or silk. In some embodiments, polymer threads may be a thermoplastic melt yarn, polymer yarn with non-melt core, and other similar types of yarn.

In some embodiments, upper 120, and thread pattern 122, includes more than one continuous thread. For example, as shown in FIGS. 1A and 1B, thread pattern 122 includes a second continuous thread 170. Second continuous thread 170 has the same or different characteristics as first continuous thread 130. And second continuous thread 170 may be incorporated into thread pattern 122 in the same manner as first continuous thread 130. Like first continuous thread 130, second continuous thread 170 includes thread lines extending radially from respective areas of perimeter portion 162. In some embodiments, the respective areas may be areas from which a group of thread lines extends radially (sec e.g., groups 628 and areas 632 in FIG. 6). In some embodiments, the respective areas may be defined by anchor points 134. Also similar to continuous thread 130, thread lines in a group of thread lines may be bonded in perimeter portion 162 (e.g., via bonding layer of perimeter portion 162).

Like continuous thread 130, continuous thread 170 may include a plurality of thread lines wound around and extending between two respective peripheral anchor points 134. And anchor points 134 may have a thread line communication number of "Y" or more for second continuous thread 170. The thread line communication number for second continuous thread 170 may be the same as or similar to the thread line communication number for continuous thread 130. "Y" may be less than "X", more than "X", or the same as "X".

In some embodiments, first continuous thread 130 may be composed of the same material(s) as second continuous thread 170. In some embodiments, first continuous thread 130 may be composed of different material(s) than second continuous thread 170. The material(s) of different continuous threads in a thread pattern may be selected to provide targeted characteristics to areas of a thread pattern, and therefore an upper. In embodiments including polymer thread(s) having a core coated with a polymeric material, the material of the core for different continuous threads may be different or the same. And the material of the core for different continuous threads may be selected to provide targeted characteristics to different areas of a thread pattern, and therefore an upper. Similarly, for braided threads, the material(s) of the braided thread(s) may be selected to provide targeted characteristics to different areas of a thread pattern, and therefore an upper.

In some embodiments, continuous threads of a thread pattern may have a denier in the range of 1 denier to 3000 denier, including subranges. For example, continuous threads may have a denier of 1, 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, or 3000 denier, or within any range having any two of these values as endpoints. In some embodiments, continuous threads of a thread pattern may have a denier in the range of 100 denier to 2000 denier. In some embodiments, continuous threads of a thread pattern may have a denier in the range of 300 denier to 1200 denier.

In some embodiments, the denier of continuous thread(s) in a thread pattern may be selected to provide varying degrees of a characteristic (e.g., strength or stretchability) to different areas of the thread pattern. In embodiments including coated threads, the denier of the core material and/or the overall denier of the continuous thread(s) may be selected to provide varying degrees of a characteristic (e.g., strength or stretchability) to different areas of a thread pattern. As a non-limiting example, a larger overall diameter or a larger core diameter for a given continuous thread may increase the degree of directional strength imparted by the given continuous thread within a thread pattern.

While FIGS. 1A and 1B show thread pattern 122 including two continuous threads (130 and 170), thread pattern 122 may include any suitable number of continuous threads, such as for example, three, four, five, six, seven, eight, nine, ten, fifteen, or twenty continuous threads. Additional continuous threads may be the same as or different from continuous threads 130 and 170. And additional continuous threads may be incorporated into thread pattern 122 in the same manner as continuous threads 130 and 170. Additional continuous threads may be wound around and extended between anchor points 134 in the same fashion as continuous threads 130 and 170.

In embodiments including a plurality of continuous threads, each wound continuous thread may define a layer of thread pattern 122. For example, a layer defined by wound continuous thread 130 may define a first layer of thread pattern 122 and a layer defined by wound continuous thread 170 may define a second layer of thread pattern 122. And different layers of a thread pattern may be disposed over each other in areas of overlap between the two layers. For example, a first layer defined by continuous thread 130 may be disposed over a second layer defined by continuous thread 170, or vice versa, in areas of overlap between the two layers. Different layers defined by different continuous wound threads may provide different characteristics to different areas of upper 120.

In some embodiments, one or more of the layers of thread pattern 122 defined by a wound continuous thread may serve to bond other layers of thread pattern 122 together. In such embodiments, these one or more layers may be wound using a polymeric thread, which when heated, bonds other layers of thread pattern 122 together at anchor points and other intersection points between continuous threads. For example, in a thread pattern 122 including three layers, each defined by a continuous thread, one of the three continuous threads (e.g., the middle continuous thread) may be a polymeric thread that serves to bond all three threads together. In some embodiments, one or more of the layers of thread pattern 122 may be defined by a wound continuous thread coated or impregnated with an adhesive. In some embodiments, the adhesive may be activated with the application of heat. In some embodiments, the adhesive may be a dissolvable adhesive that, when contacted with a solvent, such as water, fully or partially dissolves to bond continuous threads. In some embodiments, one or more layers of thread pattern 122 may be defined by a wound continuous thread that is a braided or twisted thread including a polymeric and/or adhesive thread braided or twisted with a non-polymeric or non-adhesive thread. In such embodiments, the braided or twisted polymeric and/or adhesive thread may serve to bond thread lines 132 at anchor points 134 and/or intersection points 136.

In some embodiments, thread pattern 122 may define at least 10%, at least 20%, at least 30%, at least 40%, at least 50%, at least 60%, at least 70%, at least 80%, or at least 90% of a component of upper 120. In some embodiments, thread pattern 122 may occupy at least 10%, at least 20%, at least 30%, at least 40%, at least 50%, at least 60%, at least 70%, at least 80%, or at least 90% of the outer surface area of upper 120. In some embodiments, thread pattern 122 may be visibly exposed on the outer surface of upper 120. In some embodiments, no lamination layer or supporting textile layer is disposed over thread pattern 122 on the outer surface of upper 120. In some embodiments, thread pattern 122 may be devoid of a lamination layer.

Thread pattern 122 may provide targeted characteristics (e.g., strength, support, propulsion, breathability, comfort (stretchability), tackiness, abrasion resistance, texture, haptics, and durability) to areas of upper 120. In some embodiments, thread pattern 122, or a portion thereof, may provide a first degree of a characteristic in one area of upper 120 and a second degree of that characteristic in a second area of upper 120.

For example, in some embodiments, thread pattern 122, or a portion thereof, may have a first degree of stretchability or strength in a longitudinal direction between forefoot end 102 and heel end 104 of upper 120 and a second degree of stretchability or strength in a transverse direction between a medial side 106 and a lateral side 108 of upper 120. In some embodiments, the first degree of stretchability or strength may be greater than the second degree of stretchability or strength. In some embodiments, the first degree of stretchability or strength may be less than the second degree of stretchability or strength. In some embodiments, the stretchability or strength of thread pattern 122 may be configured to have an angled stretchability or strength (i.e., a maximum or minimum stretchability or strength in a direction between the longitudinal direction and the transverse direction). In some embodiments, different degrees and/or directions of stretchability or strength in different sections/areas of upper 120 may be used to create angled stretchability or strength for upper 120 as a whole.

As another example, thread pattern 122, or a portion thereof, may have a first degree of breathability or tackiness in heel portion 114 of upper 120 and a second degree of breathability or tackiness in forefoot portion 110 of upper 120. In some embodiments, the first degree of breathability or tackiness may be greater than the second degree of breathability or tackiness. In some embodiments, the first degree of breathability or tackiness may be less than the second degree of breathability or tackiness.

Figure 2:
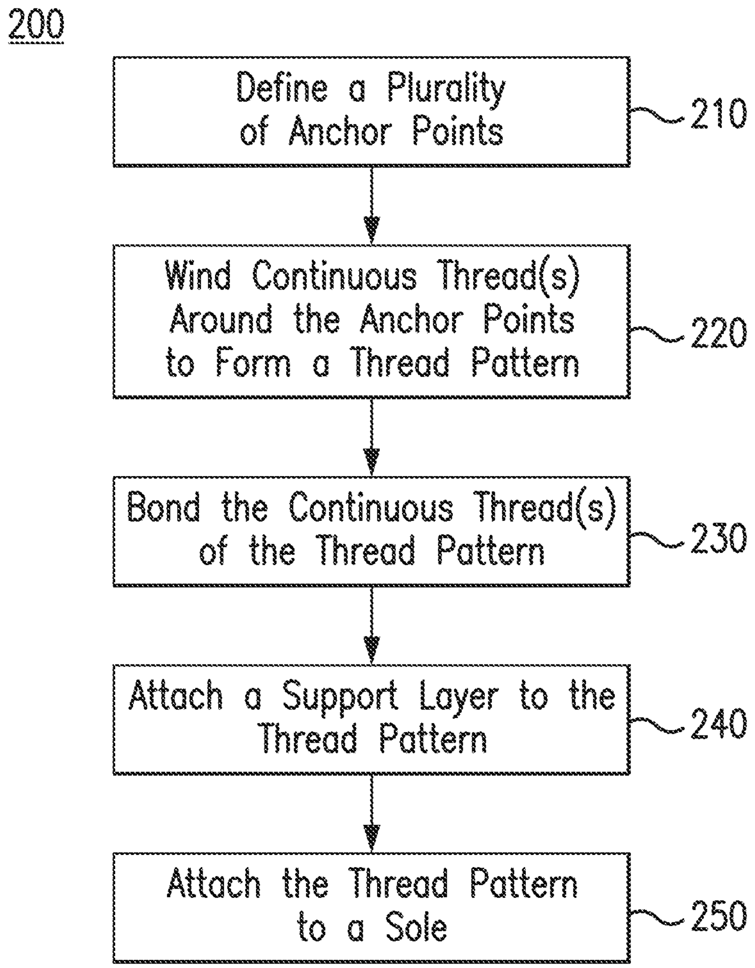
FIG. 2 is an exemplary flowchart of a method of according to some embodiments.

FIG. 2 shows a method 200 of making an upper (e.g., upper 120), and an article of footwear (e.g., article of footwear 100) according to some embodiments. In step 210, a plurality of anchor points (e.g., anchor points 134) may be defined. The anchor points may be peripheral anchor points. In some embodiments, the anchor points may include interior anchor points as discussed herein (see interior anchor points 650 in FIG. 6).

In step 220, one or more continuous threads (e.g., continuous thread 130) may be wound (wrapped) around the defined anchor points such that individual thread lines (e.g., thread lines 132) of the continuous thread(s) extend between two respective anchor points. Winding continuous thread(s) in step 220 forms a desired thread pattern (e.g., thread pattern 112). During winding step 220, anchor points are defined by fixed or moveable members, such as pins, projections, nubs, or shafts coupled to a support structure (e.g., pins 1250 coupled to pin assembly plate 1250). These fixed members serve to support continuous thread(s) during winding step 220. For example, thread(s) may be wound around anchor points on a plate, a three-dimensional object (e.g., a last), or a frame as discussed herein. In some embodiments, the plate, object, or frame may be held stationary and a winding device may wind thread(s) around stationary anchor points. In some embodiments, the plate, object, or frame may move relative to a stationary thread source during winding.

Figure 6:
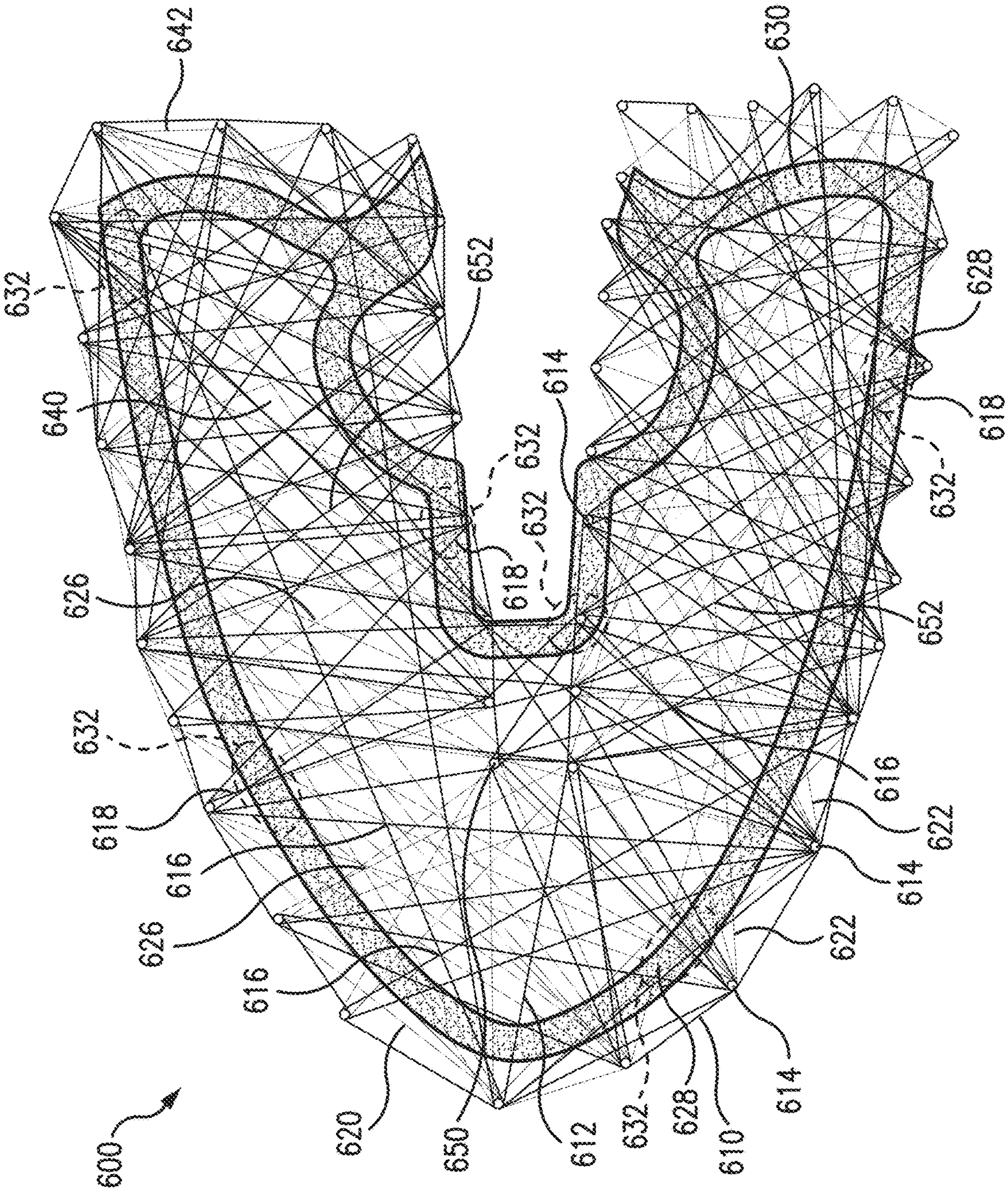
FIG. 6 shows a thread pattern with a bonding layer according to some embodiments.

The anchor point locations about which one or more continuous threads are wound (wrapped) in step 220 may be temporary structures that are removed from a thread pattern defining an upper, or may be present in a thread pattern defining an upper. Portions of a thread pattern having one or more temporary anchor point locations may be cut from, or otherwise removed from, a thread pattern when shaping a thread pattern into an upper. In such embodiments, a thread pattern for a finished upper will have a fewer number of anchor point locations than the number of anchor point locations used in winding the thread pattern. For example, anchor points in excess thread pattern 642 of on exterior side of bonding layer 630 in FIG. 6 are temporary anchor point locations removed from a thread pattern when forming an upper.

In step 230, the continuous thread(s) are bonded within the thread pattern. In some embodiments, continuous thread(s) may be bonded at points of intersection between thread lines via, for example, an adhesive, a bonding layer, thermal (conductive or convective) heat (e.g., in a heat press or oven), IR (infrared) heating, laser heating, microwave heating, steam, a mechanical fastener (e.g., a clip), hook and loop fasters, needle-punching, hydro-entanglement, ultrasonic/vibratory entanglement, felting, knotting, or by pushing one thread line through the other thread line(s). In some embodiments, continuous thread(s) may be bonded at the anchor points via, for example, an adhesive, a bonding layer, thermal (conductive or convective) heat (e.g., in a heat press or oven), IR (infrared) heating, laser heating, microwave heating, steam, a mechanical fastener (e.g., a clip), hook and loop fasters, needle-punching, hydro-entanglement, ultrasonic/vibratory entanglement, felting, knotting, or by pushing one thread line through the other thread line(s). In some embodiments, step 230 includes the formation of a bonding layer for bonding thread lines together.

In some embodiments, method 200 may include multiple winding steps 220 and multiple bonding steps 230. For example, a portion of a thread pattern may be wound in a first winding step 220 and then that portion may be bonded in a first bonding step 230. Then a second portion of a thread pattern may be wound in a second winding step 220 and then that portion may be bonded in a second bonding step 230. In some embodiments, bonding step 230 may include a preliminary bonding step to hold the pattern of a thread pattern until a final bonding step is performed. For example, a preliminary bonding step may allow a thread pattern to be removed from anchor point pins and be finally bonded after removal.

In some embodiments, steps 220 and 230 are performed in the absence of a base layer disposed between the thread pattern and the support structure (e.g., pin assembly plate 1250). As used herein "base layer" means a layer of material employed to facilitate the placement or arrangement of threads when winding and/or bonding a thread pattern. A base layer may be a layer to which threads are bonded, stitched, woven into, printed on, deposited on, or otherwise in contact with during manufacturing of a thread pattern. A layer attached to a thread pattern after formation of the thread pattern is complete is not considered a base layer.

In some embodiments, a support layer may be attached to a thread pattern in step 240. In some embodiments, the support layer attached in step 240 may be a fabric layer 172 discussed herein. In some embodiments, the thread pattern may be attached to a sole in step 250 to form an article of footwear. In some embodiments, continuous thread(s) of the thread pattern may be directly attached to a sole in step 250 via, for example, stitching, an adhesive, a lamination process, or a heat pressing process. In some embodiments, the bonding layer of a thread pattern may be attached to a sole in step 250 via, for example, stitching, an adhesive, a lamination process, or a heat pressing process. In embodiments including a support layer, the support layer may additionally or alternatively be attached to the sole in step 250. In some embodiments, step 250 may include shaping a thread pattern into the shape of an upper (e.g., by cutting excess portions of a thread pattern to for a thread pattern with a perimeter shape for an upper).

In some embodiments, the anchor points in step 210 may be defined by pins coupled to and extending from a supporting structure, such as a plate, platform, or three-dimensional object. In some embodiments, the three-dimensional object may be a last or other three dimensional object having a volumetric shape corresponding to the shape of a human foot. In operation, the pins defining the anchor points are configured to support the continuous thread(s) during winding in step 220.

Figure 3:
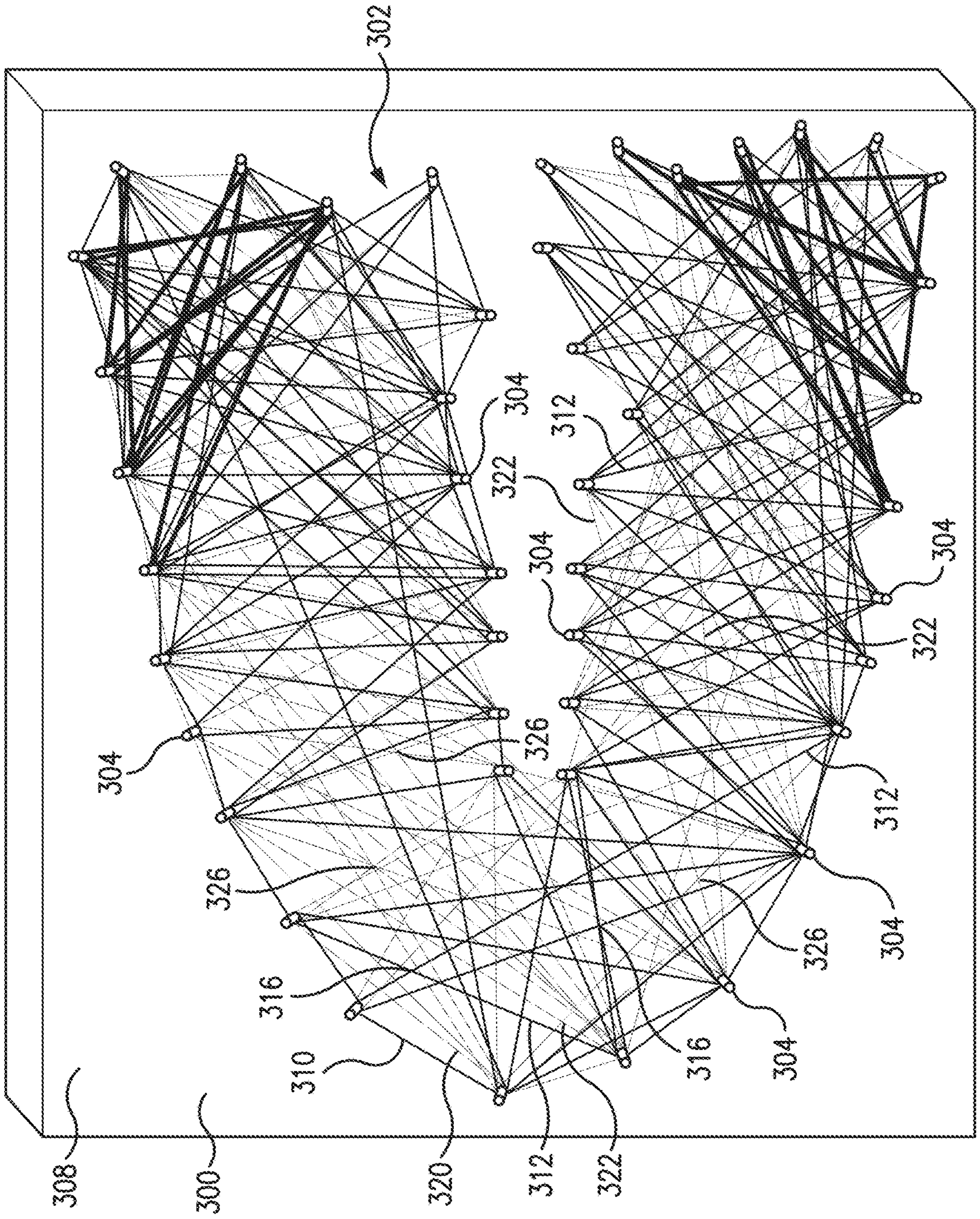
FIG. 3 shows a thread pattern and a pin assembly plate according to some embodiments.

FIG. 3 shows continuous threads 310 and 320 wound around anchor point pins 304 coupled to a pin assembly plate 300 to define a thread pattern 302. Thread pattern 302 in FIG. 3 is a representative exemplary thread pattern. Any thread pattern discussed herein (e.g., thread pattern 122) may be wound around anchor point pins 304 coupled to pin assembly plate 300. Anchor point pins 304 extend from an upper surface 308 of pin assembly plate 300 and serve to support continuous threads 310 and 320 during winding of thread pattern 302. Anchor point pins 304 may be peripheral anchor point pins 304 arranged in a peripheral area corresponding to a perimeter portion of an upper. In some embodiments, anchor point pins 304 may include interior anchor point pins. In some embodiments, pin assembly plate 300 may be pin assembly plate 1200 discussed in regards to FIGS. 12A-C.

First continuous thread 310 may be wound about anchor point pins 304 with thread lines 312 extending between two respective anchor point pins 304. In other words, first continuous thread 310 may be wrapped around a first anchor point pin 304, threaded to a second anchor point pin 304, wrapped around the second anchor point pin 304, threaded to a third anchor point pin 304, wrapped around the third anchor point pin 304, and so on.

Similar to first continuous thread 310, second continuous thread 320 may be wound around anchor point pins 304 with thread lines 322 extending between two respective anchor point pins 304. A continuous thread wrapped or wound around an anchor point pin (or other anchor point members discussed herein) need not be wrapped or wound completely (i.e., 360 degrees) around a perimeter of the pin. A continuous thread wrapped or wound around an anchor point pin may be wrapped or wound around only a portion of a pin. For example, a continuous thread wrapped or wound around a pin may be wrapped or wound around 25% (90 degrees) of a pin's perimeter, 50% (180 degrees) of a pin's perimeter, 75% (270 degrees) of a pin's perimeter, or 100% (360 degrees) of a pin's perimeter. In some embodiments, a continuous thread may be wrapped or wound around a pin's perimeter more than once before being threaded to the next pin. For example, a continuous thread may be wrapped or wound around a pin's perimeter one and a half times (540 degrees) or twice (720 degrees) before being threaded to the next pin.

Continuous threads 310 and 320 may be wrapped around any number of anchor point pins 304 to define thread pattern 302. In some embodiments, continuous thread 310 and/or continuous thread 320 may be wrapped or wound around a single anchor point pin 304 more than once during winding in step 220. For example, during winding in step 220, first continuous thread 310 may be wrapped around a first anchor point pin 304, threaded to and wrapped around a second anchor point pin 304, thread to and wrapped around a third anchor point pin 304, and threaded to and wrapped around the first anchor point pin 304 again. As another example, during winding in step 220, first continuous thread 310 may be wrapped around a first anchor point pin 304, threaded to and wrapped around a second anchor point pin 304, and threaded to and wrapped around the first anchor point pin 304 again. In such embodiments, this creates overlaying thread lines 312.

During winding in step 220, thread lines 312 of first continuous thread 310 may overlap each other at intersection points 316. Similarly, thread lines 322 of second continuous thread 320 may overlap each other at intersection points 326. In bonding step 230, thread lines 312 and/or 322 may be bonded at intersection points 316 and 326, respectively. Each anchor point pin 304 may have a thread line communication number for first continuous thread 310 and second continuous thread 320 as discussed herein.

Figure 4A:
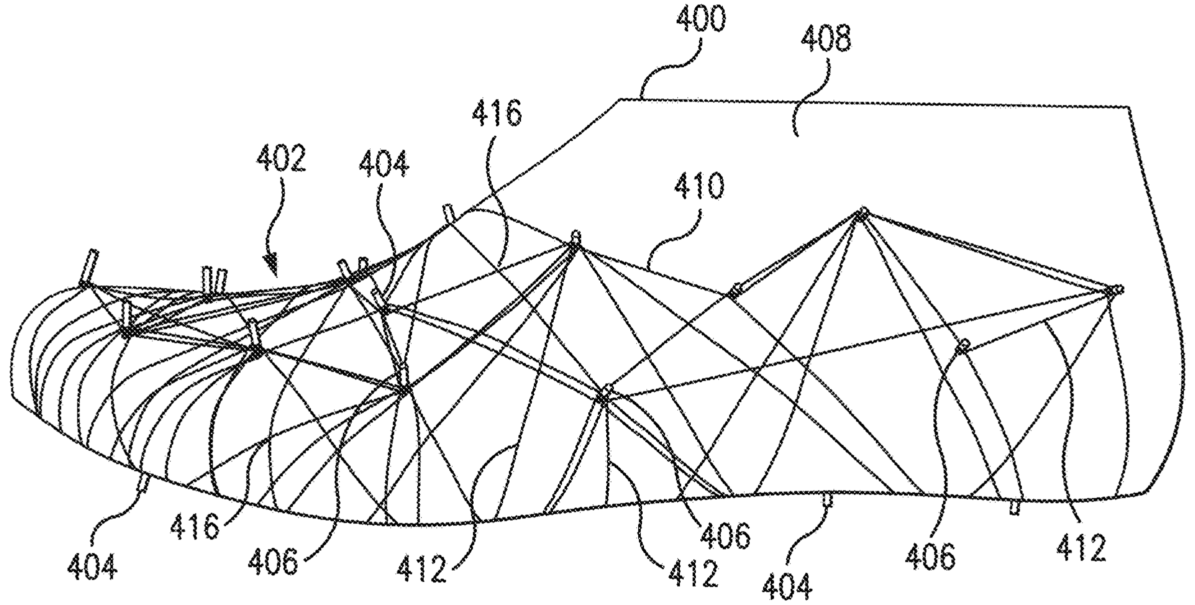
FIG. 4A shows a side view of a thread pattern and a three dimensional pin assembly object according to some embodiments.
Figure 4B:
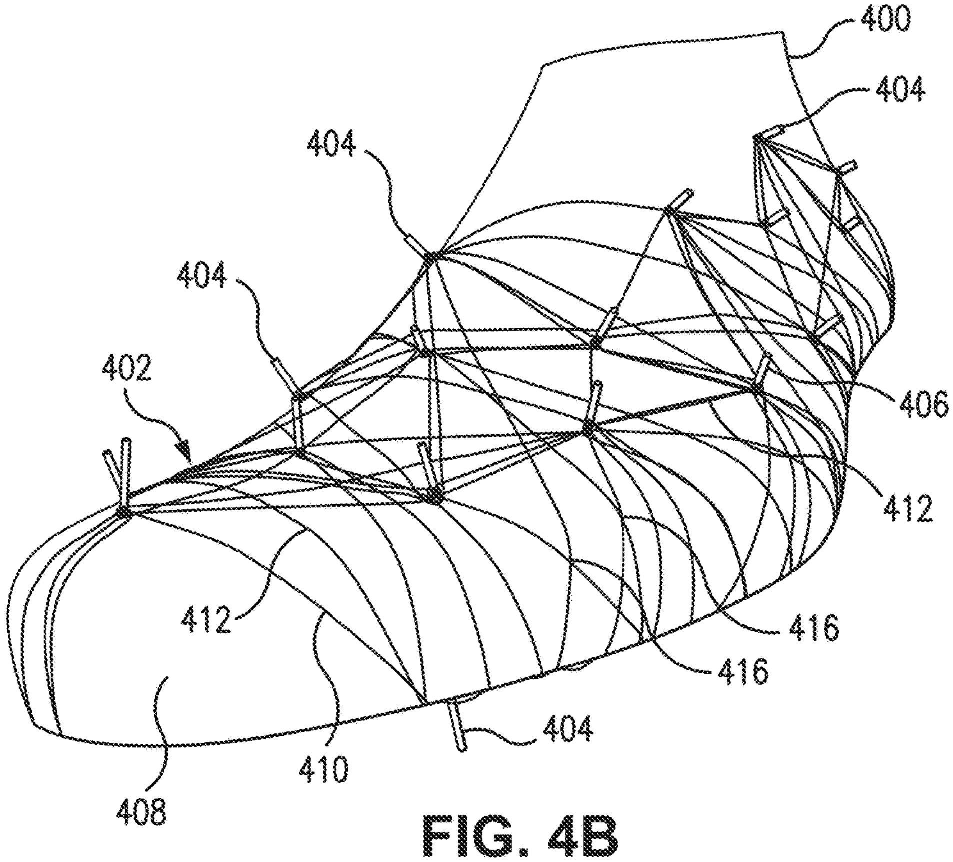
FIG. 4B shows a perspective view the thread pattern and the three dimensional pin assembly object of FIG. 4A.

FIGS. 4A and 4B show continuous thread 410 wrapped around peripheral anchor point pins 404 and interior anchor point pins 406 coupled to a three dimensional object 400 to define a thread pattern 402. Thread pattern 402 in FIGS.

4A-4B is representative exemplary thread pattern. Any thread pattern discussed herein (e.g., thread pattern 122) may be wound around anchor points pins 404/406 coupled to three dimensional object 400. Anchor point pins 404 and 406 extend from an exterior surface 408 of three dimensional object 400 and serve to support continuous thread(s) during winding of thread pattern 402.

Peripheral anchor point pins 404 may be arranged in a peripheral area corresponding to a perimeter portion of an upper including thread pattern 402. Interior anchor point pins 406 may be disposed in the area between peripheral anchor point pins 404 (i.e., within perimeter portion 162 of upper 120, including the quarter panels, vamp portion, and toe box portion of upper 120 including thread pattern 402). Interior anchor point pins 406 may be arranged to provide additional points for fixing thread lines in a thread pattern. These additional points may provide desired characteristics to corresponding areas of a thread pattern, and therefore an upper. Interior anchor points, such as interior anchor point pins 406 may be utilized in the formation of any thread pattern discussed herein.

Similar to first continuous thread 310, continuous thread 410 may be wound around anchor point pins 404 and 406 with thread lines 412 extending between two respective anchor point pins 404/406. For example, continuous thread 410 may be wrapped around a first anchor point pin 404, threaded to a second anchor point pin 406, wrapped around the second anchor point pin 406, threaded to a third anchor point pin 404, wrapped around the third anchor point pin 404, and so on.

Also similar to continuous thread 310, continuous thread 410 may be wrapped around any number of anchor point pins 404/406 to define thread pattern 402. In some embodiments, continuous thread 410 may be wrapped or wound around a single anchor point pin 404/406 more than once during winding in step 220. Further, during winding in step 220, thread lines 412 of continuous thread 410 may overlap each other at intersection points 416. And each anchor point pin 404/406 may have a thread line communication number for continuous thread 410. In bonding step 230, thread lines 412 may be bonded at anchor points 404/406 and/or intersection points 416.

In some embodiments, padding may be incorporated into a thread pattern for providing cushioning, support, and/or protection to areas of an upper. In some embodiments, padding may be incorporated into a thread pattern prior to bonding in step 230. Padding may be incorporated into one or more areas of an upper (e.g., upper 120), such as but not limited to, the throat area 150 of upper 120, collar 156 of upper 120, heel counter 158 of upper 120, biteline 160 of upper 120, quarter panels of upper 120, vamp portion of upper 120, and toe box portion of upper 120.

Figure 5:
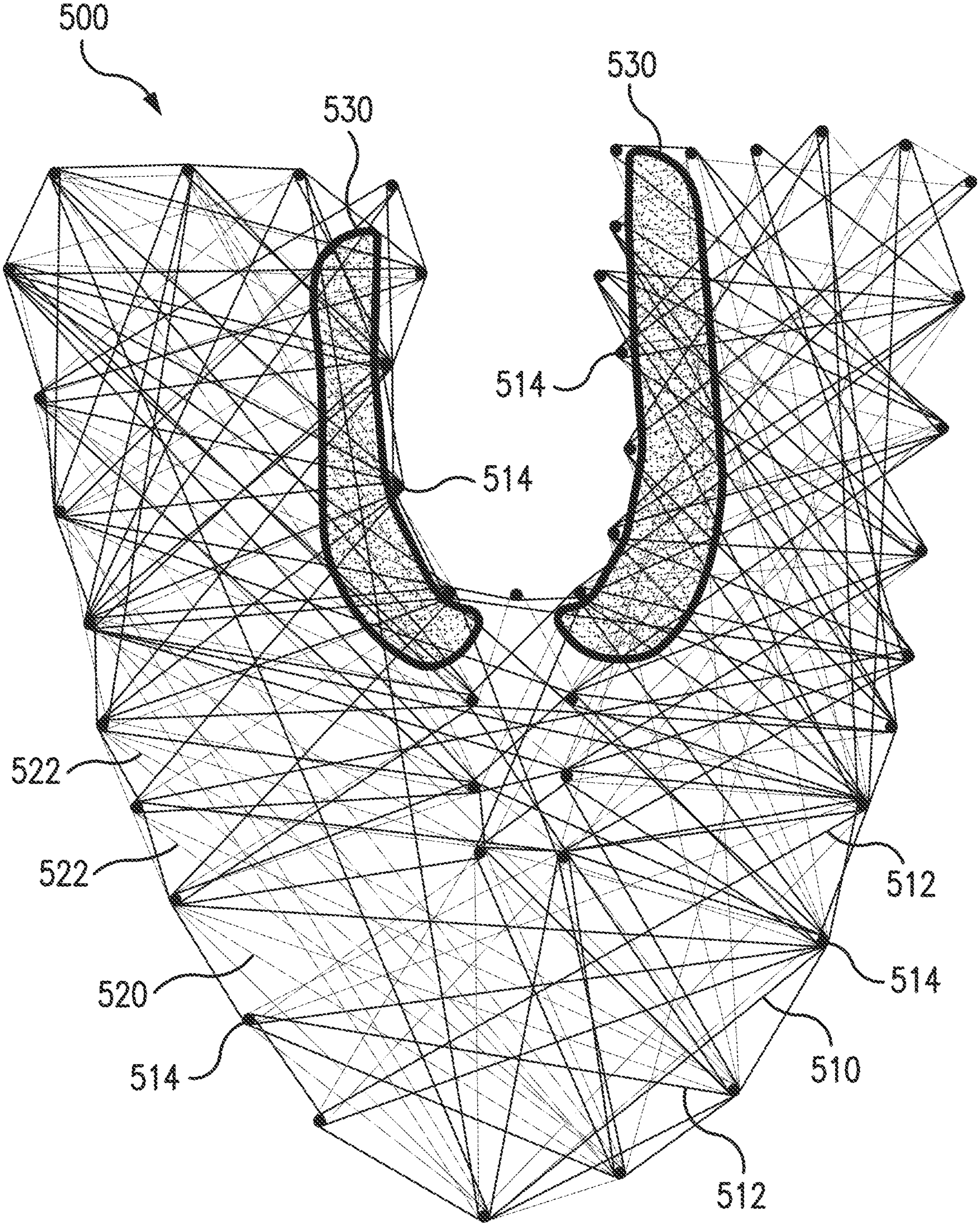
FIG. 5 shows a thread pattern with cushioning elements according to some embodiments.

FIG. 5 shows an exemplary thread pattern 500 including padding elements 530 according to some embodiments. Thread pattern 500 in FIG. 5 is representative exemplary thread pattern. Any thread pattern discussed herein (e.g., thread pattern 122) may include padding elements 530. Thread pattern 500 may be made using method 200 and may be used to construct an upper (e.g., upper 120) as discussed herein.

Similar to other thread patterns discussed herein, thread pattern 500 includes first and second continuous threads 510 and 520 wound around anchor points 514 with thread lines 512 and 522 extending between two respective anchor points 514. Thread lines 512 of first continuous thread 510 may overlap each other at intersection points 516. Similarly, thread lines 522 of second continuous thread 520 may overlap each other at intersection points 526.

In some embodiments, padding elements 530 may be disposed within thread pattern 500 vertically between thread lines 512 of first continuous thread 510 and/or thread lines 522 of second continuous thread 520. In such embodiments, padding elements 530 may be suspended between thread lines 512/522 of thread pattern 500. For example, in some embodiments, some thread lines 512 may be disposed above (i.e., on the outer side of) padding elements 530 and some thread lines 512 may be disposed below (i.e., on the inner side of) padding elements 530 to support padding elements within thread pattern 500. As another example, in some embodiments, some thread lines 522 may be disposed above padding elements 530 and some thread lines 522 may be disposed below padding elements 530 to support padding elements within thread pattern 500. As another example, in some embodiments, some thread lines 512 may be disposed above padding elements 530 and some thread lines 522 may be disposed below padding elements 530. Padding elements 530 may be composed of, for example, neoprene, ePEBA, eTPU, EVA, TPU, or a foam, such as polyethylene foam, polyurethane foam, or a urethane foam. Padding elements 530 may be placed within thread pattern 500 during winding step 220 so as to suspend padding elements 530 within thread pattern 500.

Figure 7:
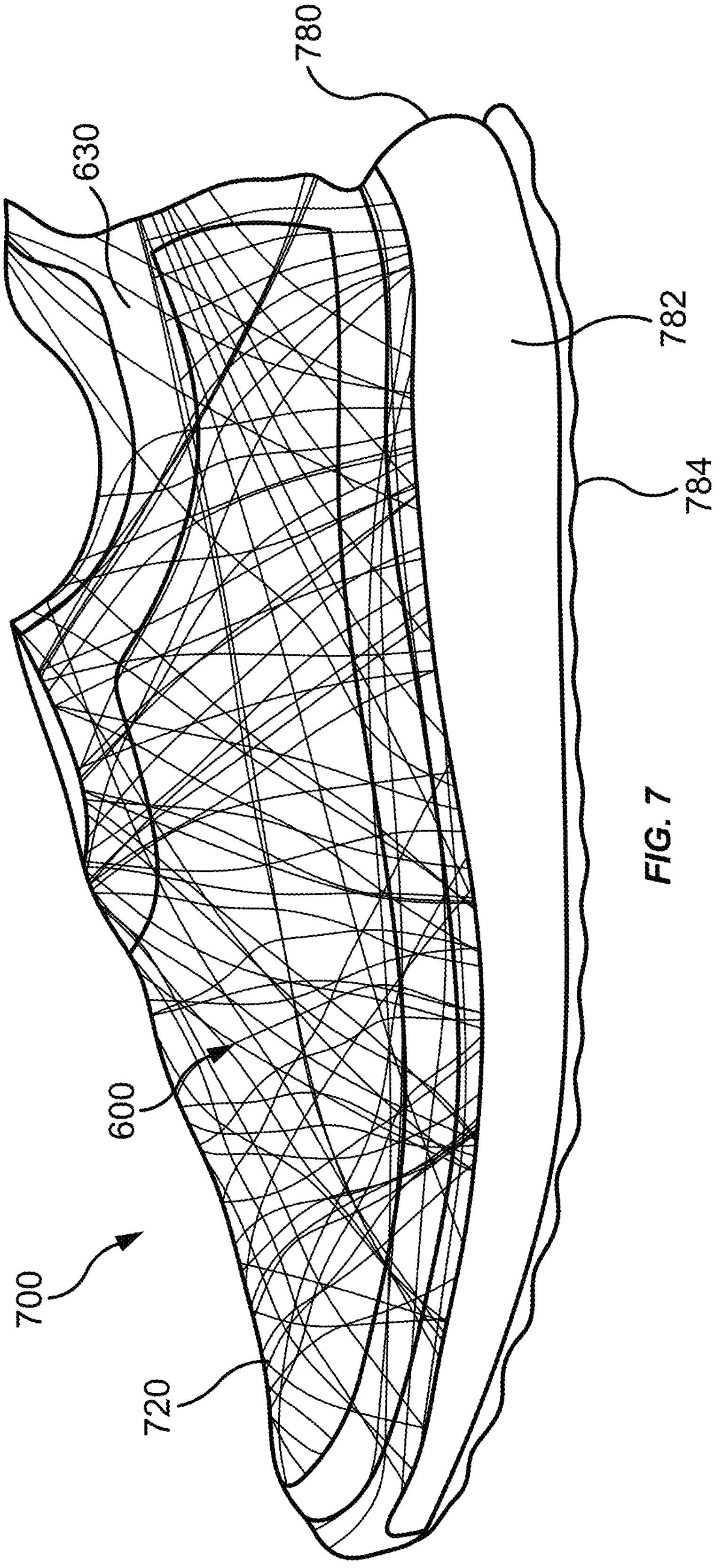
FIG. 7 shows an article of footwear according to some embodiments.

After winding one or more continuous threads in step 220 to form a thread pattern, thread lines of a thread pattern may be bonded to mechanically set the thread pattern. Thread lines may be bonded at one or more anchor points, one or more intersection points, and/or in an area corresponding to bonding layer (e.g., perimeter portion 162 of upper 120). FIGS. 6 and 7 show a thread pattern 600 bonded at select anchor points 614, intersection points 616/626/652 between thread lines, and a bonding layer 630 according to some embodiments. Thread pattern 600 in FIG. 6 is representative exemplary thread pattern. Any thread pattern discussed herein (e.g., thread pattern 122) may include a bonding layer like bonding layer 630.

Thread pattern 600 may be made using method 200 and may be used to construct an upper (e.g., upper 120) as discussed herein. Similar to other thread patterns discussed herein, thread pattern 600 includes first and second continuous threads 610 and 620 wound around anchor points 614/650 with thread lines 612 and 622 extending between two respective anchor points 614. Thread lines 612 of first continuous thread 610 may overlap each other at intersection points 616. Similarly, thread lines 622 of second continuous thread 620 may overlap each other at intersection points 626. Anchor points 614 are peripheral anchor points and anchor points 650 are interior anchor points disposed between peripheral anchor points 614.

Bonding layer 630 is configured to bond thread line groups 618 of thread lines 612 and/or thread line groups 628 of thread lines 622 at respective areas 632 of bonding layer 630. Thread line groups 618/628 bonded at respective areas 632 may extend radially from areas 632. In some embodiments, bonding layer 630 may coincide with one or more anchor points 614. In such embodiments, groups of thread lines 612 and/or 622 may be bonded at areas 632 of bonding layer 630 including anchor points 614. In such embodiments, groups of thread lines 612 and/or 622 may be bonded at areas 632 of bonding layer 630 including anchor points 650. In some embodiments, bonding layer 630 may bond groups of thread lines 618 and/or 628 at respective areas 632 that do not coincide with anchor points 614 and/or anchor points 650. FIG. 20C illustrates a bonding layer 630 that does not coincide with any anchor points according to some embodiments.

In addition to bonding layer 630, thread lines 612 and 622 may be bonded together at intersection points 616 and 626, respectively, or intersection points 652 between thread lines 612 and 626 via for example, an adhesive, a bonding layer, thermal (conductive or convective) heat (e.g., in a heat press or oven), IR (infrared) heating, laser heating, microwave heating, steam, a mechanical fastener (e.g., a clip), hook and loop fasters, needle-punching, hydro-entanglement, ultrasonic/vibratory entanglement, felting, knotting, or by pushing one thread line through the other thread line(s). In some embodiments including a continuous thread 610 and/or 620 composed of a polymeric material, the polymeric material of continuous thread 610 and/or 620 may directly bond thread lines 612 and/or 622 at intersection points. In such embodiments, the polymeric material of continuous thread 610 and/or 620 serves to bond thread lines 612/622 at intersection points.

FIG. 7 shows thread pattern 600 bonded to a sole 780 and defining an upper 720 for an article of footwear 700 according to some embodiments. After bonding thread pattern 600 in step 230, and optionally attaching a support layer to thread pattern in step 240, excess thread pattern 642 on exterior side of bonding layer 630 may be removed (e.g., via a cutting process) leaving only interior portion 640 of thread pattern 600 and bonding layer 630. Then, thread pattern 600 (and the optional support layer) may be coupled to a sole in step 240.

In some embodiments, a thread model may be used to create a thread pattern for winding step 220. A thread model may be created manually or automatically based on desired characteristics for a footwear component (e.g., an upper) or may be computer generated based on desired characteristics for a footwear component. Desired characteristics include both aesthetic and functional characteristics. A thread model may define one or more of: (a) the location of anchor points (peripheral and/or interior) for a thread pattern, (b) the number of anchor points (peripheral and/or interior) for a thread pattern, (c) the number of continuous threads for a thread pattern, (d) the thread line communication number for each continuous thread at each anchor point in a thread pattern, (e) which respective anchor points are connected by a thread line (and thus directional orientation of individual thread lines) within a thread pattern, (f) the number of times which respective anchor points are connected by thread lines in a thread pattern, (g) the number of intersection points between thread lines, (h) the tension at which a continuous thread is wound in a thread pattern, and (i) the material(s) of continuous threads within a thread pattern. In some embodiments, a thread model may be used as a template for hand winding continuous thread(s) into a thread pattern. In some embodiments, a thread model may be sent to an automated machine, such as a CNC (Computer Numerical Control) machine, and converted into machine readable instructions for winding a thread pattern.

In some embodiments, biometric data may be used to generate a thread model for a thread pattern. In such embodiments, winding step 220 may include collecting a biometric data profile for an individual (e.g., individual 2300 shown in FIG. 22), or group of individuals. In some embodiments, a biometric data profile may be collected by scanning a foot, by measuring a foot. In some embodiments, a biometric data profile may include foot geometry data, foot volume data, and/or dynamic changes in foot characteristics during an activity.

In some embodiments, a biometric data profile may be collected using a physiological and personal characteristic collection and analysis system, such as a RUN GENIE® system. In some embodiments, the biometric data profile may be collected using the data collection and analysis system described in U.S. patent application Ser. No. 14/579,226, filed on Dec. 22, 2014, and published as US 2016/0180440, which is hereby incorporated by reference in its entirety by reference thereto. In some embodiments, a biometric data profile may include data related to an individual's gait collected using a VICON® Motion Capture System with force plates. In some embodiments, a biometric data profile may include a digital last created according to the processes described U.S. patent application Ser. No. 15/478,902, filed on Apr. 4, 2017, and published as US 2017/0280828, which is hereby incorporated by reference in its entirety by reference thereto. In some embodiments, biometric data may include strain data for an article of footwear collected using an ARAMIS system from GOM mbH.

Figure 24A:
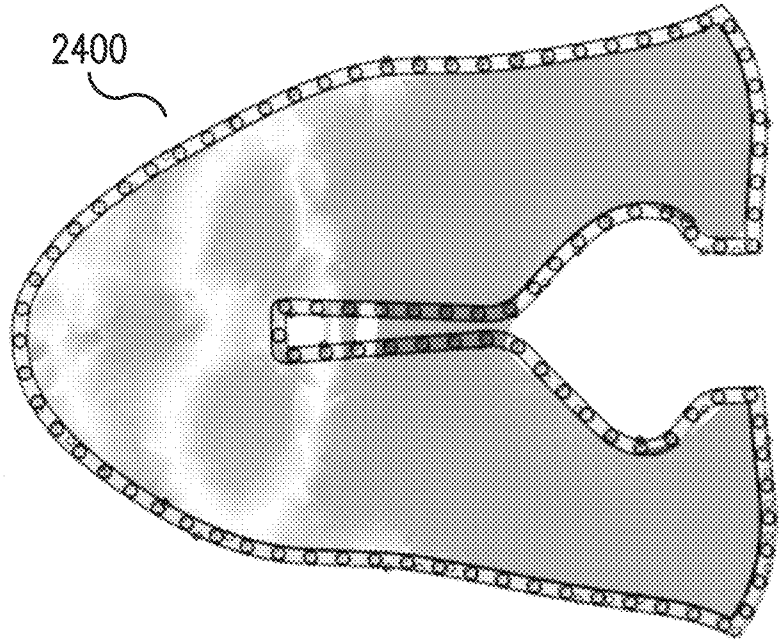
FIG. 24A shows an exemplary strain data map.
Figure 24B:
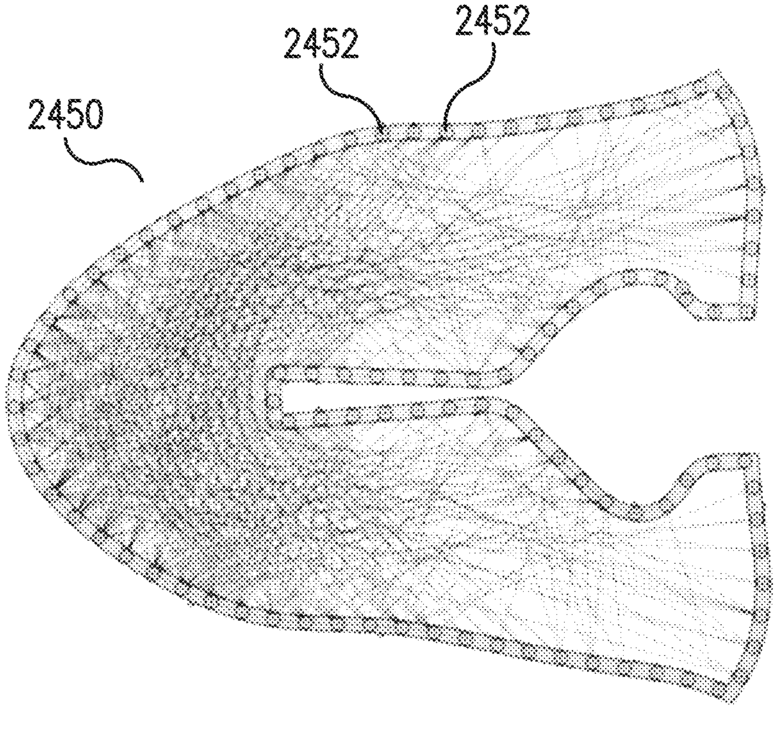
FIG. 24B shows a thread pattern based on the strain data map of FIG. 24A.

FIGS. 24A and 24B illustrate an exemplary strain data map 2400 and a thread pattern 2450 wound around anchor points 2452 based on stain data map 2400. Strain data map 2400 may be captured during a test method that evaluates strain imparted on areas of an article of footwear worn during the test, using for example, an ARAMIS system from GOM mbH. The data captured in the test method may be translated into a two-dimensional pattern in the shape of an upper as shown in FIG. 24A. Darker areas of map 2400 represent low strain values and lighter areas of map 2400 represent high strain values. Accordingly, areas of thread pattern 2450 corresponding to darker areas of map 2400 may have a relatively small number of thread lines while areas of thread pattern 2450 corresponding to lighter areas of map 2400 may have a relatively larger number of thread lines. The larger number of thread lines may provide increased strength in areas of high strain, which may indicate areas in which the tested individual needs more support from his or her article of footwear. Alternative or additional characteristics of thread pattern 2450, such as anchor points, the number and configuration of continuous threads wound around the anchor points, and the material of the continuous thread(s) may also be selected to provide increased strength in areas of high strain. Alternatively, characteristics of thread pattern 2450 may be selected to less strength in areas of high strain.

The physiological characteristics collected in step 220 may include, but are not limited to, gait characteristics, such as foot strike type (e.g. heel, midfoot, forefoot, etc.), rate of pronation or supination, and degree of pronation and/or supination. In some embodiments, step 220 may include receiving personal information about the individual before or after receiving physiological characteristics data about the individual. Personal information may include information such as the individual's name, prior injury information, height, weight, gender, shoe size, an athletic goal, intended athletic activity, intended athletic environment or terrain, intended athletic activity duration, intended athletic activity frequency, intended athletic activity distance, quantitative or qualitative preferences about athletic equipment or footwear (such as level of cushion, preference of weight, materials and the like), and current athletic footwear. Intended athletic activities include, but are not limited to, basketball, running, sprinting, training, football, soccer, rugby, and baseball.

In some embodiments, step 220 may include receiving biometric data via a local wired or wireless connection. In some embodiments step 220 may include monitoring individual 2300 in real time during an athletic activity, such as jogging.

Physiological characteristics may be collected using one or more sensor modules 2302. A sensor module 2302 may include one or more sensors, and may be physically coupled to an object (e.g., article of footwear 2304) during an everyday or athletic activity conducted by individual 2300. A sensor module 2302 may be used to monitor changes in the spatial orientation of an individual's body or a piece of the individual's athletic equipment or article of footwear in some embodiments. Sensor module 2302 may be used in combination with predetermined correlation data stored in a data structure to determine a correlation between body or equipment or article of footwear movement data and a characteristic such as a gait characteristic in some embodiments.

In some embodiments, a sensor module 2302 is placed and/or built into article of footwear 2304 to measure, for example, a runner's running form and gait cycle (e.g., sensor is placed on, removably attached to, or built into the heel, midsole, or toe of article of footwear 2304). Additional sensors/motion monitors can also be placed on the runner's knee and hip, for example, to obtain more information about the runner's running form.

Sensor module 2302 may include a plurality of sensors, including but not limited to, one or more motion sensors, such as acceleration sensors and magnetic field sensors, or angular momentum sensors. In some embodiments, sensor module 2302 may include one or more temperature sensors, a heart rate monitoring device, a pedometer, and/or an accelerometer-based monitoring device. Sensors of sensor module 2302 may be capable of measuring a variety of athletic performance parameters. The term "performance parameters" may include physical parameters and/or physiological parameters associated with the individual's 2300 athletic activity. Physical parameters measured may include, but are not limited to, time, distance, speed, pace, pedal count, wheel rotation count, rotation generally, stride count, stride length, airtime, stride rate, altitude, temperature, strain, impact force, jump force, force generally, and jump height. Physiological parameters measured may include, but are not limited to, heart rate, respiration rate, blood oxygen level, blood lactate level, blood flow, hydration level, calories burned, or body temperature.

An acceleration sensor may be adapted to measure the acceleration of the sensor module 2302. Accordingly, when the sensor module 2302 is physically coupled to an object (such as an individual's 2300 body, article of footwear 2304, or other piece of athletic equipment), the acceleration sensor may be capable of measuring the acceleration of the object, including the acceleration due to the earth's gravitational field. In some embodiments, an acceleration sensor may include a tri-axial accelerometer that is capable of measuring acceleration in three orthogonal directions. In some embodiments one, two, three, or more separate accelerometers may be used.

A magnetic field sensor may be adapted to measure the strength and direction of magnetic fields in the vicinity of sensor module 2302. Accordingly, when sensor module 2302 is physically coupled to an object (such as an individual's 2300 body, article of footwear 2304, or other a piece of athletic equipment), a magnetic field sensor may be capable of measuring the strength and direction of magnetic fields in the vicinity of the object, including the earth's magnetic field. In some embodiments, a magnetic field sensor may be a vector magnetometer. In some embodiments, a magnetic field sensor may be a tri-axial magnetometer that is capable of measuring the magnitude and direction of a resultant magnetic vector for the total local magnetic field in three dimensions. In some embodiments one, two, three, or more separate magnetometers may be used.

In some embodiments, an acceleration sensor and a magnetic field sensor may be contained within a single accelerometer-magnetometer module bearing model number LSM303DLHC made by STMICROELECTRONICS® of Geneva, Switzerland.

An angular momentum sensor, which may be, for example, a gyroscope, may be adapted to measure the angular momentum or orientation of sensor module 2302. Accordingly, when the sensor module 2302 is physically coupled to an object (such as an individual's 2300 body, article of footwear 2304, or other athletic equipment), the angular momentum sensor may be capable of measuring the angular momentum or orientation of the object. In some embodiments, an angular momentum sensor may be a triaxial gyroscope that is capable of measuring angular rotation about three orthogonal axes. In some embodiments one, two, three, or more separate gyroscopes may be used. In some embodiments, angular momentum sensor may be used to calibrate measurements made by one or more of an acceleration sensor and a magnetic field sensor.

A heart rate sensor may be adapted to measure individual's 2300 heart rate. A heart rate sensor may be placed in contact with the individual's 2300 skin, such as the skin of the individual's chest, and secured with a strap. A heart rate sensor may be capable of reading the electrical activity of the individual's 2300 heart.

A temperature sensor may be, for example, a thermometer, a thermistor, or a thermocouple that measures changes in the temperature. In some embodiments, a temperature sensor may primarily be used for calibration other sensors, such as, for example, an acceleration sensor and a magnetic field sensor.

In some embodiments, sensor module 2302 may include a position receiver, such as an electronic satellite position receiver that is capable of determining its location (i.e., longitude, latitude, and altitude) using time signals transmitted along a line-of-sight by radio from satellite position system satellites. Known satellite position systems include the GPS system, the Galileo system, the BeiDou system, and the GLONASS system. In some embodiments, a position receiver may be an antenna that is capable of communicating with local or remote base stations or radio transmission transceivers such that the location of sensor module 2302 may be determined using radio signal triangulation or other similar principles. In some embodiments, position receiver data may allow sensor module 2302 to detect information that may be used to measure and/or calculate position waypoints, time, location, distance traveled, speed, pace, or altitude.

Data collected by sensor module 2302 may classify individuals based on their running style, utilizing data analysis such as an anterior-posterior plot angle vs. time; medial-lateral plot angle vs. time; and the like. Calculations of these characteristics may be used to group individuals into different categories (groups), such as a heel striker, a midfoot striker, a forefoot striker, a pronator, supinator, a neutral individual, or some combination of characteristics. In some embodiments, gait analysis may utilize personal information of individual 2300, such a gender, shoe size, height, weight, running habits, and prior injuries.

In some embodiments, a regression analysis can be used to determine gait characteristics such as foot strike type, rate of pronation, degree of pronation, and the like based on acceleration data obtained from sensor module 2302. In some embodiments, the regression analysis can be used to determine gait characteristics such as foot strike type, rate of pronation, degree of pronation, and the like based on other data such as magnetometer data, angular momentum sensor data, or multiple types of data. In some embodiments, the analysis can include other user-input information such as prior injury information, an athletic goal, intended athletic environment or terrain, intended athletic duration, and current athletic footwear.

Athletic goals may be, for example, training for a race, to stay healthy, to lose weight, and training for sports. Other examples of athletic goals may include training for a race, or other sporting event, improving individual fitness, simply enjoy running, or the like. Frequency intervals may include for example about 1 to 2 times per week, about 3 to 4 times per week, about 5 to 7 times per week, or the individual doesn't know. Length intervals may include for example about less than about 5 miles per week, about 5 to 10 miles per week, about 10 to 20 miles per week, greater than about 20 miles per week, or the individual doesn't know. Examples of intended athletic terrain environments may include roads, track, treadmill, trail, gym, or particular athletic fields designed for a specific sport. Examples of athletic equipment preferences may include for example more cushioning, less weight, better fit, strength, durability, intended athletic activity range, balance, weight balance, more color choices, and the like.

In some embodiments, collecting a biometric data profile in step 220 may include obtaining previously collected and stored data for an individual. In some embodiments, collecting biometric data may include obtaining a standard biometric data profile for a group of individuals. For example, a standard profile for individuals having a certain shoe size, weight, height, arch shape, stability characteristic, and/or touchdown characteristic may be retrieved in step 220.

Modeling software such as CAD (computer aided design) drawings, GRASSHOPPER™, and RHINO® may be utilized to generate thread models and convert thread models into thread patterns based on input data. Input data may include templates for a particular footwear type, anchor point location and arrangement, timing for anchor point pin retraction(s) and/or extension(s), desired thread line orientation relative to strain direction, thread line density and/or thread materials in areas of high and/or low stain magnitude, thread line tension values, number and location of continuous threads in a thread pattern, and continuous thread material characteristics (e.g., tackiness, color, or tensile strength). As an example, the location of anchor point pins 304 in FIG. 3 may be an input template for anchor points. The modeling software may correlate collected data (e.g., strain and biometric data) to the given inputs in order to wind a desired thread pattern. Exemplary footwear type templates include, a basketball shoe template, a soccer cleat template, a tennis shoe template, a football cleat template, and a baseball cleat template.

FIGS. 8A-8D show four exemplary thread models 800, 820, 840, and 860 according to some embodiments. Each thread model 800/820/840/860 is based on strain data for an upper of an article of footwear collected using, for example, an ARAMIS system from GOM mbH. The different models 800, 820, 840, and 860 impart desired characteristics to a thread pattern, which may be tailored to the desires and/or needs of an individual, or group of individuals. The density and orientation of lines in thread models 800/820/840/860 indicate the characteristics of thread lines (e.g., number, material, and orientation) in a thread pattern based on the respective model. In some embodiments, two or more thread models may be included in a thread pattern for an article of footwear. In other words, a thread pattern may include thread lines based on two or more thread models to provide characteristics of the two or more models to an article of footwear.

Figure 8A:
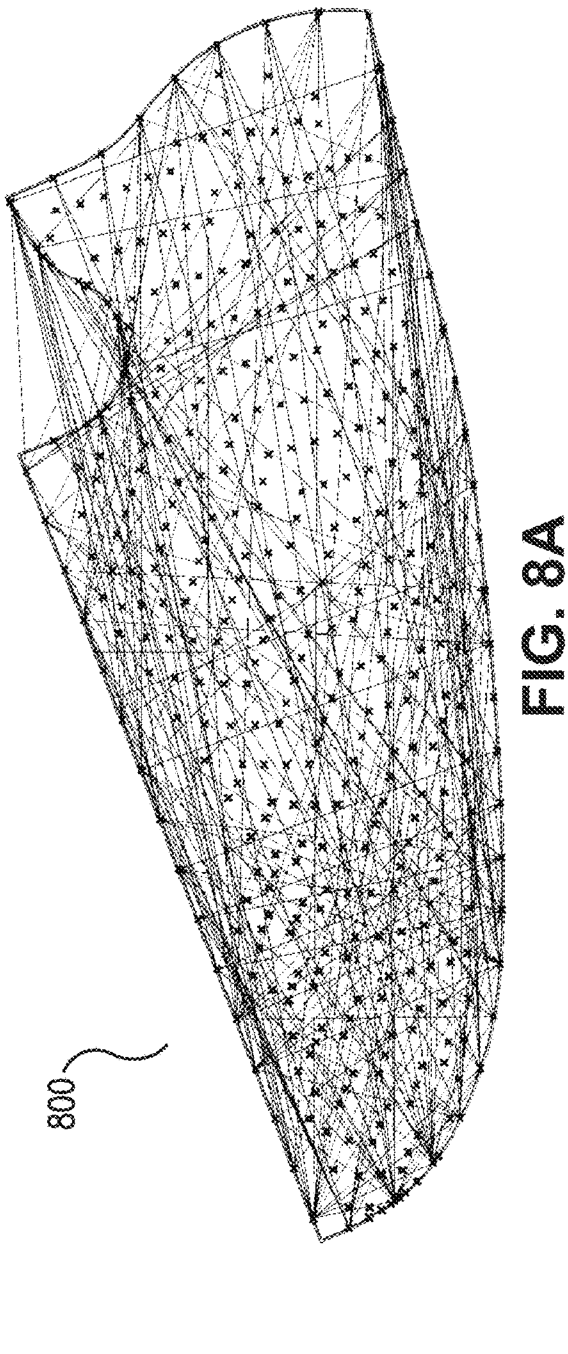
FIG. 8A shows a thread model according to some embodiments.
Figure 8B:
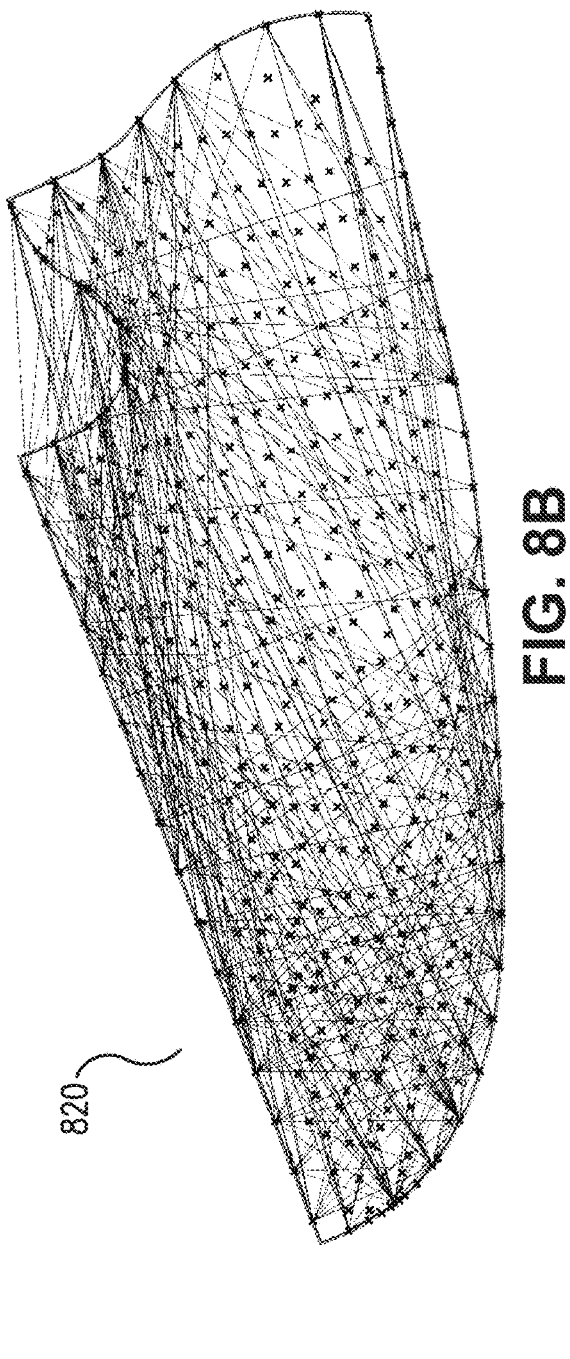
FIG. 8B shows a thread model according to some embodiments.

FIGS. 8A and 8B show thread models 800 and 820 having a relatively high density of lines in areas of high stain magnitude. Thread model 800 has a relatively high density of lines in areas extending between areas of high strain magnitude and oriented in the direction generally parallel to the direction of the strain in the high magnitude areas (i.e., less than 45 degrees different from the direction of the strain in the high magnitude areas). Thread model 820 has a relatively high density of lines in areas of high strain magnitude and oriented in directions generally perpendicular to and generally parallel to the direction of the strain in the high magnitude areas (i.e., 45 degrees to 90 degrees and less than 45 different from the direction of the strain in the high magnitude areas). As illustrated in FIGS. 8A and 8B, the relatively high density of lines results in a relatively large number of intersection points between the lines.

When incorporated into an upper, thread patterns based on thread models 800 and 820 may provide a wearer with a relatively large amount of strength and propulsion in areas of high strain magnitude. Such characteristics may be desirable/needed by, for example, an athlete participating in a high strain activity, such as a sport (e.g., basketball or football). Such characteristics may maximize the energy transfer between the individual's foot and a surface (i.e., reducing energy lost via and/or absorbed by an article of footwear) and may provide a durable article of footwear for use in such activities. Thread model 800 may provide a more lightweight and breathable thread pattern for an upper compared to thread model 820 due to a relatively small number of thread lines.

The strength and/or propulsion of a thread pattern based on thread models 800 and 820 may be imparted in areas of high strain magnitude by: (a) winding a relatively large number of thread lines oriented in the direction of lines in the models between anchor points in these areas, (b) providing a relatively large number of anchor points in the areas, and/or (c) selecting a relatively stiff material for thread lines in the areas. (a) may be achieved by winding more thread lines for a single continuous thread, winding additional continuous threads, and/or increasing the thread line communication number of continuous thread(s) at anchor points in the areas.

Figure 8C:
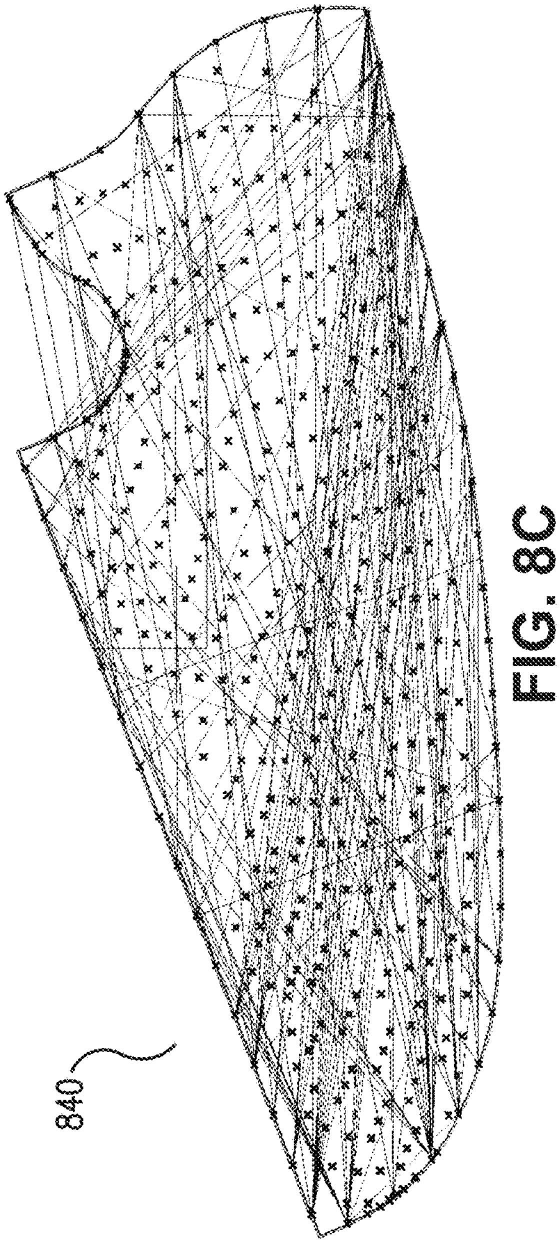
FIG. 8C shows a thread model according to some embodiments.
Figure 8D:
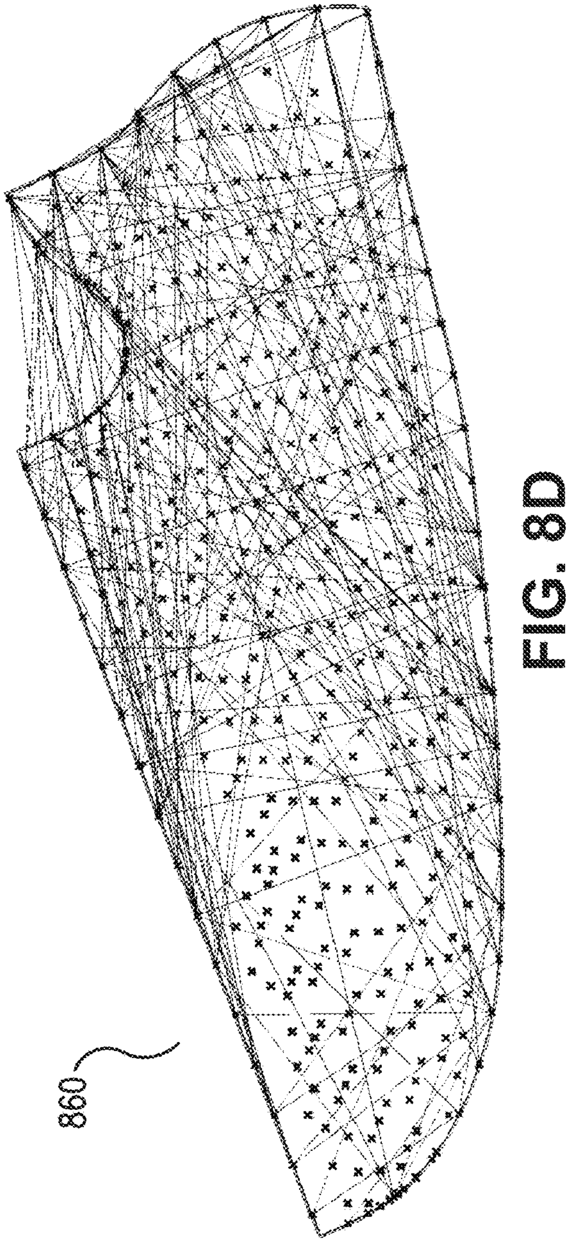
FIG. 8D shows a thread model according to some embodiments.

FIGS. 8C and 8D show thread models 840 and 860 having a relatively low density of lines in areas of high stain magnitude. Thread model 840, when compared to models 800 and 820, has a relatively low density of lines in areas of high strain magnitude and a larger majority of the thread lines oriented in the direction generally parallel to the direction of the strain in the high magnitude areas (i.e., less than 45 degrees different from the direction of the strain in the high magnitude areas). Thread model 860, when compared to models 800, 820, and 840, has a relatively low density of lines in areas of high strain magnitude and the lines that are present are generally perpendicular to the direction of the strain in the high magnitude areas (i.e., 45 degrees to 90 degrees different from the direction of the strain in the high magnitude areas). As illustrated in FIGS.

8C and 8D, when compared to FIGS. 8A and 8D, the relatively low density of lines results in a relatively low number of intersection points between the lines.

When incorporated into an upper, thread patterns based on thread models 840 and 860 provide a wearer with a relatively large amount of stretchability and/or breathability in areas of high strain. Such characteristics may be desirable/needed by, for example, an individual participating in a leisurely activity, such as walking. The flexibility and/or breathability of a thread pattern based on thread models 840 and 860 may be imparted in areas of high strain magnitude by: (a) winding a relatively small number of thread lines oriented in the direction of lines in the models between anchor points in these areas, (b) providing a relatively small number of anchor points in the areas, and/or (c) selecting a relatively flexible material for thread lines in the areas. (a) may be achieved by winding less thread lines for a single continuous thread, winding less continuous threads, or/or decreasing the thread line communication number of continuous thread(s) at anchor points in the areas. Thread model 840 may provide a thread pattern having more strength and propulsion in high strain areas compared to thread model 860, whereas thread model 860 may provide a thread pattern having more strength and stability in midfoot and heel portions for an upper. In some embodiments, thread patterns based on thread models 840 and 860 may provide a wearer with a relatively large amount of support and/or stiffness in areas of low strain by, for example, threading continuous thread(s) with a high stiffness in areas of low strain. In some embodiments, thread patterns based on thread models 840 and 860 may provide a wearer with a relatively large amount of support and/or stiffness in areas of high strain by, for example, threading continuous thread(s) with a high stiffness in areas of high strain.

Figure 9A:
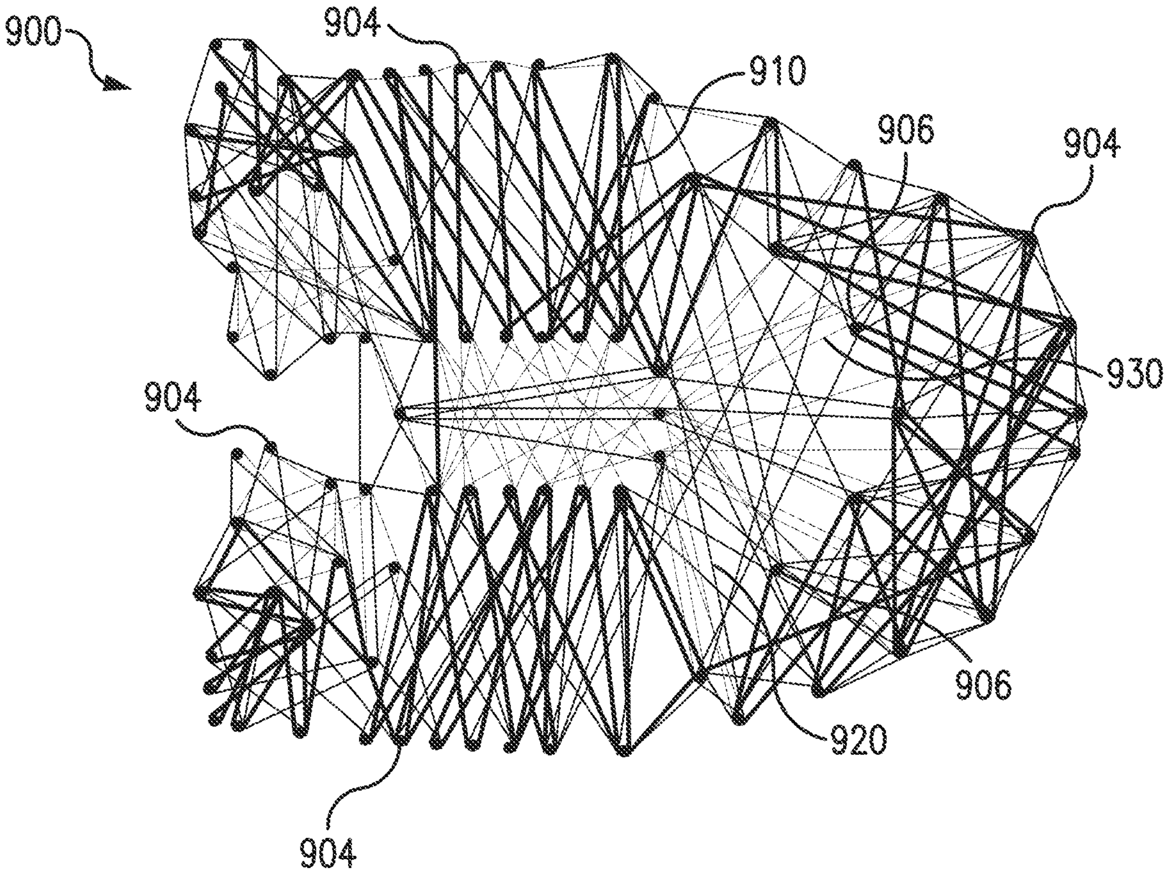
FIG. 9A shows a thread pattern according to some embodiments.
Figure 9B:
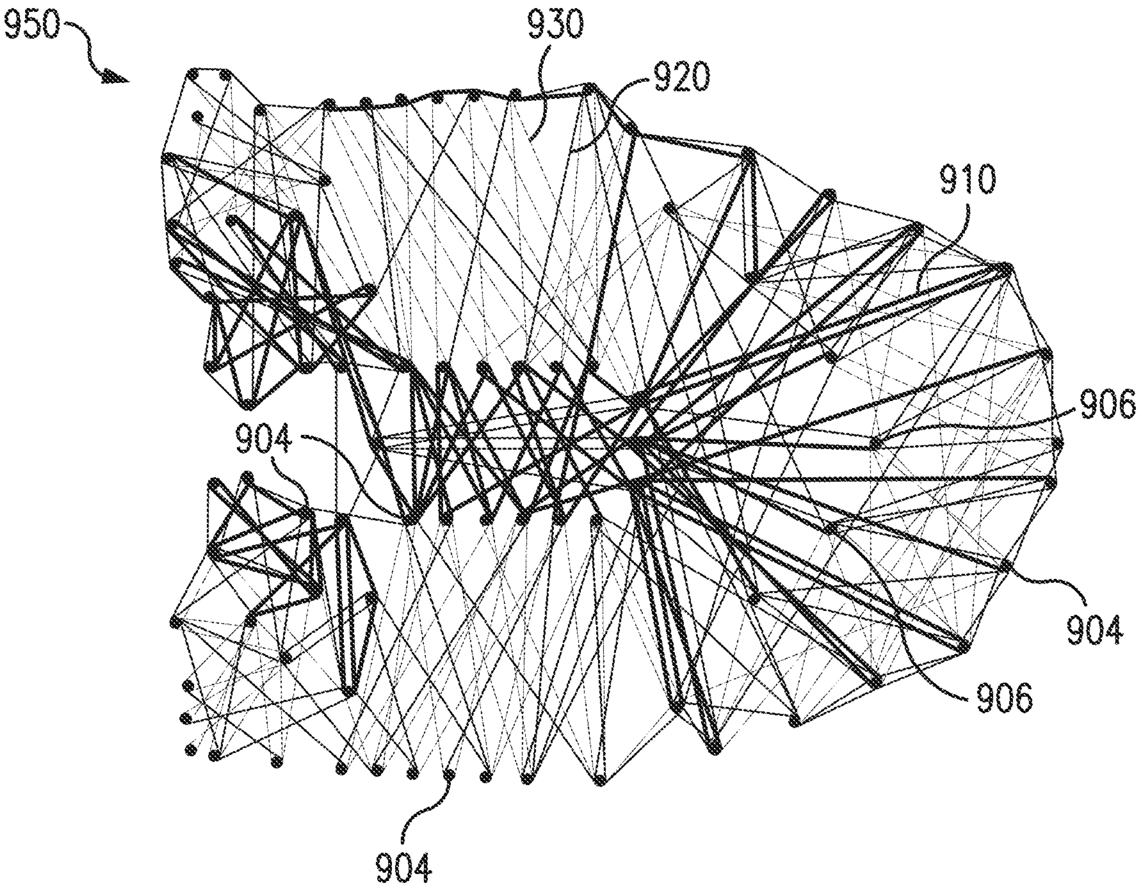
FIG. 9B shows a thread pattern according to some embodiments.

FIGS. 9A and 9B illustrate how different thread types (e.g., threads made of different materials) can be utilized to create thread patterns 900 and 950 having desired characteristics. Thread patterns 900 and 950 both include a first continuous thread 910, a second continuous thread 920, and a third continuous thread 930 wound around the same set of anchor points, including peripheral anchor points 904 and interior anchor points 906. First continuous thread 910 has a high tensile stiffness, second continuous thread 920 has a medium tensile stiffness, and third continuous thread 930 has a low tensile stiffness.

In thread pattern 900, first and second continuous threads 910 and 920, and particularly first continuous thread 910 are wound significantly around anchor points 904/906 associated the quarter panels and biteline areas of an upper. As such, thread pattern 900 provides a large amount of strength and propulsion for an upper in these areas. Conversely, in thread pattern 950, third and second continuous threads 930 and 920, and particularly third continuous thread 930, are wound significantly around anchor points 904/906 associated the quarter panels and biteline areas of an upper. As such, thread pattern 950 provides a large amount of stretchability for an upper in these areas.

Figure 10:
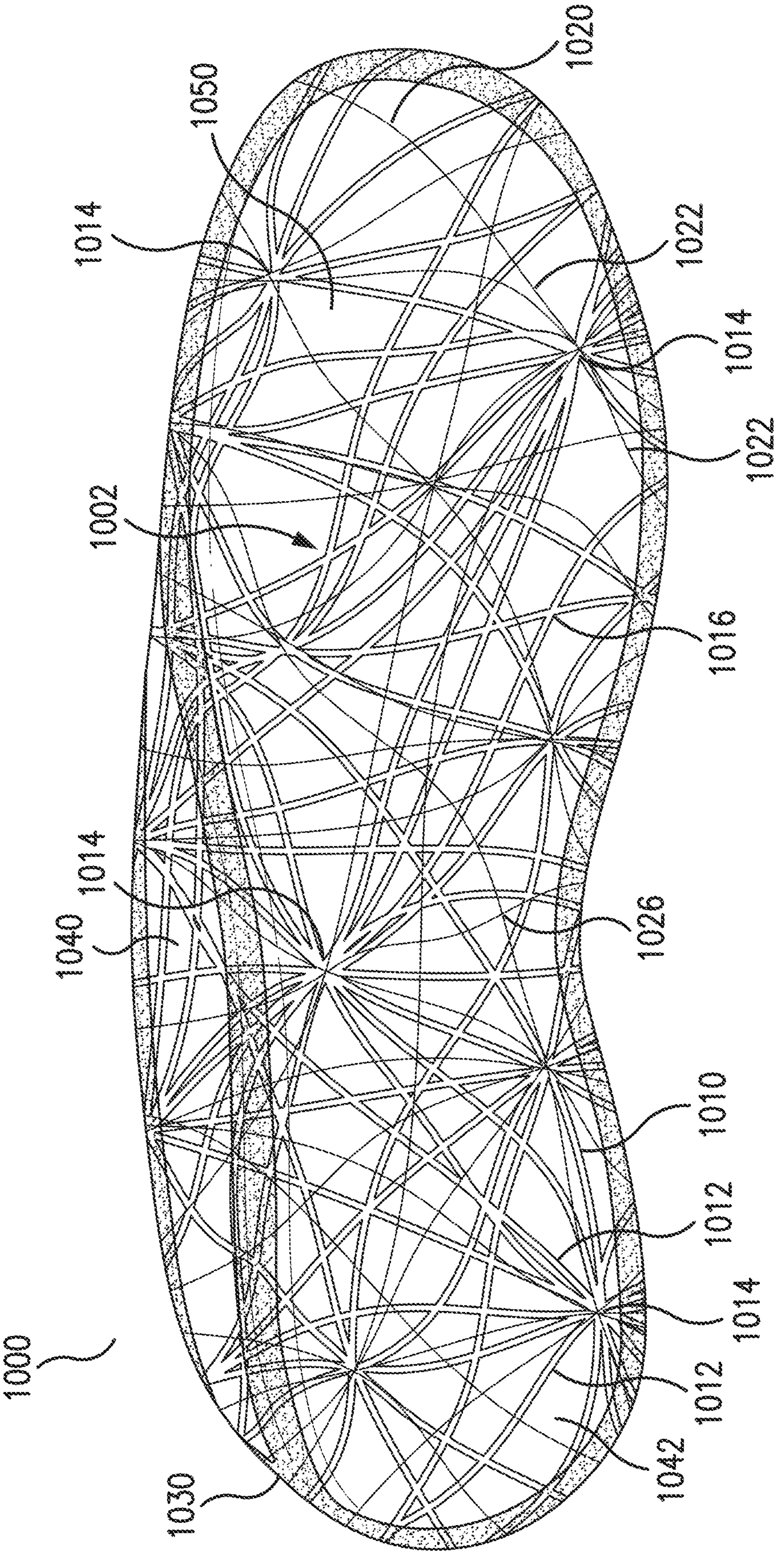
FIG. 10 shows a bottom perspective view of an upper according to some embodiments.

In some embodiments, a thread pattern for an upper wound and bonded in steps 220 and 230 may extend underneath a wearer's foot when worn. In other words, the thread pattern for the upper may wrap around at least a portion of the bottom (i.e., the sole) of a wearer's foot when worn. FIG. 10 illustrates an upper 1000 including a thread pattern 1002 that wraps around the sole of a wearer's foot according to some embodiments.

Upper 1000 includes an upper section 1040 configured to wrap around the sides, the top, and the heel of a wearer's foot and a sole section 1042 configured to wrap around the sole of a wearer's foot. Thread pattern 1002 may define at least a portion of upper section 1040 and sole section 1042.

In some embodiments, similar to other thread patterns discussed herein, thread pattern 1002 includes a first continuous thread 1010 and a second continuous thread 1020 wound around anchor points 1014. First continuous thread 1010 includes thread lines 1012 extending between respective anchor points 1014 and overlapping at intersection points 1016. And second continuous thread 1020 includes thread lines 1022 extending between respective anchor points 1014 and overlapping at intersection points 1026. In some embodiments, one or more anchor points 1014 may be disposed in sole portion 1042.

In some embodiments, upper 1000 may include a bonding layer at perimeter portion 1030 of upper configured to bond thread lines 1012/1022 together in perimeter portion 1030. Perimeter portion 1030 may be the same as or similar to perimeter portion 162 discussed herein in regards to upper 120. In some embodiments, upper 1000 may include a fabric layer 1050 disposed on the outer surface and/or the inner surface of thread pattern 1002. Fabric layer 1050 may be the same as or similar to fabric layer 172 discussed herein with regards to upper 120.

Figure 11:
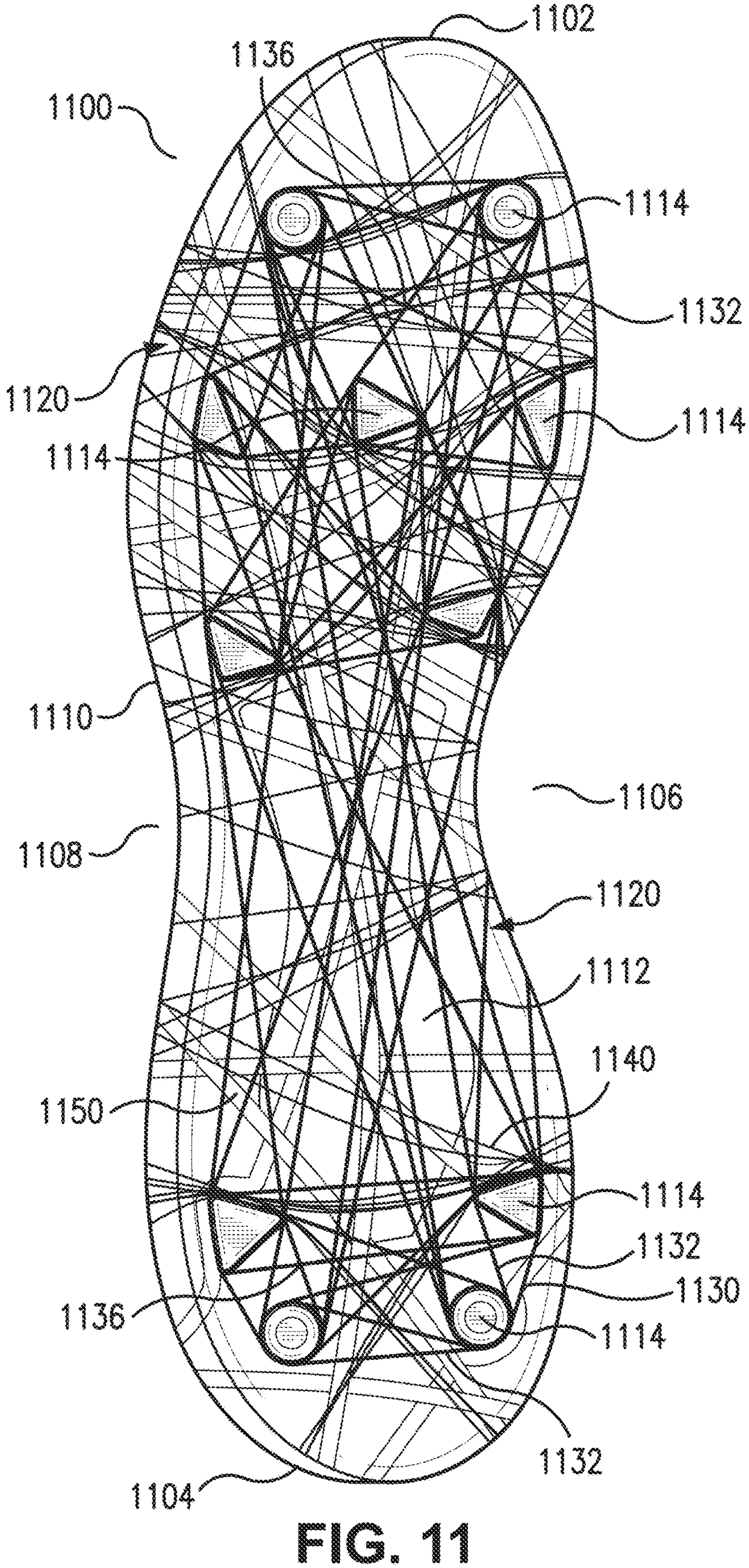
FIG. 11 shows a bottom view of a sole according to some embodiments.

In some embodiments, a sole for an article of footwear may include one or more continuous threads wound around anchor points to form a thread pattern. Thread patterns for a sole may provide desired characteristics to a sole in the same fashion as thread patterns for uppers discussed herein. In particular, thread patterns for a sole may provide reinforcement (i.e., additional strength) for portions of the sole. The strength provided by a thread pattern may decrease the weight of a sole without sacrificing strength. FIG. 11 illustrates a sole 1100 including a continuous thread 1130 wound around anchor points 1114 to form a thread pattern 1120.

Sole 1100 includes a forefoot end 1102, a heel end 1104, a medial side 1106, a lateral side 1108, a top surface 1110, and a bottom (ground contacting) surface 1112 opposite top surface 1110. Similar to other thread patterns discussed herein, thread pattern 1120 includes a continuous thread 1130 wound around anchor points 1114. And continuous thread 1130 includes thread lines 1132 extending between respective anchor points 1114 and overlapping at intersection points 1136. In some embodiments, one or more anchor points 1114 may be studs or cleats extending from bottom surface 1112 of sole 1100. In such embodiments, the location of one or more anchor points 1114 corresponds to the location of a cleat extending from bottom surface 1112 of sole 1100.

In some embodiments, continuous thread 1130 may be wound around a pre-formed sole 1100 having studs or cleats extending from bottom surface 1112 of sole 1100. In some embodiments, continuous thread 1130 may be wrapped around a pre-formed sole 1100. In other words, one or more thread lines 1132 of continuous thread 1130 may be wound from an anchor point 1114, across bottom surface 1112, around medial side 1106 (or lateral side 1108), across top surface 1110, around lateral side 1108 (or medial side 1106), back to bottom surface 1112, around another anchor point 1114, and so on. In some embodiments, one or more thread lines 1132 may be wound around sole 1100 more than once before winding around another anchor point 1114. In some embodiments, sole 1100 may include an outsole coupled to bottom surface 1112. In such embodiments, the outsole may be disposed over thread pattern 1120.

After winding around anchor points 1114 and/or pre-formed sole 1100, continuous thread 1130 may be bonded to bottom surface 1112, top surface 1110, medial side 1106, and/or lateral side 1108 of sole 1100. Continuous thread 1130 may be bonded to surfaces and sides of sole 1100 via, for example, pressure and heat (e.g., in a heat press or heated mold), an adhesive, or a lamination layer. In some embodiments, a polymeric material of continuous thread 1130 may be directly bonded to surfaces and sides of sole 1100 via the application of pressure and heat.

In some embodiments, thread pattern 1120 may include more than one continuous thread, such as second and/or third continuous threads 1140 and 1150. Similar to continuous thread 1130, second and third continuous threads 1140 and 1150 may be wound around anchor points 1114 and/or sole 1100. In some embodiments, continuous threads 1130 and/or 1140 may be a high tensile polymeric thread and third continuous thread 1150 may be a carbon fiber tow. In some embodiments, thread pattern 1120 may include more than three continuous threads. In some embodiments, one or more continuous threads of thread pattern 1120 may define a portion of a thread pattern for an upper (e.g., thread pattern 122). In such embodiments, one or more continuous threads may be wound around anchor points of a sole (e.g., anchor points 1114) and anchor points of an upper (e.g., anchor points 134).

Figure 21A:
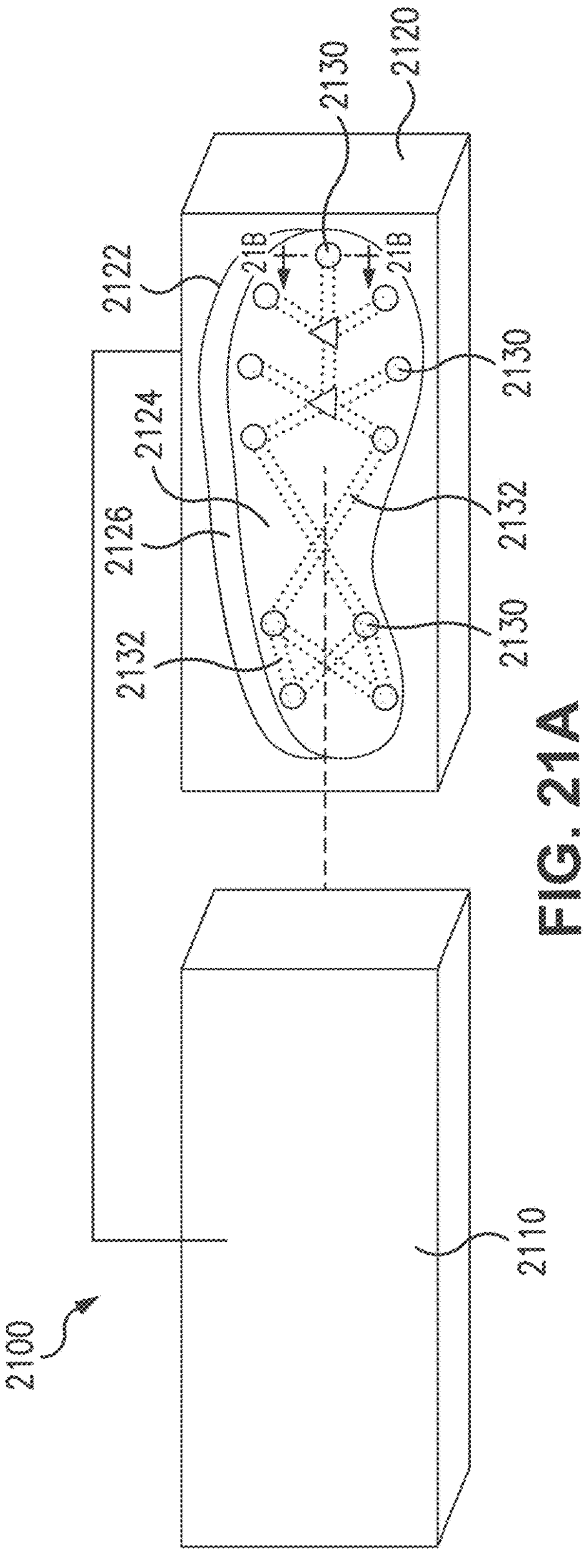
FIG. 21A shows a mold according to some embodiments.
Figure 21B:
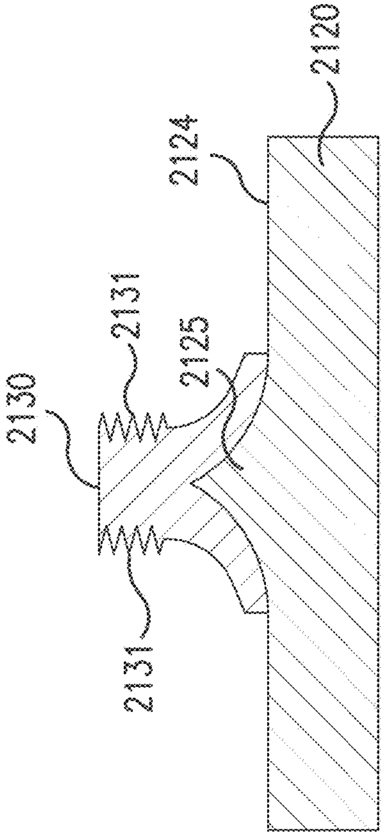
FIG. 21B shows a cross-sectional view of a portion of FIG. 21A according to some embodiments along line 21B-21B.

In some embodiments, continuous thread(s) 1130/1140 may be wound around projections in a mold cavity and a sole material may be molded around the projections in the mold cavity to bond continuous threads 1130/1140 to sole 1100. FIG. 21 illustrates a mold 2100 for molding sole 1100 according to some embodiments.

Figure 12A:
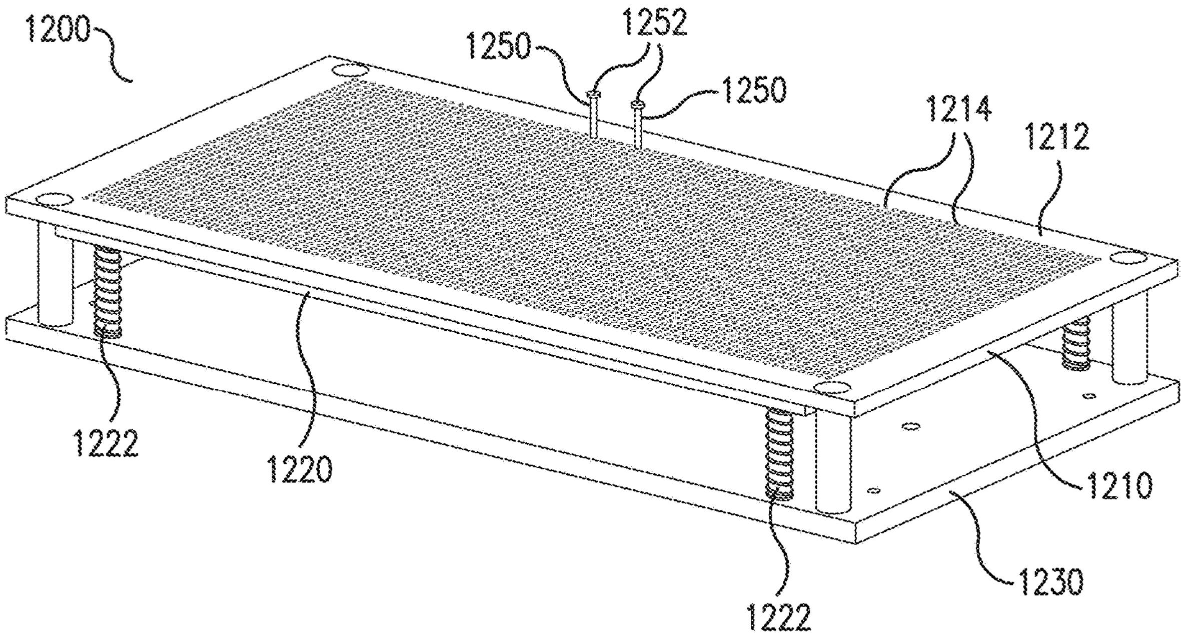
FIG. 12A shows a perspective view of pin assembly plate according to some embodiments.
Figure 12B:
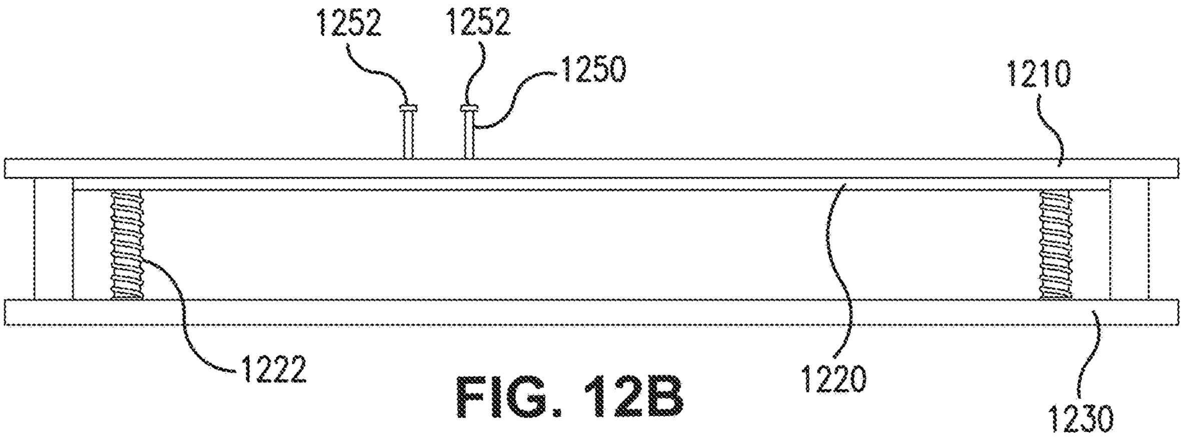
FIG. 12B shows a side view of the pin assembly plate of FIG. 12A in a first position.
Figure 12C:
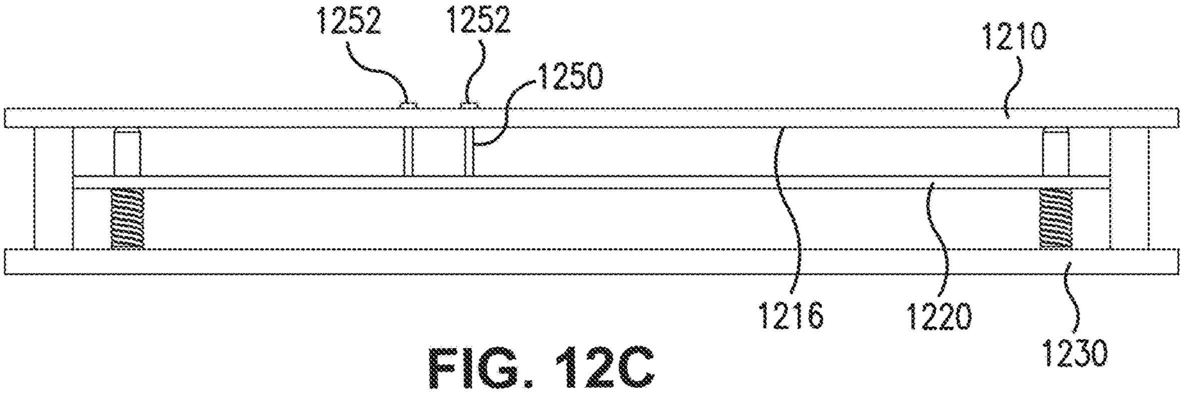
FIG. 12C shows a side view of the pin assembly plate of FIG. 12A in a second position.

FIGS. 12A-12C illustrate a pin assembly plate 1200 for supporting pins 1250 during winding step 220 and bonding step 230 of method 200. Pin assembly plate 1200 includes a top plate 1210, a pin plate 1220, and a bottom plate 1230. Top plate 1210 includes a plurality of pin holes 1214 extending through top plate 1210 from a top surface 1212 to a bottom surface 1216 of top plate 1210. In some embodiments, pin holes 1214 may be arranged in an ordered grid of columns and rows of pins holes 1214 with each pin hole 1214 equally spaced from its immediately adjacent neighbors in the column and rows.

Pin plate 1220 is moveably coupled to posts 1222, and in operation, moves vertically up and down between top plate 1210 and bottom plate 1230. In some embodiments, posts 1222 may be spring loaded posts. Pin plate 1220 supports pins 1250 extending through pin holes 1214 and moves them vertically within pin holes 1214. In some embodiments, pins 1250 may be removably coupled to pin plate 1220 (e.g., via thread couplings or luer-lock couplings.) In such embodiments, pin plate 1220 includes coupling holes disposed below individual pin holes 1214. Bottom plate 1230 is a supporting plate rigidly coupled to top plate 1210 and posts 1222.

The operation of pin assembly plate 1200 is illustrated in FIGS. 12A-12C. In FIGS. 12A and 12B, with pin plate 1220 in an upper position, pins 1250 extend from top surface 1212 of top plate 1210. Pins 1250 define anchor points for a thread pattern, and the location and number of pins may be selected to produce a desired thread pattern. For example, pins 1250 may be arranged in the same arrangement as pins 304 in FIG. 3. In some embodiments, pins 1250 may include pin heads 1252, which may have a diameter larger than the diameter of pin holes 1214. In the position shown in FIG. 12A, one or more continuous threads may be wound around pins 1250 to produce a desired thread pattern.

Once a desired thread pattern is wound, pin plate 1220 is moved to a lower position away from bottom surface 1216 of top plate 1210 as illustrated in FIG. 12C. In some embodiments, pin plate 1220 may be pushed downward by pushing on pins 1250. For example, a plate may push down on pins 1250, thereby forcing pins 1250 down through pin holes 1214. In some embodiments, the plate may push pins 1250 down through pin holes 1214 and pin heads 1252 may pull the continuous thread(s) wound around pins 1250 downward toward top surface 1212 of top plate 1210. In some embodiments, the plate may be a heated plate that bonds continuous thread(s) wound around pins 1250 when the continuous thread(s) is/are sandwiched between the heated plate and top surface 1212 of top plate 1210. In some embodiments, pins 1250 may be composed of a meltable material (e.g., a thermoplastic material) that bonds continuous thread(s) at pins 1250 when heated. In some embodiments, a bonding layer (e.g., bonding layers as described herein) may be applied after the heated plate is removed.

In some embodiments, the plate may be a non-heated plate. In such embodiments, pin heads 1252 may pull the continuous thread(s) wound around pins 1250 downward toward top surface 1212 of top plate 1210 as the plate pushes on them. In such embodiments, a bonding layer (e.g., bonding layers as described herein) may be applied to bond continuous thread(s) wound around pins 1250.

In embodiments with pins 1250 coupled to pin plate 1220, pin plate 1220, or individual pins 1250, may be pulled downward so that pin heads 1252 pull the continuous thread(s) wound around pins 1250 downward toward top surface 1212 of top plate 1210. In such embodiments, a bonding layer (e.g., bonding layers as described herein) may be applied to bond continuous thread(s) wound around pins 1250. Pin plate 1220 or individual pins 1250 may be pulled downward with a pneumatic or electromagnetic device, for example. In some embodiments, select pins 1250 may be retracted at specific times during winding step 220 to create a desired thread pattern. Retracting and/or extending pins 1250 at desired times during winding step 220 may be used to tailor characteristics of a thread pattern, such as, strength, support, propulsion, breathability, comfort (stretchability), tackiness, abrasion resistance, texture, haptics, and durability.

After bonding the continuous thread(s) of the thread pattern, the thread pattern may be removed from pins 1250 and pin plate 1220 may reposition pins 1250 as show in FIGS. 12A and 12B for winding another thread pattern. In some embodiments, the portion of a thread pattern disposed within pins 1250 may be cut from pins 1250 and excess portions of the thread patterns around pins 1250 may be discarded.

Figure 13:
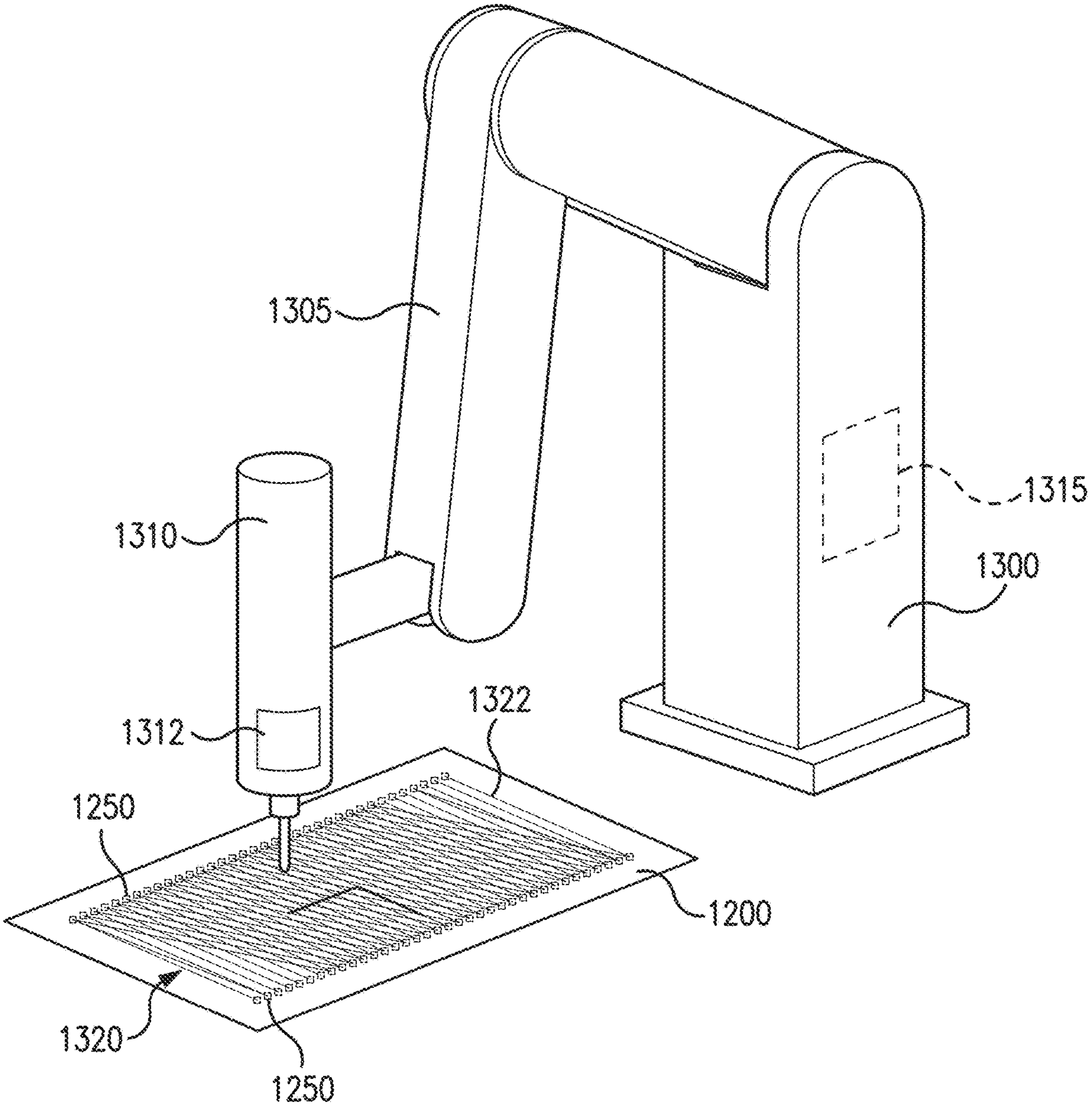
FIG. 13 shows a robotic arm for producing thread patterns according to some embodiments.

In some embodiments, a thread pattern may be wound around anchor points (e.g., pins 1250) manually. In some embodiments, a thread pattern may be wound around anchor points (e.g., pins 1250) using an automated, computer-assisted process. FIG. 13 illustrates a CNC machine 1300 including a robotic arm 1305 for winding a thread pattern 1320 including thread lines 1322 around pins 1250 on pin assembly plate 1200. Robotic arm 1305 may include a thread spool 1310 for threading and winding thread lines 1322 of thread pattern 1320 around pins 1250. In some embodiments, CNC machine 1300 may include a thread tensioner 1312 configured to apply a desired tension to thread(s) that are wound around pins 1250. CNC machine 1300 may include a controller 1315 configured to wind a desired thread pattern 1320 around pins 1250 using a thread model and input data. In some embodiments, controller 1315 may control tensioner 1312 to wind thread(s) at desired tensions. Controller 1315 may include components of computer system 2600 discussed herein.

In some embodiments, tensioner 1312 may be a mechanical tensioning device with digitally controlled impedance that is used to dynamically control how tight a thread is fed through a winding machine (e.g., CNC machine 1300). The thread is run through tensioner 1312 before it exits thread spool 1310, thereby giving an exact tension as it is fed out. The tension value for thread can be changed dynamically by adjusting the voltage in tensioner 1312. In some embodiments, tensioner 1312 may be a manually adjustable tensioner. In some embodiments, tensioner 1312 may include a spring configured to adjust the amount of tension applied to thread(s). The spring may be manually controlled or digitally controlled.

Adjusting the tension as the thread is wound can provide a number of benefits. With elastic threads, tensioning the threads places a preload on them, allowing them to act as if they have a different stiffness in a thread pattern. By dynamically adjusting the tension, one thread can behave with a range of stiffness, which allows for customized zones of stiffness and compliance without the need for changing thread material. This change in stiffness between different zones may be large or small. For example, high stiffness can be provided in areas where high tensioned threads are bonded together and low stiffness can be provided in areas where stretch is preferred. In some embodiments, adjusting thread tension within a thread pattern may facilitate customization of an article of footwear for an individual, or group of individuals, by providing desired characteristics to different areas on the footwear. Moreover, tensioning may be used to customize the fit of an article of footwear. For example, when a wound thread pattern is removed from pins 1250, the thread pattern may contract to an un-stretched shape, which relieves any tension in thread lines that is not fixed by bonding. This may facilitate a customized fit for an individual, or group of individuals, because the un-stretched shape may better conform with the shape of a wearer's foot. In some embodiments, tensioning and un-stretched shapes may be designed based on biometric data, such as foot volume data.

Figure 14A:
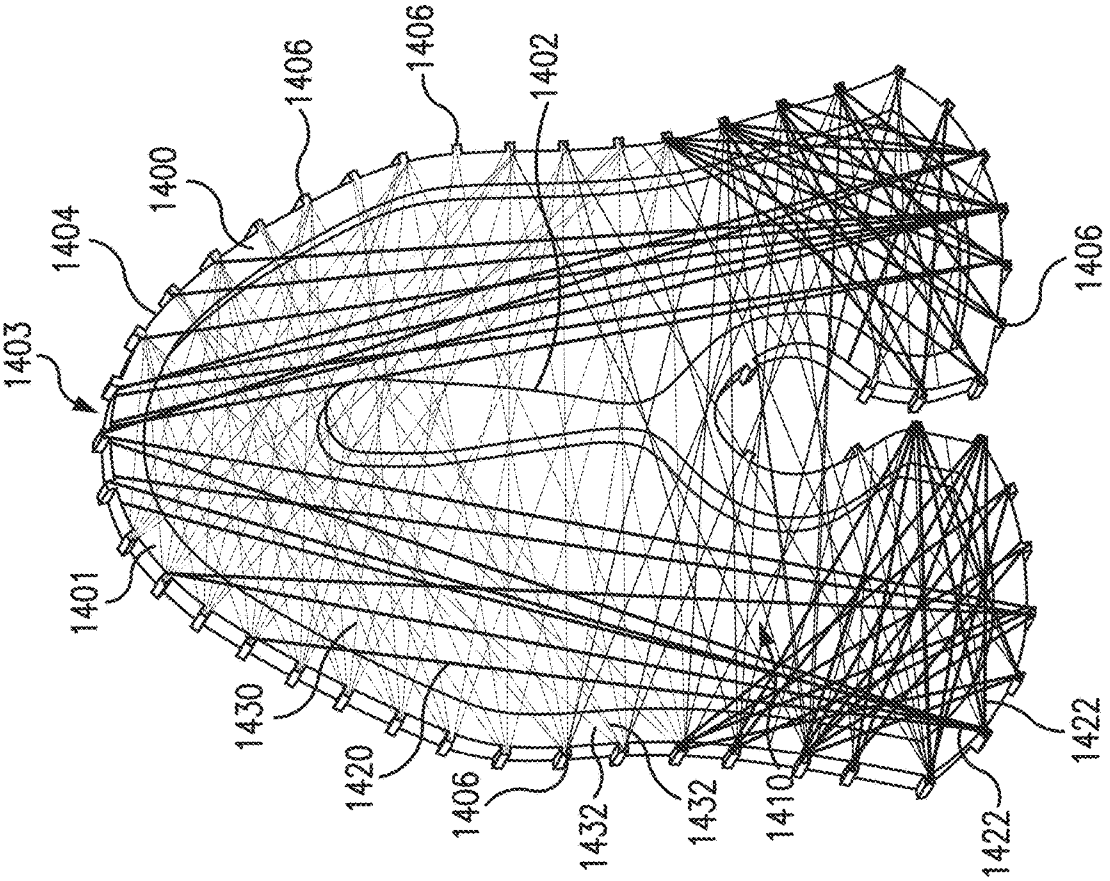
FIG. 14A shows a thread pattern and a frame according to some embodiments.
Figure 14B:
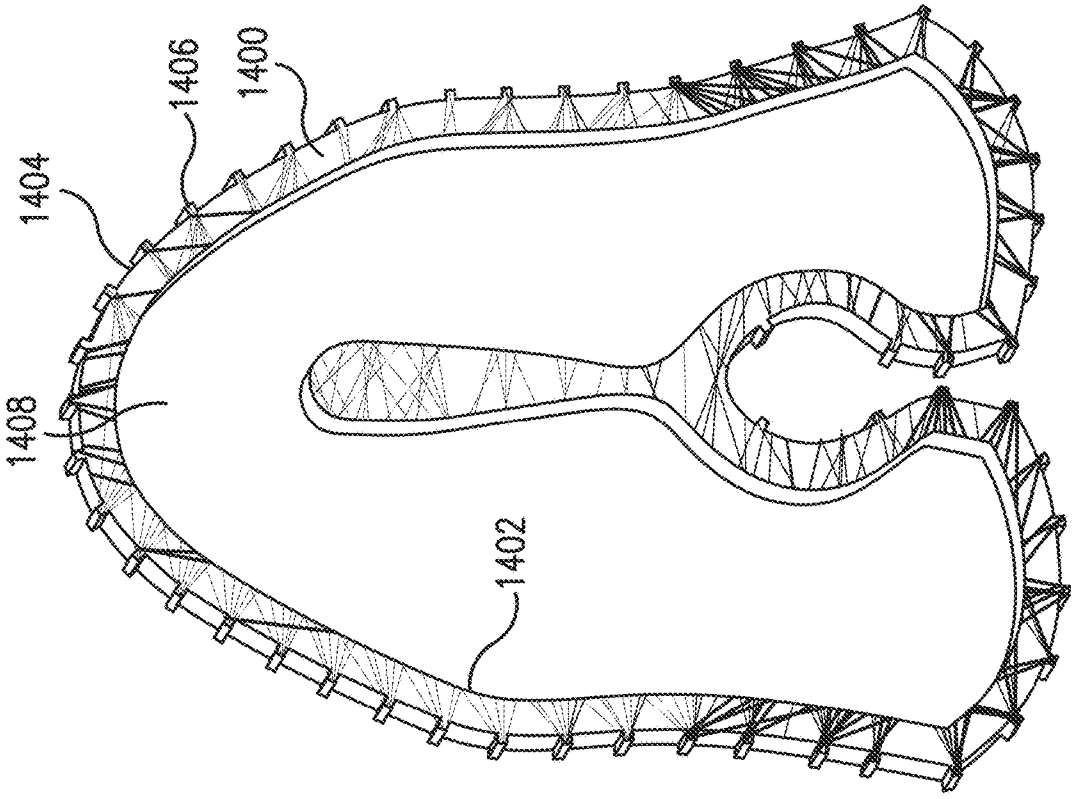
FIG. 14B shows the frame of FIG. 14A with a portion of the thread pattern removed.

In some embodiments, winding step 220 may include winding a thread pattern on a frame. FIGS. 14A and 14B show a frame 1400 for winding a thread pattern according to some embodiments. Frame 1400 includes front side 1401, a rear side 1403, an interior perimeter wall 1402, and an exterior perimeter wall 1404. Interior perimeter wall 1402 of frame 1400 defines a hollow opening 1408. Exterior perimeter wall 1404 includes a plurality of projections 1406 extending laterally from exterior perimeter wall 1404. Projections 1406 may be integrally formed with frame 1400 or may be removably coupled to frame 1400. Projections 1406 may be pins, knobs, or studs.

In operation, a thread pattern 1410 may be wound around projections 1406. When winding thread pattern 1410, one or more continuous threads (e.g., continuous threads 1420 and 1430) are wound around projections 1406 and across front side 1401 of frame 1400. In such embodiments, thread lines 1422/1432 of continuous threads 1420/1430 extend between respective projections 1406 on front side 1401 of frame 1400. In some embodiments, one or more continuous threads (e.g., continuous threads 1420 and 1430) may be wound around projections 1406 and across front side 1401 and rear side 1403 of frame 1400. In such embodiments, thread lines 1422/1432 of continuous threads 1420/1430 extend between respective projections 1406 on front side 1401 and rear side 1403 of frame 1400, and may wrap around exterior perimeter wall 1404. For frame 1400, projections 1406 define anchor points of thread pattern 1410.

Once a desired thread pattern 1410 is wound (see FIG. 14A), continuous threads 1420 and 1430 of thread pattern 1410 may be bonded to mechanically set the thread pattern 1410. In some embodiments, thread lines 1422/1432 of continuous threads 1420/1430 may be bonded to frame 1400 around projections 1406. In some embodiments, thread lines 1422/1432 of continuous threads 1420/1430 may be bonded at together at points of intersection between thread lines 1422/1432. Thread lines 1422/1432 may be bonded at intersection points via an adhesive, a bonding layer, thermal (conductive or convective) heat (e.g., in a heat press or oven), IR (infrared) heating, laser heating, microwave heating, steam, a mechanical fastener (e.g., a clip), hook and loop fasters, needle-punching, hydro-entanglement, ultrasonic/vibratory entanglement, felting, knotting, or by pushing one thread line through the other thread line(s). In embodiments including a polymeric continuous thread 1420 and/or 1430, the polymeric material(s) of continuous thread 1420 and/or 1430 may directly bonded thread lines 1422/1432 at projections 1406 and/or at points of intersection between thread lines 1422/1432. In some embodiments, thread lines 1422/1432 of continuous threads 1420/1430 may alternatively or additionally be bonded with a bonding layer as discussed herein. In such embodiments, one or more portions of thread lines 1422/1432 within opening 1408 may be bonding with a bonding layer.

Once thread pattern 1410 is mechanically set by bonding continuous threads 1420 and 1430, thread pattern 1410 may be cut from frame 1400 as shown in FIG. 14B. In some embodiments, a bonding layer may be applied to thread pattern 1410 after it is cut from frame 1400.

In some embodiments, frame 1400 may be a hand-held frame. In some embodiments, frame 1400 may be attached to a device configured to rotate the frame (e.g., a lathe). During rotation of frame 1400, continuous thread(s) may be wound around frame 1400 either manually or with a computer-assisted machine (e.g., a CNC machine). In some embodiments, thread may be wound around frame 1400 while frame 1400 is held stationary.

FIGS. 15-19 illustrate various bonding layers for bonding continuous thread(s) of thread patterns discussed herein. For purposes of illustration, FIGS. 15-19 show bonding layers applied to thread pattern swatches. However, the bonding layers illustrated in FIGS. 15-19 may be applied to thread patterns discussed. In some embodiments, multiple types of bonding layers may be applied to thread patterns discussed herein.

Figure 15:
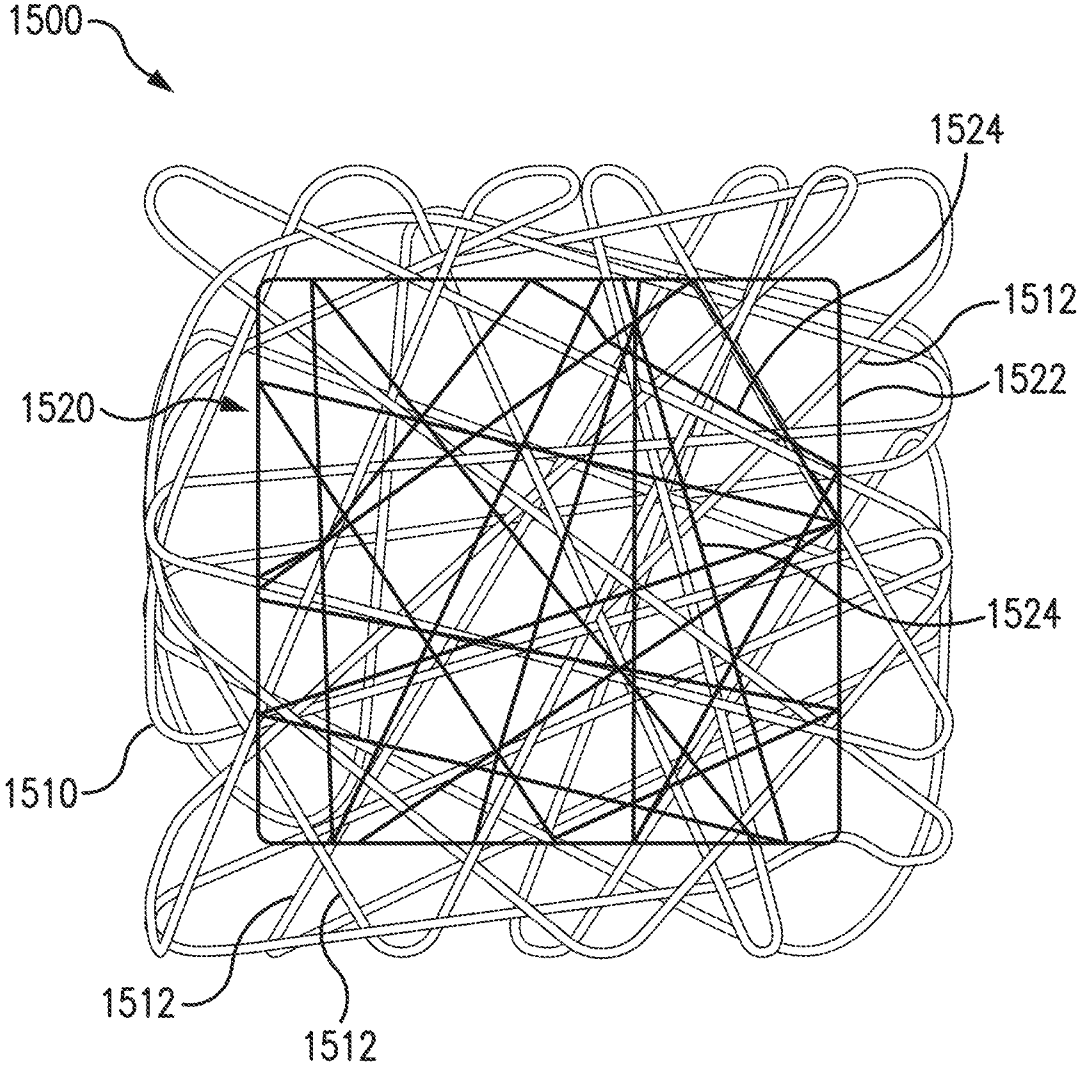
FIG. 15 shows a thread swatch according to some embodiments.

FIG. 15 shows a thread pattern swatch 1500 including a thread pattern 1510 and a stitched bonding layer 1520. Stitched bonding layer 1520 includes one or more threads stitched to thread pattern 1510. And the threads of bonding layer 1520 fix thread lines 1512 of thread pattern 1510 together by stitching thread lines 1512 to each other. Threads of bonding layer 1520 may be stitched to thread lines 1512 of thread pattern 1510 using an any suitable stitching process, such as an embroidery process, computer stitching, chain stitching, straight stitching, zigzag stitching, running stitching, back stitching, and damask stitching (also called satin stitching).

Stitched bonding layer 1520 may include a perimeter portion 1522 defining a perimeter shape of stitched bonding layer 1520. When applied to an upper, perimeter portion 1522 may correspond to a perimeter portion of the upper (e.g., perimeter portion 162 of upper 120). In some embodiments, stitched bonding layer 1520 may include interior threads 1524 disposed within perimeter portion 1522. Interior threads 1524 provide additional bonding between thread lines 1512 and may increase the structural rigidity of thread pattern 1510. In some embodiments, interior threads 1524 may bond thread lines 1512 of thread pattern 1510 at a plurality of intersection points between thread lines 1512. Alternatively or additionally, interior threads 1524 may impart a desired aesthetic design to thread pattern 1510. In some embodiments, multiple stitched bonding layers 1520 may be used to bond thread pattern 1510.

In some embodiments, the material and/or geometry of stitched bonding layer 1520 at intersection points between stitched bonding layer 1520 and thread lines 1512 may be tailored to provide desired characteristics to a thread pattern. For example, a stitched bonding layer 1520 including a high tensile stiffness material (e.g., a nylon thread) stitched through thread lines 1512 may serve to fix thread lines 1512 firmly together. In contrast, a stitched bonding layer 1520 including a more flexible thread looped around thread lines 1512 at intersection points between thread lines 1512 and bonding layer 1520 may serve to allow relative movement at the intersection points. Different materials and/or geometry of stitched bonding layer 1520 in different regions of stitched bonding layer 1520 may serve to impart different characteristics to different regions of a thread pattern.

Figure 16A:
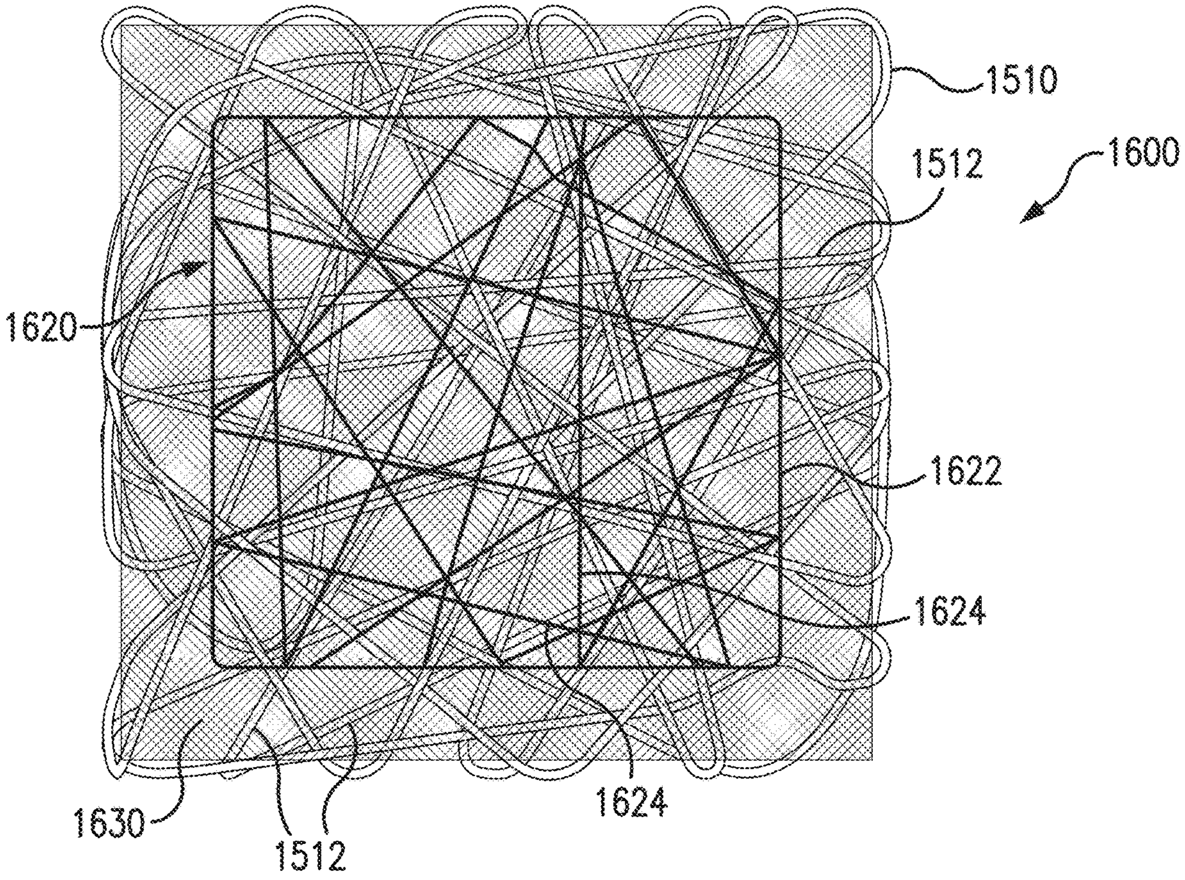
FIGS. 16A and 16B show a thread swatch according to some embodiments.
Figure 16B:
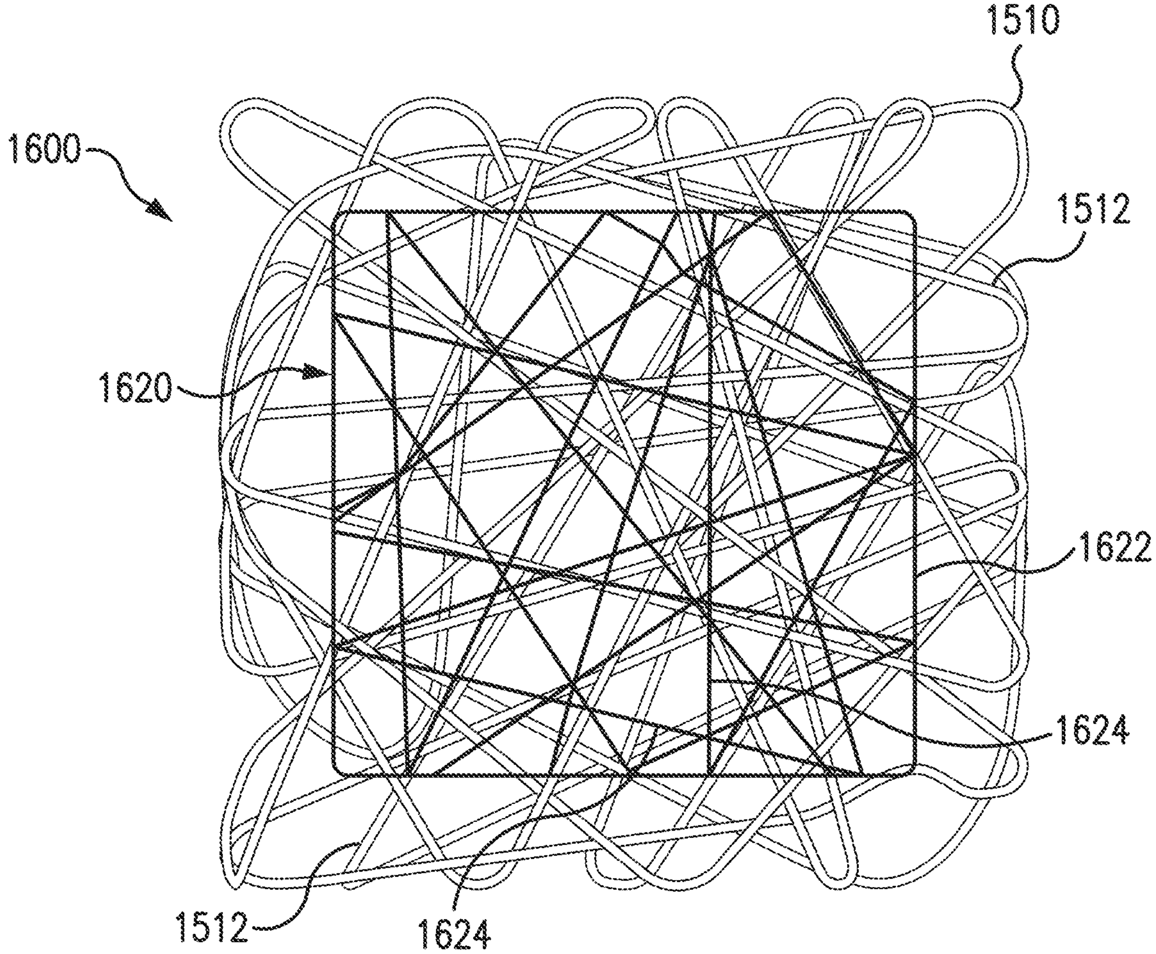

FIGS. 16A and 16B show a thread pattern swatch 1600 including thread pattern 1510 and a stitched bonding layer 1620 applied using a removable backing layer 1630. Similar to stitched bonding layer 1520, stitched bonding layer 1620 includes one or more threads stitched to thread lines 1512 of thread pattern 1510. However, stitched bonding layer 1620 is stitched to thread pattern 1510 by stitching onto removable backing layer 1630. Removable backing layer 1630 may be a tear away backing layer or a dissolvable backing layer. In some embodiments, a tear away backing layer may be a polyester fabric layer. In some embodiments, a dissolvable backing layer may be a water-soluble fabric layer. FIG. 16B shows removable backing layer 1630 removed from thread swatch 1600.

Similar to stitched bonding layer 1520, stitched bonding layer 1620 may include a perimeter portion 1622 defining a perimeter shape of stitched bonding layer 1620. When applied to an upper, perimeter portion 1622 may correspond to a perimeter portion of the upper (e.g., perimeter portion 162 of upper 120). In some embodiments, stitched bonding layer 1620 may include interior threads 1624 disposed within perimeter portion 1622. Interior threads 1624 provide additional bonding between thread lines 1512 and may increase the structural rigidity of thread pattern 1510. In some embodiments, interior threads 1624 may bond thread lines 1512 of thread pattern 1510 at a plurality of intersection points between thread lines 1512. Alternatively or additionally, interior threads 1624 may impart a desired aesthetic design to thread pattern 1510. In some embodiments, multiple stitched bonding layers 1620 may be used to bond thread pattern 1510.

Figure 17:
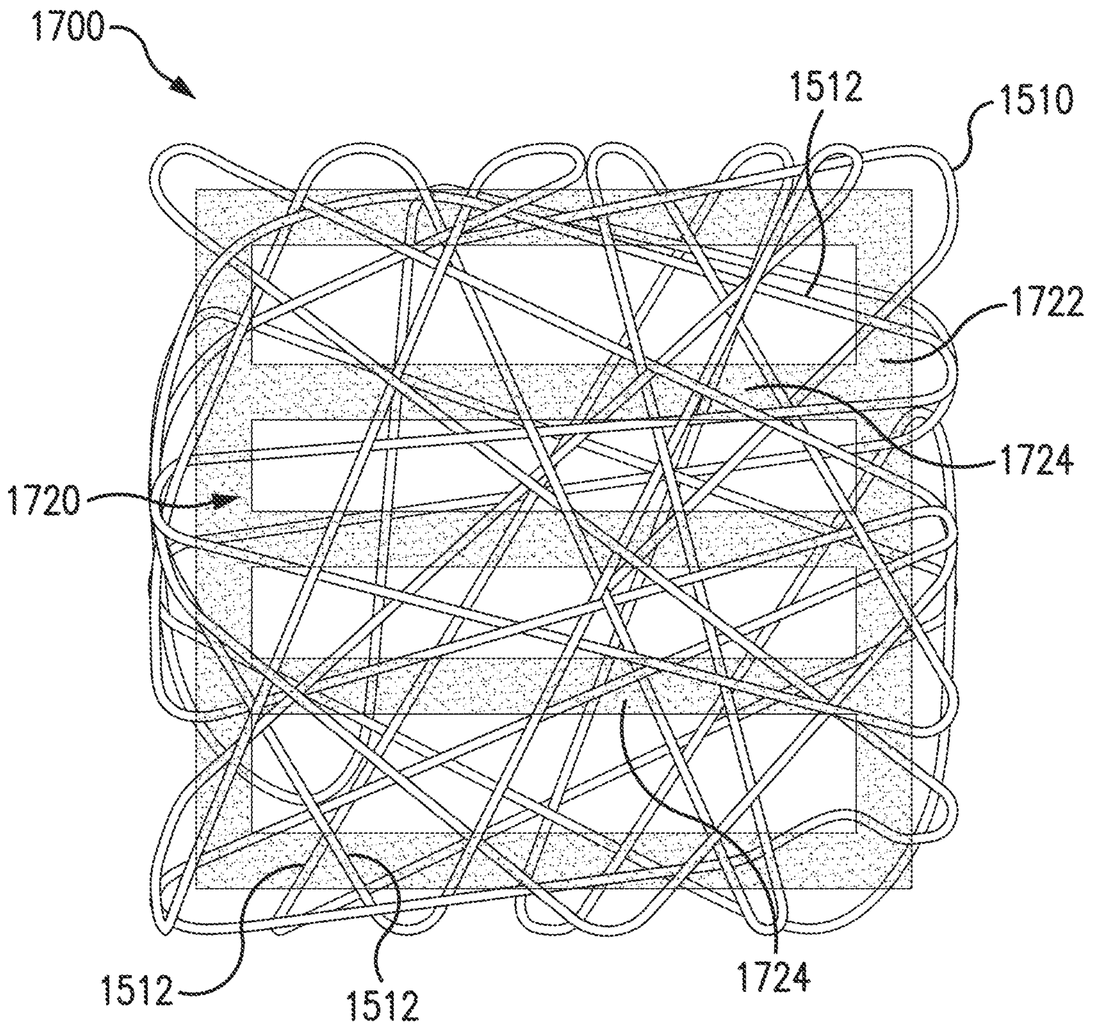
FIG. 17 shows a thread swatch according to some embodiments.

FIG. 17 shows a thread pattern swatch 1700 including thread pattern 1510 and an adhesive bonding layer 1720. Adhesive bonding layer 1720 includes an adhesive disposed on thread lines 1512 of thread pattern 1510. And adhesive bonding layer 1720 fixes thread lines 1512 of thread pattern 1510 to each other by forming an adhesive coating on thread lines 1512. Adhesive bonding layer 1720 may be applied to the inner side or the outer side of thread pattern 1510. In some embodiments, adhesive bonding layer 1720 may be applied to both the inner and outer sides of thread pattern 1510.

In some embodiments, adhesive bonding layer 1720 may be a sprayed adhesive layer, for example a sprayed latex adhesive or a polyurethane adhesive or paint. In some embodiments, a sprayed adhesive bonding layer may include a primer and an adhesive. In some embodiments, adhesive bonding layer 1720 may be a semi-dissolved fabric layer. In some embodiments, adhesive bonding layer 1720 may be a semi-dissolved water-soluble adhesive layer. In some embodiments, adhesive bonding layer 1720 may be a printed (e.g., screen-printed or ink-jet printed) adhesive layer. In some embodiments, adhesive bonding layer 1720 may be a UV (ultraviolet) cured, IR (infrared) cured, or heat cured adhesive layer. In some embodiments, adhesive bonding layer 1720 may be a tape layer, such as a hemming tape layer. In some embodiments, adhesive bonding layer 1720 may be a glue layer. In some embodiments, mechanical compression may be applied to help adhere adhesive bonding layer 1720 to thread lines 1512 of thread pattern 1510.

In some embodiments, adhesive bonding layer 1720 may be applied over entire thread pattern 1510. In some embodiments, adhesive bonding layer 1720 may include a perimeter portion 1722 defining a perimeter shape of adhesive bonding layer 1720. When applied to an upper, perimeter portion 1722 may correspond to a perimeter portion of the upper (e.g., perimeter portion 162 of upper 120). In some embodiments, adhesive bonding layer 1720 may include interior members 1724 disposed within perimeter portion 1722. Interior members 1724 provide additional bonding between thread lines 1512 and may increase the structural rigidity of thread pattern 1510. In some embodiments, interior members 1724 may bond thread lines 1512 of thread pattern 1510 at a plurality of intersection points between thread lines 1512. Alternatively or additionally, interior members 1724 may impart a desired aesthetic design to thread pattern 1510. Space between perimeter portion 1722 and respective interior member 1724 is devoid of adhesive bonding layer 1720. In some embodiments, multiple adhesive bonding layers 1720 may be used to bond thread pattern 1510.

In some embodiments, the properties of an adhesive or different adhesives used for different regions of adhesive bonding layer 1720 may be tailored to provide different bonding strengths to different regions of adhesive bonding layer 1720. In such embodiments, the different bonding strengths at intersections between thread lines 1512 may be utilized to tailor characteristics of a thread pattern. For example, perimeter portion 1722 may be composed of a relatively flexible adhesive layer and interior members 1724 may be composed of a relatively stiff adhesive layer, or vice versa.

Figure 18:
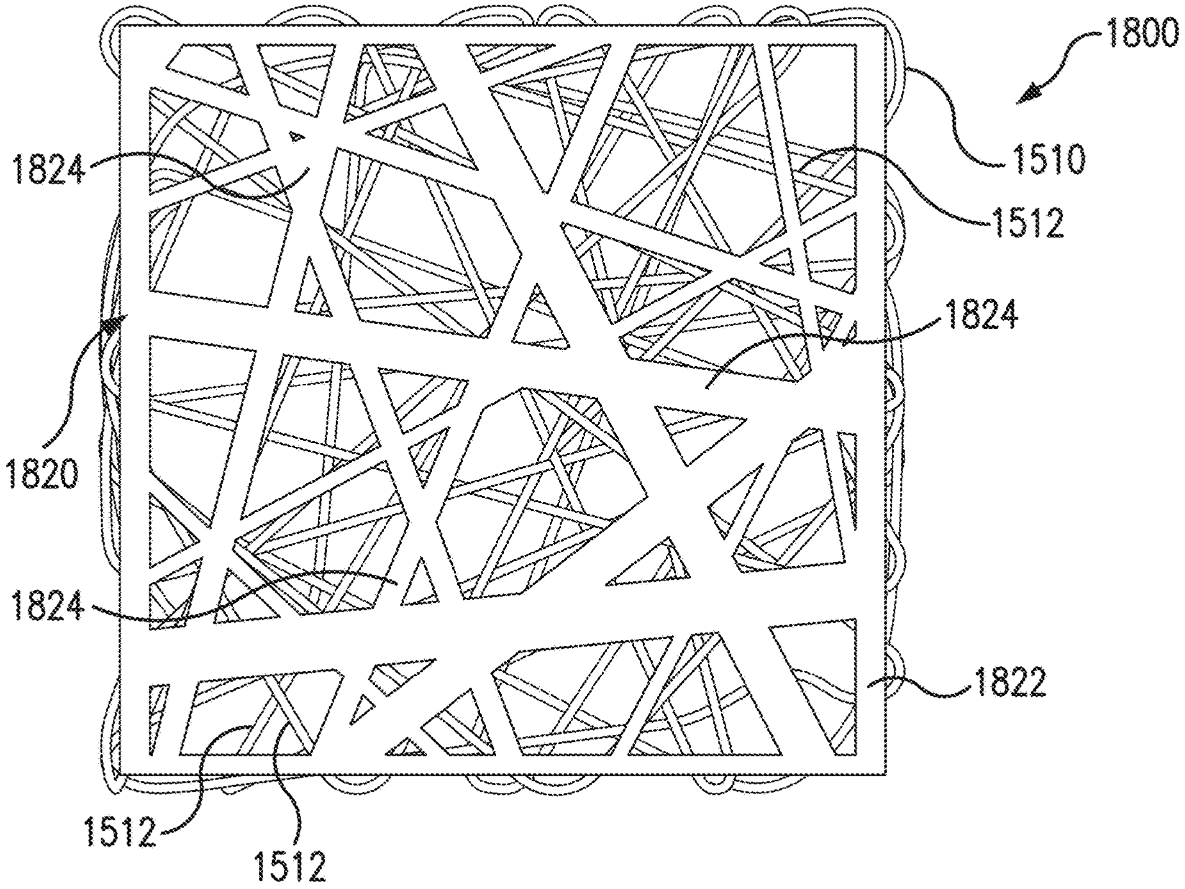
FIG. 18 shows a thread swatch according to some embodiments.

FIG. 18 shows a thread pattern swatch 1800 including thread pattern 1510 and a film bonding layer 1820. Film bonding layer 1820 includes a film disposed on thread lines 1512 of thread pattern 1510. And film bonding layer 1820 fixes thread lines 1512 of thread pattern 1510 to each other. Film bonding layer 1820 may be applied to the inner side or the outer side of thread pattern 1510. In some embodiments, film bonding layer 1820 may be applied to both the inner and outer sides of thread pattern 1510.

In some embodiments, film bonding layer 1820 may be a heat pressed textile film layer, such as a heat pressed Nylon textile film layer. In some embodiments, film bonding layer 1820 may be a heat bonded polymeric layer (e.g., a polymeric lamination layer). In some embodiments, film bonding layer 1820 may be a screen-printed textile film layer. For example, film bonding layer 1820 may be a screen-printed Nylon bag ink layer. In some embodiments, film bonding layer 1820 may be a screen-printed ink layer.

In some embodiments, film bonding layer 1820 may be applied over entire thread pattern 1510. In some embodiments, film bonding layer 1820 may include a perimeter portion 1822 defining a perimeter shape and of film bonding layer 1820. When applied to an upper, perimeter portion 1822 may correspond to a perimeter portion of the upper (e.g., perimeter portion 162 of upper 120). In some embodiments, film bonding layer 1820 may include interior members 1824 disposed within perimeter portion 1822. Interior members 1824 provide additional bonding between thread lines 1512 and may increase the structural rigidity of thread pattern 1510. In some embodiments, interior members 1824 may bond thread lines 1512 of thread pattern 1510 at a plurality of intersection points between thread lines 1512. Alternatively or additionally, interior members 1824 may impart a desired aesthetic design to thread pattern 1510. Space between perimeter portion 1822 and respective interior member 1824 is devoid of film bonding layer 1820. In some embodiments, multiple film bonding layers 1820 may be used to bond thread pattern 1510.

In some embodiments, the properties of a film or different films used for different regions of film bonding layer 1820 may be tailored to provide different bonding strengths to different regions of film bonding layer 1820. In such embodiments, the different bonding strengths at intersections between thread lines 1512 may be utilized to tailor characteristics of a thread pattern. For example, perimeter portion 1822 may be composed of a relatively flexible film layer and interior members 1824 may be composed of a relatively stiff film layer, or vice versa.

Figure 19:
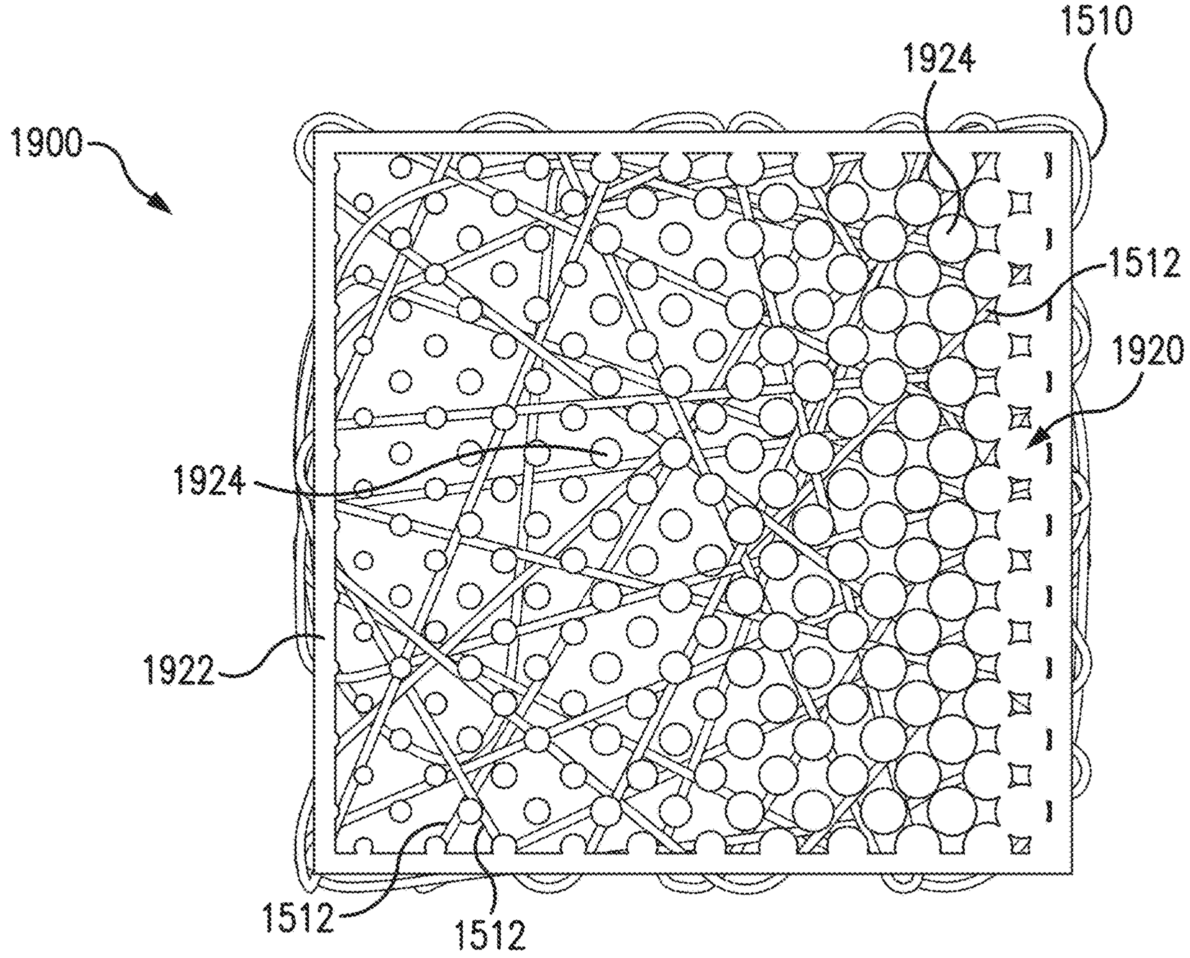
FIG. 19 shows a thread swatch according to some embodiments.

FIG. 19 shows a thread pattern swatch 1900 including thread pattern 1510 and a film bonding layer 1920 according to some embodiments. Film bonding layer 1920 includes a perimeter portion 1922 and circular interior members 1924 configured to provide additional bonding between thread lines 1512 and impart a desired aesthetic design to thread pattern 1510. Space between perimeter portion 1922 and respective interior member 1924 is devoid of film bonding layer 1920.

FIG. 20A shows an image of an article of footwear 2000 made using method 200 according to some embodiments. Article of footwear 2000 includes upper 120 coupled to sole 180. Upper 120 includes thread pattern 122 and perimeter portion 162. Thread lines 132 of the continuous threads of thread pattern 122 have been thermally bonded at anchor points 134 and intersection points 136 via the polymeric material of the continuous threads. Perimeter portion 162 is a polymeric, laminated bonding layer that bonds thread lines of thread pattern 122 at perimeter portion 162. And sole 180 is coupled to upper along biteline 160.

FIG. 20B shows an image of an article of footwear 2020 made using method 200 according to some embodiments. Article of footwear 2020 includes upper 120 with thread pattern 122 bonded to a fabric layer 172. Thread lines 132 of the continuous threads of thread pattern 122 have been thermally bonded at intersection points 136. As illustrated in FIG. 20B, no anchor points from the winding process used to make thread pattern 122 remain on article of footwear 2020. These anchor points were cut from thread pattern 122 after winding.

FIG. 20C shows an image of an article of footwear 2040 made using method 200 according to some embodiments. Article of footwear 2040 includes upper 120 with thread pattern 122 and a bonding layer 630. Thread lines 132 of the continuous threads of thread pattern 122 have been bonded at intersection points 136. As illustrated in FIG. 20C, no anchor points from the winding process used to make thread pattern 122 remain on article of footwear 2040. These anchor points were cut from thread pattern 122 after winding.

FIG. 21 shows a mold 2100 for molding a sole (e.g., sole 1100) according to some embodiments. Mold 2100 includes a first mold plate 2110 and a second mold plate 2120. Second mold plate 2120 includes a sole cavity 2122 having a sole cavity bottom surface 2124 and a sole cavity side surface 2126. Sole cavity bottom surface 2124 includes elements 2130 for forming traction elements, such as cleats. In some embodiments, elements 2130 may be projections extending from sole cavity bottom surface 2124. In some embodiments, elements 2130 may be indentations in sole cavity bottom surface 2124 configured to receive traction elements, for example cleat studs. When assembled, first mold plate 2110 and second mold plate 2120 form a mold cavity having an interior shape corresponding to the shape of a sole for an article of footwear.

In embodiments including elements 2130 that are projections, thread lines 2132 of one or more continuous threads may be wound around elements 2130 in a similar fashion as discussed herein for winding continuous thread(s) around pins. In other words, projecting elements 2130 may define anchor points for thread lines 2132. In some embodiments, as shown for example in FIG. 21B, elements 2130 may be projections that are removably attached to sole cavity bottom surface 2124. Removable projections 2130 may be attached to sole cavity bottom surface 2124 via a removable mechanical attachment, such as but not limited to, a screw attachment or a friction fit. In some embodiments, removable projections 2130 may be removably attached to studs 2125 formed on sole cavity bottom surface 2124. In such embodiments, studs 2125 may be arranged in a pattern for cleats of an article of footwear. In some embodiments, projections 2130 may include ridges 2131 to help hold threads during winding.

In embodiments including elements 2130 that are indentations, traction elements (e.g., cleat studs) may be disposed within the indentations such that a portion of each stud extends from sole cavity bottom surface 2124. In such embodiments, the portion of each stud projecting above sole cavity bottom surface 2124 defines an anchor point for winding thread lines 2132. And thread lines 2132 of one or more continuous threads may be wound around the projecting portion of the studs a similar fashion as discussed herein for winding continuous thread(s) around pins.

After winding thread lines around projecting elements 2130 or projecting portions of cleat studs, sole material may be disposed within sole cavity 2122 and a sole may be molded around thread lines 2132 within mold 2100. In other words, thread lines 2132 may be encased with a sole material defining at least a portion of a sole (e.g., sole 1100). In some embodiments, mold 2100 may be an injection molding mold. In some embodiments, mold 2100 may be used to partially consolidate a sole and the sole may be cured to fully solidify the sole. After molding, the sole may be removed from mold 2100. In embodiments including removable projections 2130 or traction elements, sole material may be bonded to removable projections 2130 or traction elements during molding.

Figure 22A:
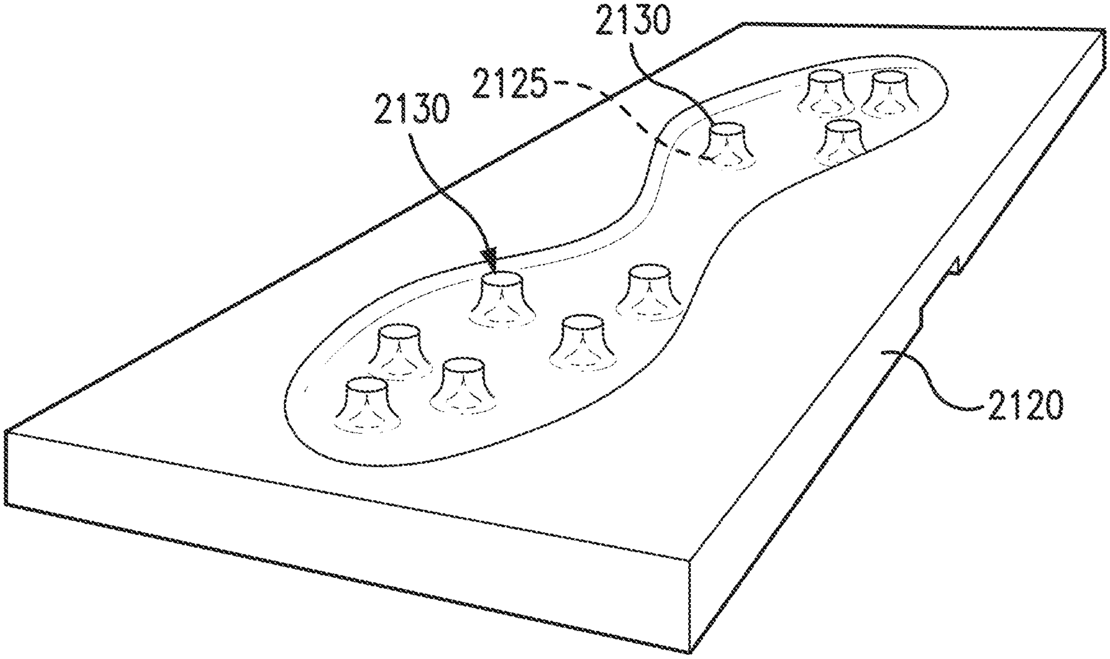
FIGS. 22A-22C illustrate a method of making a sole according to some embodiments.
Figure 22B:
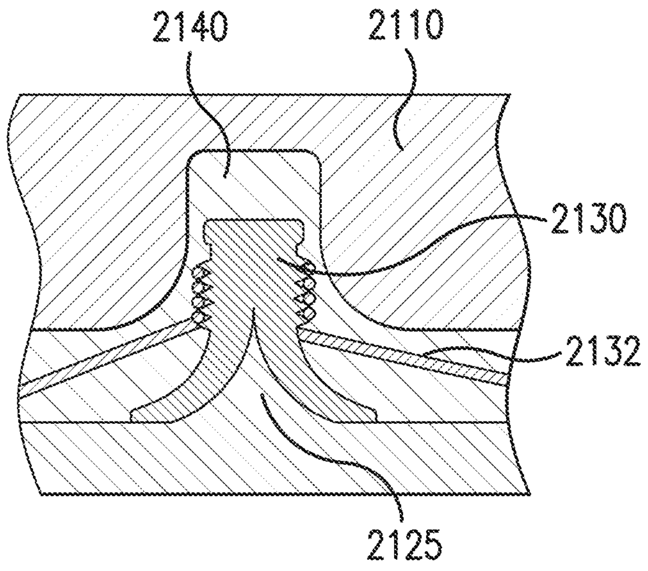
Figure 22C:
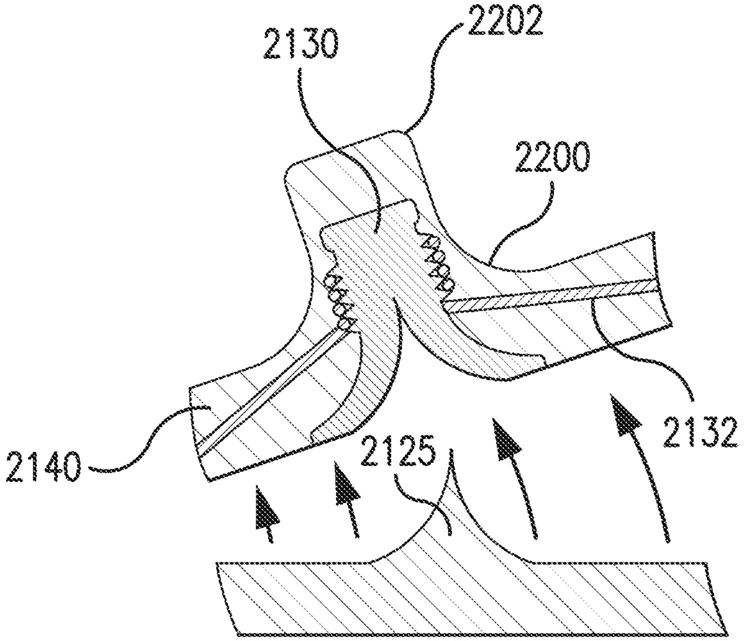
Figure 23:
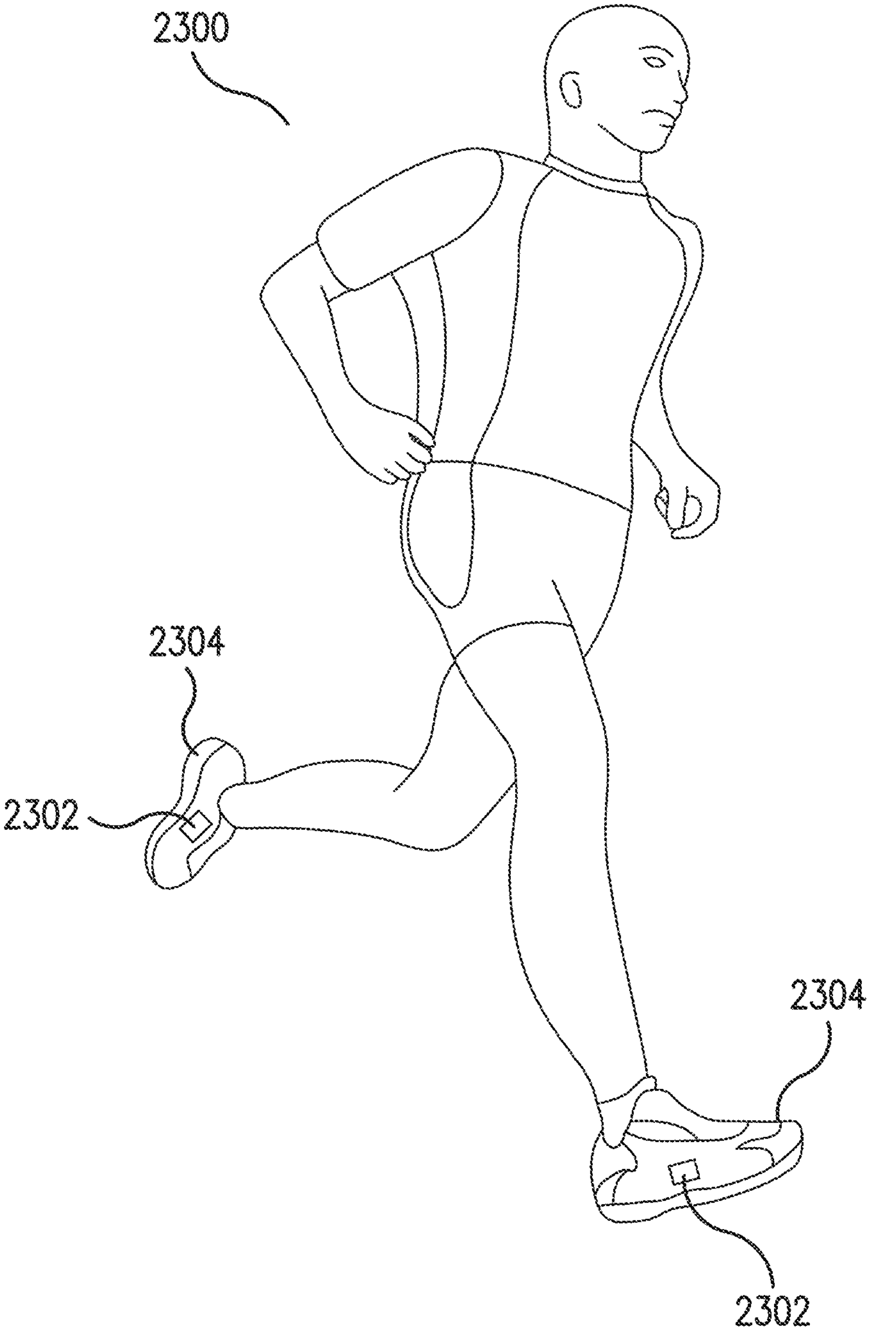
FIG. 23 shows an illustration of an individual with sensor modules coupled to articles of footwear according to some embodiments.

FIGS. 22A-C illustrate a method of molding a sole 2200 according to some embodiments. As shown in FIG. 22A, removable projections 2130 may be attached to studs 2125 of second mold plate 2120. After attaching removable projections 2130, thread lines 2132 of one or more continuous threads may be wound around projections 2130 as discussed herein. And, after winding, first mold plate 2110 may be disposed over second mold plate 2120 and sole material 2140 may be injected into the cavity formed between first mold plate 2110 and second mold plate 2120, as shown in FIG. 22B. The injection of sole material 2140 into the mold cavity may embed thread lines 2132 within sole material 2140.

While in the mold cavity, sole material 2140 may be fully or partially solidified, e.g., by curing sole material 2140. Also, while in the mold cavity, mold material 2140 may bond to removable projections 2130 and/or thread lines 2132. After fully or partially curing sole material 2140, a fully or partially solidified sole 2200 may be removed from the mold cavity with removable projections 2130 forming a portion of cleats 2202 for sole 2200.

Figure 27:
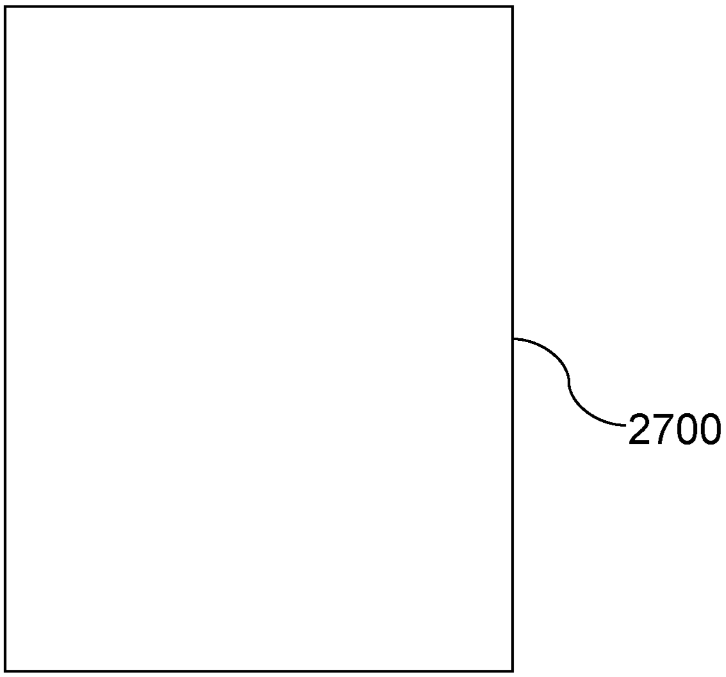
FIG. 27 shows a schematic block diagram of an article of apparel in which embodiments may be implemented.

While various embodiments have been discussed herein in the context of footwear, other articles of apparel 2700 (shown in FIG. 27) may be manufactured using the winding processes discussed herein. Other articles of apparel include, but are not limited to, pants, shorts, leggings, a sock, a jacket, a coat, a hat, a sleeve, a shoe, a sweater, a shirt, a jersey, a bra, a bootie, and a glove.

Figure 25A:
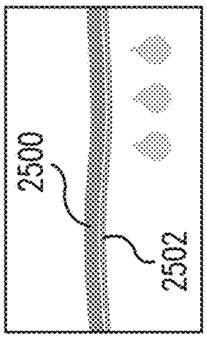
FIGS. 25A-25N illustrate bonding methods according to various embodiments.

FIGS. 25A-25F illustrate various methods for bonding thread lines 2500 according to some embodiments. FIG. 25A illustrates a method of bonding thread lines 2500 using an adhesive sheet 2502 that is dissolvable. Adhesive dissolvable sheet 2502 is applied to thread lines 2500 and is then dissolved. Thread lines 2500 are adhered together at locations where sheet 2502 is dissolved. The dissolution process can be stopped at different levels, leaving different amounts of dissolved and undissolved adhesive behind.

Figure 25B:
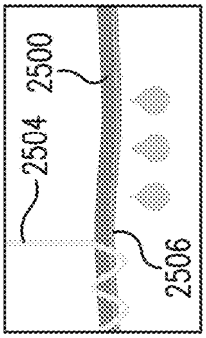

FIG. 25B illustrates a method of bonding thread lines 2500 via stitching 2504. Stitching 2504 is stitched to thread lines 2500 in selected places, using for example a sewing machine. Stitching 2504 may be stitched in selected places to locally fix thread lines 2500 together. In some embodiments, this approach may include the use of a backing sheet 2506 as a substrate to assist with the sewing process. In such embodiments, thread lines 2500 are sewn onto backing sheet 2506. And after sewing, backing sheet 2506 is removed, for example by dissolving backing sheet 2506. If thread lines 2500 form a dense enough thread pattern, backing sheet 2506 may not be required.

Figure 25C:
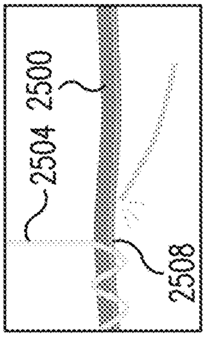

FIG. 25C illustrates a method of bonding thread lines 2500 via stitching 2504. Stitching 2504 is stitched to thread lines 2500 in selected places, using for example a sewing machine. Stitching 2504 may be stitched in selected places to locally fix thread lines 2500 together. In some embodiments, this approach may include the use of a backing sheet 2508 as a substrate to assist with the sewing process. In such embodiments, thread lines 2500 are sewn onto backing sheet 2508. And after sewing, backing sheet 2508 is removed, for example, by tearing or cutting backing sheet 2508 away. If thread lines 2500 form a dense enough thread pattern, backing sheet 2508 may not be required.

Figure 25D:
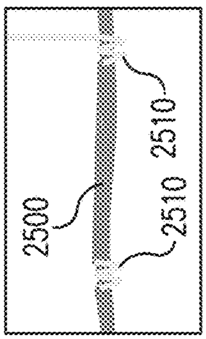

FIG. 25D illustrates a method of bonding thread lines 2500 using local stitches 2510. Local stitches 2510 may be stitched using a sewing machine. In this process, thread lines 2500 are stitched together are specific points in a thread pattern. For example, a first stitch 2510 may locally bond one or more thread lines 2500 at a first point, then the thread of the stitch is run at a desired trajectory to a second point where a second stitch 2510 locally bonds one or more thread lines 2500. This technique is repeated until the bonding of thread lines 2500 is completed, with local stitches 2510 acting as the structure that bonds thread lines 2500 together. In some embodiments, a backing sheet (e.g., a dissolvable sheet, tear-away sheet, or a non-dissolvable or non-tear-way fabric layer) may be used to as a substrate to assist with the sewing process.

Figure 25E:
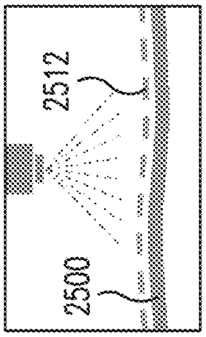

FIG. 25E illustrates a method of spraying an adhesive to bond thread lines 2500. Sprayed adhesive can be selectively applied to desired locations on a thread pattern by, for example, a mask 2512 or a location-controlled spray nozzle.

Figure 25F:
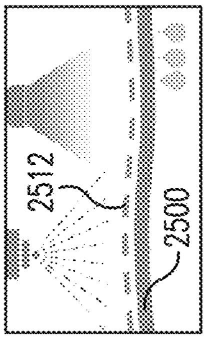

FIG. 25F illustrates a method of spraying an activated adhesive to bond thread lines 2500. This technique uses an adhesive to consolidate a thread pattern. The adhesive is applied to the thread pattern and is then activated at desired regions to consolidate the thread pattern. Activation of the adhesive may solidify the adhesive, for example by curing the adhesive. This activation can use, for example, light, temperature or a chemical accelerator/activator. In some embodiments, a mask 2512 may be utilized to control activation in selected regions of the thread pattern by blocking activation energy in selected regions. After activation, any excess adhesive may be removed from the thread pattern.

Figure 25G:
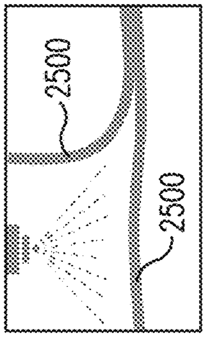

FIG. 25G illustrates a method of adhesively bonding thread lines 2500 of two thread pattern layers together. This technique uses an adhesive to fix thread lines 2500 of different thread patterns together, thereby consolidating the thread patterns. Adhesive is applied to a first thread pattern layer and a second thread pattern layer is disposed over the adhesive coated surface of the first thread pattern layer. This process may be repeated depending on how may thread pattern layers are desired. In some embodiments, pressure may be applied to press the thread pattern layers against each other and aid in bonding the thread pattern layers together.

Figure 25H:
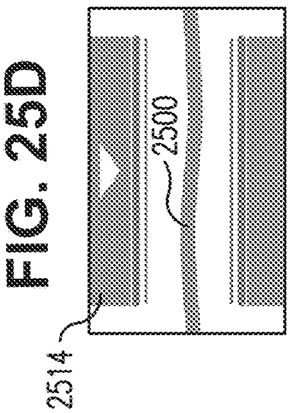

FIG. 25H illustrates a method of thermally bonding thread lines 2500. In this technique, thread lines 2500 are coated in a material which allows thread lines 2500 to be directly bonded to each other with the application of heat and/or pressure. The material coated on thread lines 2500 may be, for example, a thermoplastic polymer or a heat-activated adhesive. Consolidation is achieved by heat pressing a thread pattern in a heat press 2514 in order to bond thread lines 2500 at intersection points and/or where they are in close proximity to each other. Structured press plates or a localized heat source may be used to consolidate the thread pattern in only selected areas.

Figure 25I:
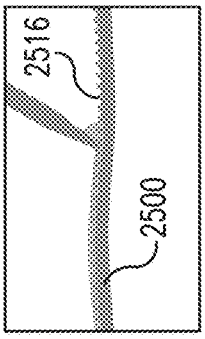

FIG. 25I illustrates a method of screen-printing a material to bond thread lines 2500. In this technique, a thread pattern is consolidated by screen-printing, for example, an adhesive or ink onto thread lines 2500. The screen-printed material is applied to thread lines 2500 through a mask 2516. The screen-printed material may be cured after it is printed on thread lines 2500.

Figure 25J:
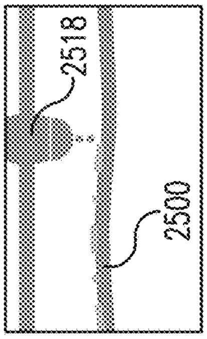

FIG. 25J illustrates a method of bonding thread lines 2500 using an ink jet printer 2518. In this technique, a thread pattern is consolidated by ink-jet printing an adhesive or ink onto the thread pattern at specific locations. The ink-jet printed material may be cured after it is printed on thread lines 2500.

Figure 25K:
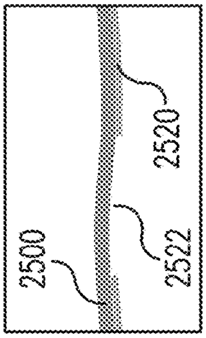

FIG. 25K illustrates a method of bonding thread lines 2500 using a structured backing sheet 2520. In this technique, a thread pattern is consolidated by attaching structured backing sheet 2520 to the thread pattern. Structured backing sheet 2520 includes apertures 2522 in areas where thread lines 2500 are not intended to be bonded together. Backing sheet 2520 may be attached to the thread pattern using, for example, an adhesive or heat bonding.

Figure 25L:
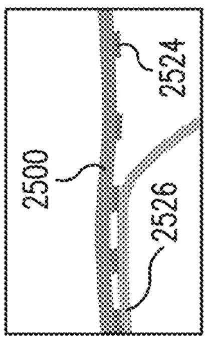

FIG. 25L illustrates a method of bonding thread lines 2500 using an adhesive 2524 deposited on a transfer tape 2526. Transfer tape 2526 is used to transfer adhesive 2524 onto the thread pattern. The substrate of the transfer tape 2526 is removed leaving behind only adhesive 2524 bonding thread lines 2500 together.

Figure 25M:
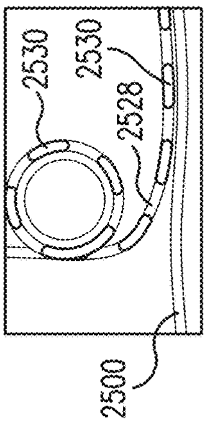

FIG. 25M illustrates a method of bonding thread lines 2500 using a coated thread 2528. A coating 2530 is applied to thread 2528 locally as it is applied to the thread pattern. Coating 2530 may be, for example, an ink or adhesive coating. Coating 2530 is only applied in areas where thread lines 2500 are intended to be bonded together. Since the pattern of a given thread pattern is known prior to applying thread 2528, coating 2530 may be applied to thread 2528 at desired locations for bonding thread lines 2500. For example, coating 2530 may be applied to thread 2528 at specific locations such that when thread 2528 is applied to or wound as a thread in a thread pattern, coating 2530 is located at intersection points between thread lines 2500.

Figure 25N:
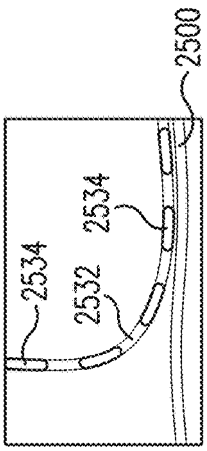

FIG. 25N illustrates a method of bonding thread lines 2500 using a coated thread 2532 as a continuous thread within a thread pattern. Since a thread model may be used to determine a thread pattern, as discussed herein, the routing and patterning of a thread pattern may be determined prior to a winding process. As such, it is also determined where intersection points between individual thread lines will occur along the length of any thread within the pattern. Accordingly, one or more coated threads 2532 may be prepared to have a coating 2534 deposited at intersection points at which thread lines are intended to be bonded together. Coated thread(s) 2532 may be selectively coated with coating 2534, wound onto a spool, and then wound around anchor points of a thread pattern, as discussed herein. In some embodiments, coating 2534 may bond thread lines 2500 at an intersection point with coating 2534 of coated thread 2532 without any external influence. In some embodiments, coating 2534 may be activated using, for example, light, heat, and/or chemical activation. In some embodiments, coated thread 2532 may be applied to thread pattern, rather than wound as a continuous thread within the thread pattern.

One or more aspects of the methods of manufacturing an article of footwear discussed herein, or any part(s) or function(s) thereof (e.g., collecting biometric data, generating thread models based on biometric data, and winding continuous threads with a CNC machine based on a thread model), may be implemented using hardware, software modules, firmware, tangible computer readable media having instructions stored thereon, or a combination thereof and may be implemented in one or more computer systems or other processing systems.

Figure 26:
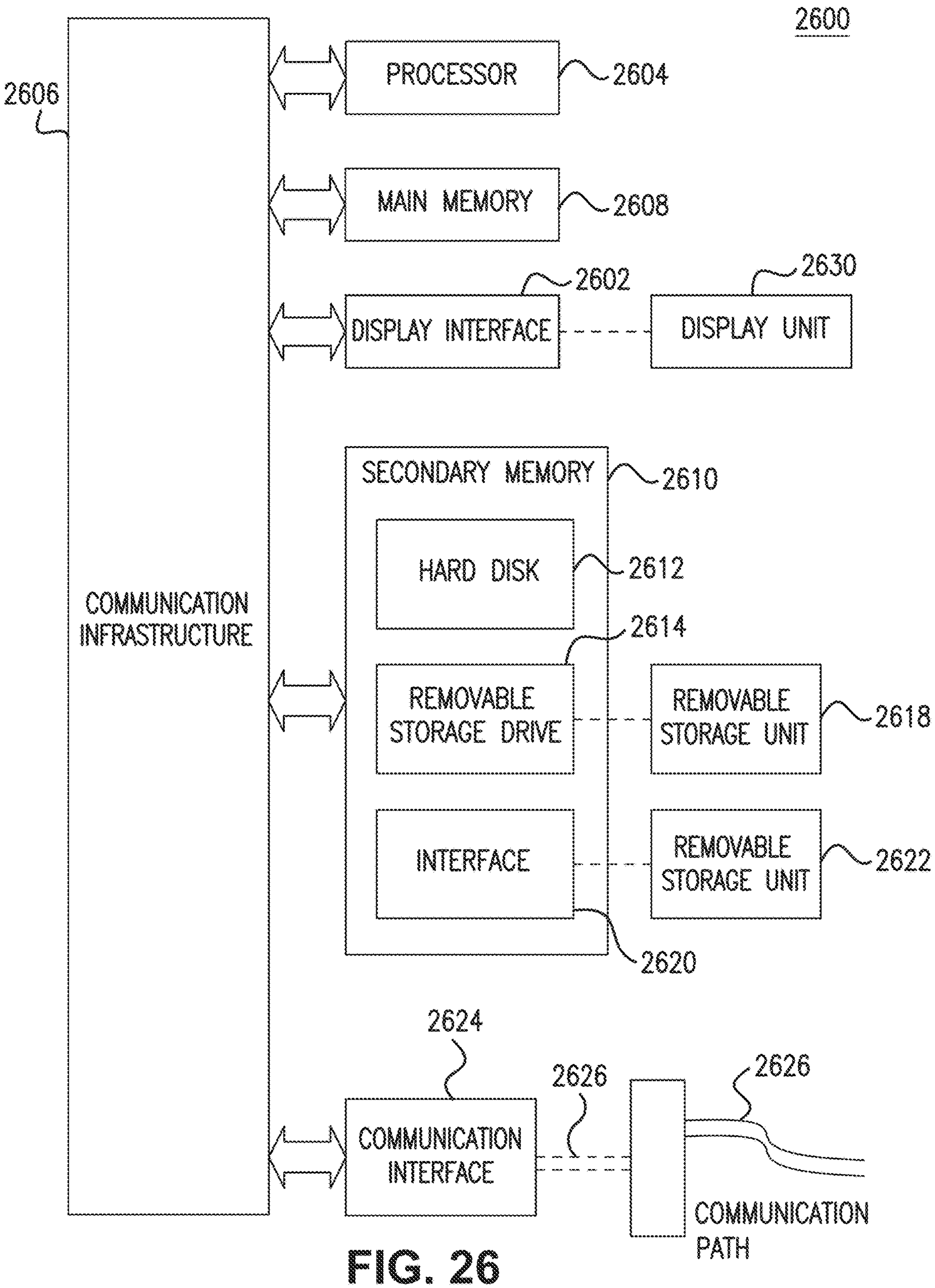
FIG. 26 shows a schematic block diagram of an exemplary computer system in which embodiments may be implemented.

FIG. 26 illustrates an exemplary computer system 2600 in which embodiments, or portions thereof, may be implemented as computer-readable code. For example, aspects of the methods discussed herein that may be implemented in one or more computer systems include, but are not limited to, collecting a biometric data profile, generating polymer thread patterns based on the biometric data profile, and obtaining an already generated polymer thread pattern (or patterns) may be implemented in computer system 2600 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the inventions may be implemented in terms of this example computer system 2600. After reading this description, it will become apparent to a person skilled in the relevant art how to implement one or more of the inventions using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 2604 may be a special purpose or a general purpose processor device. As will be appreciated by persons skilled in the relevant art, processor device 2604 may also be a single processor in a multi-core/multiprocessor system, such system operating alone, or in a cluster of computing devices operating in a cluster or server farm. Processor device 2604 is connected to a communication infrastructure 2606, for example, a bus, message queue, network, or multi-core message-passing scheme.

Computer system 2600 also includes a main memory 2608, for example, random access memory (RAM), and may also include a secondary memory 2610. Secondary memory 2610 may include, for example, a hard disk drive 2612, or removable storage drive 2614. Removable storage drive 2614 may include a floppy disk drive, a magnetic tape drive, an optical disk drive, a flash memory, a Universal Serial Bus (USB) drive, or the like. The removable storage drive 2614 reads from and/or writes to a removable storage unit 2618 in a well-known manner. Removable storage unit 2618 may include a floppy disk, magnetic tape, optical disk, etc. which is read by and written to by removable storage drive 2614. As will be appreciated by persons skilled in the relevant art, removable storage unit 2618 includes a computer usable storage medium having stored therein computer software and/or data.

Computer system 2600 (optionally) includes a display interface 2602 (which can include input and output devices such as keyboards, mice, etc.) that forwards graphics, text, and other data from communication infrastructure 2606 (or from a frame buffer not shown) for display on display unit 2630.

In additional and/or alternative implementations, secondary memory 2610 may include other similar means for allowing computer programs or other instructions to be loaded into computer system 2600. Such means may include, for example, a removable storage unit 2622 and an interface 2620. Examples of such means may include a program cartridge and cartridge interface (such as that found in video game devices), a removable memory chip (such as an EPROM, or PROM) and associated socket, and other removable storage units 2622 and interfaces 2620 which allow software and data to be transferred from the removable storage unit 2622 to computer system 2600.

Computer system 2600 may also include a communication interface 2624. Communication interface 2624 allows software and data to be transferred between computer system 2600 and external devices. Communication interface 2624 may include a modem, a network interface (such as an Ethernet card), a communication port, a PCMCIA slot and card, or the like. Software and data transferred via communication interface 2624 may be in the form of signals, which may be electronic, electromagnetic, optical, or other signals capable of being received by communication interface 2624. These signals may be provided to communication interface 2624 via a communication path 2626. Communication path 2626 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 2618, removable storage unit 2622, and a hard disk installed in hard disk drive 2612. Computer program medium and computer usable medium may also refer to memories, such as main memory 2608 and secondary memory 2610, which may be memory semiconductors (e.g. DRAMs, etc.).

Computer programs (also called computer control logic) are stored in main memory 2608 and/or secondary memory 2610. Computer programs may also be received via communication interface 2624. Such computer programs, when executed, enable computer system 2600 to implement the embodiments as discussed herein. In particular, the computer programs, when executed, enable processor device 2604 to implement the processes of the embodiments discussed here. Accordingly, such computer programs represent controllers of the computer system 2600. Where the embodiments are implemented using software, the software may be stored in a computer program product and loaded into computer system 2600 using removable storage drive 2614, interface 2620, and hard disk drive 2612, or communication interface 2624.

Embodiments of the inventions also may be directed to computer program products comprising software stored on any computer useable medium. Such software, when executed in one or more data processing device, causes a data processing device(s) to operate as described herein. Embodiments of the inventions may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Some embodiments are directed to a method of making an upper for an article of footwear, the method including defining a plurality of peripheral anchor points; winding a continuous thread around the plurality of peripheral anchor points to form a thread pattern, the continuous thread including a plurality of thread lines with each thread line extending between two respective peripheral anchor points; and bonding the continuous thread at a point of intersection between the thread lines.

In any of the various embodiments discussed herein, the method of making an upper may include bonding a continuous thread at one or more peripheral anchor points.

In any of the various embodiments discussed herein, the method of making an upper may include bonding a continuous thread at a plurality of points of intersection between thread lines.

In any of the various embodiments discussed herein, the peripheral anchor points may be defined by pins coupled to and extending from a pin assembly plate, and the pins may be configured to support a continuous thread during winding. In any of the various embodiments discussed herein, the peripheral anchor points may be defined by pins coupled to and extending from a three-dimensional object, and the pins may be configured to support a continuous thread during winding.

In any of the various embodiments, discussed herein, a thread pattern may be based on a biometric data profile for an individual.

In any of the various embodiments discussed herein, peripheral anchor points may have a thread line communication number of three or more. In some embodiments, the thread line communication number for peripheral anchor points may be based on a biometric data profile for an individual.

In any of the various embodiments discussed herein, the method of making an upper may include winding a second continuous thread around a plurality of peripheral anchor points, the second continuous thread including a plurality of thread lines with each thread line extending between two respective peripheral anchor points.

In any of the various embodiments discussed herein, the method of making an upper may include defining a plurality of interior anchor points disposed between a plurality of peripheral anchor points and winding the continuous thread around the plurality of interior anchor points.

In any of the various embodiments discussed herein, the method of making an upper may include bonding thread lines together at a perimeter portion of thread pattern, the perimeter portion including a frame having a shape corresponding to a least a portion of a perimeter shape of an upper. In some embodiments, bonding thread lines may include at least one of: a lamination process, a stitching process, heat pressing, an adhesive bonding process, a screen printing process, and a curing process. In some embodiments, the method of making any upper may include removing excess thread pattern from an exterior side of the perimeter portion of the thread pattern. In some embodiments, bonding the perimeter portion of the thread pattern may encase a plurality of peripheral anchor points within a bonding layer.

Some embodiment are directed to a method of making an upper for an article of footwear, the method including winding a continuous thread around a set of pins to form a thread pattern, the pins being coupled to and extending from a support structure and disposed at locations corresponding to a perimeter of the upper, and the continuous thread including a plurality of thread lines, where each thread line extends between two respective pins; and bonding the continuous thread to itself at one or more of the plurality of pins.

In any of the various embodiments discussed herein, winding and bonding of the thread pattern may be performed without a base layer disposed between the thread pattern and a support structure.

In any of the various embodiments discussed herein, the support structure may include a support plate. In any of the various embodiments, discussed herein, the support structure may include a last.

In any of the various embodiments discussed herein, the method of making an upper may include bonding thread lines together at a perimeter portion of the thread pattern. In some embodiments, the method may include removing excess thread pattern from an exterior side of the perimeter portion.

Some embodiments are directed to an article of footwear including a sole; and an upper coupled to the sole, the upper including a plurality of anchor points disposed along a perimeter of the upper, and a continuous thread fixed at the plurality of anchor points and including a plurality of thread lines with each thread line extending between two respective anchor points, where the anchor points have a thread line communication number of three or more, and where the continuous thread is bonded at the plurality of anchor points.

In any of the various embodiments discussed herein, a continuous thread may be wrapped around a plurality of anchor points.

In any of the various embodiments discussed herein, a continuous thread may include overlaying thread lines.

In any of the various embodiments discussed herein, an article of footwear may include a plurality of interior anchor points disposed between anchor points disposed along the perimeter of an upper, and the interior anchor points may have a thread line communication number of three or more.

In any of the various embodiments discussed herein, an article of footwear may include a bonding layer disposed along a perimeter of the upper and attached to a plurality of anchor points disposed along the perimeter of the upper.

In any of the various embodiments discussed herein, a continuous thread may include a polymer thread.

In any of the various embodiments discussed herein, an upper may include a second continuous thread fixed at a plurality of anchor points and including a plurality of thread lines, with each thread line extending between two respective anchor points, and wherein the anchor points have a thread line communication number for the second continuous thread of three or more.

In any of the various embodiments discussed herein, a sole may include a plurality of sole anchor points and a second continuous thread may be fixed at the plurality of sole anchor points, the second continuous thread including thread lines extending between two respective sole anchor points. In some embodiments, the second continuous thread may be encased within a material defining at least a portion of the sole. In some embodiments, the sole may include a plurality of cleats and a location of one or more of the sole anchor points corresponds to a location of a cleat.

Some embodiments are directed to an article of footwear including a sole; and an upper coupled to the sole, the upper including a perimeter layer including an outer edge and an inner edge, a first plurality of thread line groups including three or more thread lines extending radially from respective areas on the outer edge, and a second plurality of thread line groups including three or more thread lines extending radially from respective areas on the inner edge, where the thread lines of the first plurality of thread line groups and the thread lines of the second plurality of thread line groups are bonded to each other at points of intersection between the thread lines.

In some embodiments, the thread lines of the first plurality of thread line groups and the thread lines of the second plurality of thread line groups are bonded to the perimeter layer.

Some embodiments are directed to a method of making an article of footwear, the method including winding a continuous thread around a set of pins to form a thread pattern for an upper of the article of footwear, the pins coupled to and extending from a support structure and disposed at locations corresponding to a perimeter of the upper, and the continuous thread comprising a plurality of thread lines, where each thread line extends between two respective pins; and bonding the continuous thread to itself at one or more of the plurality of pins.

In some embodiments, a method of making an article of footwear may include coupling an upper to a sole, the sole made by a process including winding a second continuous thread around a plurality of anchor points defined by projections removably attached to a surface of a mold cavity and molding a sole material around the second continuous thread and the projections in the mold cavity.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. An article of apparel, comprising:

a multi-layer thread construction comprising:

- a perimeter portion;
- an interior portion;
- a first layer comprising a first thread, the first thread comprising a plurality of first thread lines extending across the interior portion between points of the perimeter portion and crossing over each other at points of overlap between two or more of the first thread lines, wherein the plurality of first thread lines are bonded to each other at the points of overlap between two or more of the first thread lines;
- a second layer disposed over the first layer and comprising a second thread, the second thread comprising a plurality of second thread lines crossing over each other at points of overlap between two or more of the second thread lines, wherein the plurality of second thread lines are bonded to each other at the points of overlap between two or more of the second thread lines; and
- a third layer disposed over the second layer and comprising a third thread, the third thread comprising a plurality of third thread lines crossing over each other at points of overlap between two or more of the third thread lines, wherein the plurality of third thread lines are bonded to each other at the points of overlap between two or more of the third thread lines, wherein the first thread lines are not woven together, the second thread lines are not woven together, and the third thread lines are not woven together.

2. The article of apparel of claim 1, wherein the first thread lines are directly bonded to each other at the points of overlap between two or more of the first thread lines, and wherein the second thread lines are directly bonded to each other at the points of overlap between two or more of the second thread lines.

3. The article of apparel of claim 1, wherein one of the first plurality of thread lines is directly bonded to one of the second plurality of thread lines at a point of overlap between the one of the first plurality of thread lines and the one of the second plurality of thread lines.

4. The article of apparel of claim 3, wherein the second thread comprises a polymer thread, and wherein a polymeric material of the polymer thread directly bonds the second thread to the first thread at the point of overlap.

5. The article of apparel of claim 1, comprising an element disposed between the first layer and the second layer.

6. The article of apparel of claim 5, wherein the element comprises a padding element.

7. The article of apparel of claim 6, wherein the padding element comprises a polymeric foam.

8. The article of apparel of claim 1, wherein the perimeter portion at least partially defines a perimeter shape of the article of apparel.

9. The article of apparel of claim 8, comprising a perimeter bonding layer that bonds the first layer to the second layer in the perimeter portion.

10. The article of apparel of claim 9, wherein the perimeter bonding layer comprises a stitching that stitches the first layer to the second layer in the perimeter portion.

11. The article of apparel of claim 8, wherein the plurality of first thread lines comprises a group of thread lines extending radially from an area in the perimeter portion.

12. The article of apparel of claim 11, wherein the group of thread lines comprises three or more thread lines extending radially from the area.

13. The article of apparel of claim 11, wherein the group of thread lines comprises five or more thread lines extending radially from the area.

14. The article of apparel of claim 1, wherein the first layer comprises a fourth thread comprising a plurality of fourth thread lines crossing over each other at points of overlap between two or more of the fourth thread lines, and wherein the plurality of fourth thread lines and the plurality of first thread lines comprise overlaying thread lines, wherein the overlaying thread lines follow a same path along lengths of the overlaying thread lines between anchor points during manufacturing.

15. The article of apparel of claim 1, comprising a fourth layer disposed between the first layer and the second layer and comprising a polymer thread, wherein a polymeric material of the polymer thread bonds the first layer to the second layer.

16. The article of apparel of claim 15, wherein the polymeric material of the polymer thread is at least partially melted between the first layer and the second layer.

17. The article of apparel of claim 1, wherein the article of apparel comprises pants, shorts, leggings, a jacket, a coat, a hat, a sleeve, a sweater, a shirt, a jersey, a bra, or a glove.

18. An article of apparel, comprising:

a multi-layer thread construction comprising:

a perimeter portion;

an interior portion;

a first layer comprising a first thread, the first thread comprising a plurality of first thread lines extending across the interior portion between points of the perimeter portion and crossing over each other at points of overlap between two or more of the first thread lines, wherein the plurality of first thread lines are bonded to each other at the points of overlap between two or more of the first thread lines;

a second layer disposed over the first layer and comprising a second thread, the second thread comprising a plurality of second thread lines crossing over each other at points of overlap between two or more of the second thread lines, wherein the plurality of second thread lines are bonded to each other at the points of overlap between two or more of the second thread lines; and stitching that stitches the first layer to the second layer, wherein the first thread lines are not woven together and the second thread lines are not woven together.

19. The article of apparel of claim 18, comprising a third layer disposed between the second layer and the first layer, the third layer comprising a third thread comprising a plurality of third thread lines crossing over each other at points of overlap between two or more of the third thread lines, wherein the stitching stitches the third layer to the first layer and the second layer.

20. An article of apparel, comprising:

a first layer comprising a first thread, the first thread comprising a plurality of first thread lines crossing over each other at points of overlap between two or more of the first thread lines, wherein the plurality of first thread lines are bonded to each other at the points of overlap between two or more of the first thread lines; and a second layer disposed over the first layer and comprising a second thread, the second thread comprising a plurality of second thread lines crossing over each other at points of overlap between two or more of the second thread lines, wherein the plurality of second thread lines are bonded to each other at the points of overlap between two or more of the second thread lines, wherein the first layer comprises a third thread comprising a plurality of third thread lines crossing over each other at points of overlap between two or more of the third thread lines, wherein the plurality of third thread lines and the plurality of first thread lines comprise overlaying thread lines, and wherein the overlaying thread lines follow a same path along lengths of the overlaying thread lines between anchor points during manufacturing.

* * * * *